US011575922B2

(12) United States Patent
Makeev et al.

(10) Patent No.: US 11,575,922 B2
(45) Date of Patent: Feb. 7, 2023

(54) METHODS AND APPARATUSES FOR HIERARCHICALLY ENCODING AND DECODING A BYTESTREAM

(71) Applicant: V-NOVA INTERNATIONAL LIMITED, London (GB)

(72) Inventors: Ivan Makeev, London (GB); Balázs Keszthelyi, London (GB); Stergios Poularakis, London (GB); Michele Sanna, London (GB); Robert Ettinger, London (GB)

(73) Assignee: V-NOVA INTERNATIONAL LIMITED

( * ) Notice: Subject to any disclaimer, the term of this patent is extended or adjusted under 35 U.S.C. 154(b) by 239 days.

(21) Appl. No.: 16/770,231

(22) PCT Filed: Dec. 6, 2018

(86) PCT No.: PCT/GB2018/053548
§ 371 (c)(1),
(2) Date: Jun. 5, 2020

(87) PCT Pub. No.: WO2019/111006
PCT Pub. Date: Jun. 13, 2019

(65) Prior Publication Data
US 2021/0176482 A1    Jun. 10, 2021

(30) Foreign Application Priority Data

Dec. 6, 2017   (EP) ..................................... 17386046
Feb. 8, 2018   (EP) ..................................... 18386002
(Continued)

(51) Int. Cl.
*H04N 19/46*   (2014.01)
*H04N 19/436*  (2014.01)
(Continued)

(52) U.S. Cl.
CPC ......... *H04N 19/436* (2014.11); *H04N 19/119* (2014.11); *H04N 19/129* (2014.11);
(Continued)

(58) Field of Classification Search
CPC combination set(s) only.
See application file for complete search history.

(56) References Cited

U.S. PATENT DOCUMENTS 9,667,994 B2     5/2017  Joshi et al.
2011/0028215 A1*  2/2011  Herr ........................ G10L 19/00
                                                           463/43
(Continued)

FOREIGN PATENT DOCUMENTS

EP        1017238 A1 *  7/2000  ........... G06T 3/4084
WO   WO-2012126037 A1 *  9/2012  ........... H03M 7/4018
(Continued)

OTHER PUBLICATIONS

Kotra et al., "CE5: Results on modified inter mode coding and joint coding of split flags for CAVLC", JCT-VC meeting; 97. MPEG meeting; Jul. 14, 2011-jul. 22, 2011; Torino; (Joint Collaborative Team on Video Coding of ISO/IEC JTC1/SC29/WG11 and ITU-T SG.16); URL: http://wftp3.itu.int/av-arch/ictvc-site/, Jul. 1, 2011, Nr:JCTVC-F524, XP030009547.
(Continued)

*Primary Examiner* — William C Vaughn, Jr.
*Assistant Examiner* — Naod W Belai
(74) *Attorney, Agent, or Firm* — Workman Nydegger

(57) ABSTRACT

There may be provided a method of decoding a received set of encoded data representing information that has been compressed, the method comprising: obtaining, a set of attribute indicators from the data set, each indicator of the set of indicators is associated with a subset of the data set; and, decoding a plurality of subsets of the data set, com-
(Continued)

prising: retrieving decoding parameters for each subset according to the attribute indicator associated with each subset; and, decoding each subset according to the retrieved decoding parameters for each subset.

20 Claims, 24 Drawing Sheets

(30) Foreign Application Priority Data

Jul. 30, 2018 (GB) .................................... 1812407
Sep. 21, 2018 (GB) .................................... 1815437

(51) Int. Cl.
  *H04N 19/119* (2014.01)
  *H04N 19/167* (2014.01)
  *H04N 19/176* (2014.01)
  *H04N 19/30* (2014.01)
  *H04N 19/96* (2014.01)
  *H04N 19/129* (2014.01)
  *H04N 19/44* (2014.01)
  *H04N 19/182* (2014.01)
  *H04N 19/91* (2014.01)

(52) U.S. Cl.
  CPC ......... *H04N 19/167* (2014.11); *H04N 19/176* (2014.11); *H04N 19/182* (2014.11); *H04N 19/30* (2014.11); *H04N 19/44* (2014.11); *H04N 19/46* (2014.11); *H04N 19/91* (2014.11); *H04N 19/96* (2014.11)

(56) References Cited

U.S. PATENT DOCUMENTS

| | | | |
|---|---|---|---|
| 2011/0274162 A1 | 11/2011 | Zhou et al. | |
| 2013/0101035 A1* | 4/2013 | Wang .................. | H04N 19/174 375/E7.243 |
| 2015/0264404 A1 | 9/2015 | Hannuksela | |
| 2015/0304667 A1 | 10/2015 | Suehring et al. | |
| 2016/0165321 A1 | 6/2016 | Denoual et al. | |

FOREIGN PATENT DOCUMENTS

| | | |
|---|---|---|
| WO | 2013-171173 | 11/2013 |
| WO | 2017-195582 | 11/2017 |

OTHER PUBLICATIONS

Hanan, "The Quadtree and Related Hierarchical Data Structures", ACM Computing Surveys, Jun. 1, 1984 ACM, New York, NY, US, vol. 16, Nr: 2, pp. 187-260, XP058287271.

International Search Report and Written Opinion for PCT/GB2018/053548 dated Apr. 17, 2019.

* cited by examiner

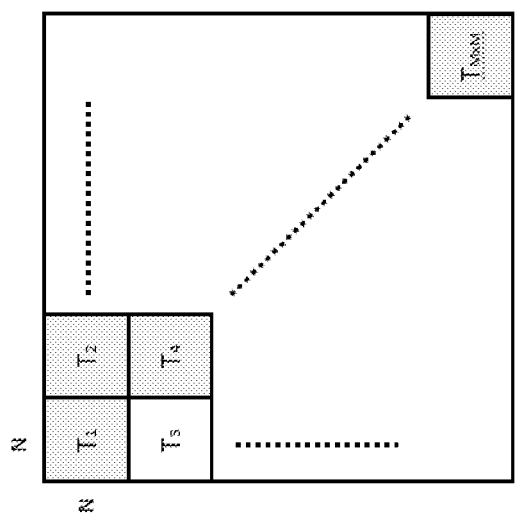
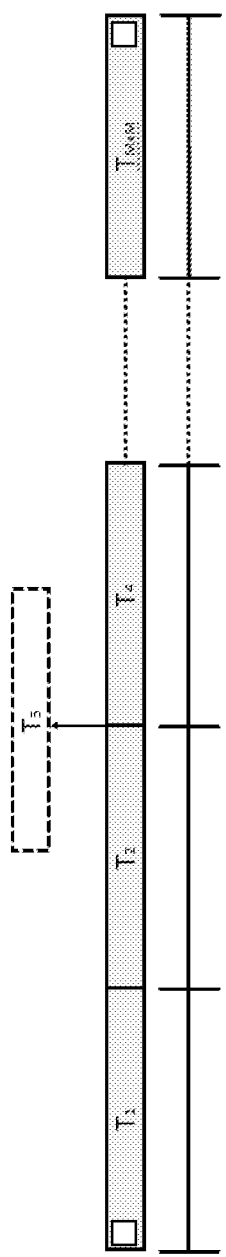
FIG 2C
FIG 2B

METHODS AND APPARATUSES FOR HIERARCHICALLY ENCODING AND DECODING A BYTESTREAM

The present application is a 371 US Nationalization of International Patent Application No. PCT/GB2018/053548, filed Dec. 6, 2018, which claims priority to European Patent Application Nos. 17386046.1, filed Dec. 6, 2017, 18386002.2, filed Feb. 8, 2018, 1812407.3, filed Jul. 30, 2018, and 1815437.7, filed Sep. 21, 2018, the entire disclosures of which are incorporated herein by reference.

TECHNICAL FIELD

The present invention relates to methods, apparatuses, computer programs and computer-readable media for encoding and/or decoding a sequence of data streams such as a bytestream.

BACKGROUND

When transmitting, or storing, image and video data it is particularly advantageous to reduce the size of the data. Techniques for encoding and decoding such data are varied and well known. Contemporary techniques provide a compromise between processing efficiency, data quality and data compression.

Images are typically represented digitally by representing the colours of an image by a set of components each having a value. For example, the colours of an image can be represented using an RGB colour model or the YCbCr colour space where each pixel of an image is represented by three different values.

To compress the data, planes of the image are usually first split into blocks of data elements, such as blocks of 8×8 pixels, and each block undergoes a domain transformation. Examples include discrete cosine transform and wavelet transform. As is well known in the art, transformation coding is used to capture correlation structures in the data.

The transformed data is then quantized to represent the large set of values using a smaller set of values and then typically undergoes a further compression step, such as entropy coding. Entropy coding utilises frequently occurring values or sequences of values within a data set in order to reduce the volume of data. For example, an entropy coding technique compresses the digital data by representing frequently occurring patterns with few bits and rarely occurring patterns with many bits.

The efficacy of each step depends on the outcome of the previous step. That is, the transformation and quantisation processes are designed to make the next step in the process more effective. For example, overall compression can be made more effective if the transform and quantisation processes represent the values of the image with frequently occurring symbols or groups of symbols so that the entropy coding step is more effectual.

The output of the entropy coding operation is thus a stream of data and the decoding operation is performed in a mirrored manner to the encoding operation. First the stream of data is decoded to recreate the information. To generate a series of blocks, the stream is divided and mapped to a plane of data using an inverse of the process used at the encoder and the blocks are then arranged in their location in the plane according to the order in which the blocks were received in the stream. For example, in a typical JPEG algorithm the blocks are arranged in a in left to right, top to bottom pattern and within each block coefficients are arranged in a zig-zag or serpentine pattern. The blocks are then de-quantised. The blocks are then domain transformed using, for example a wavelet or discrete cosine transformation.

Such entropy techniques utilise global statistics for the data to identify the most likely symbols and encode these symbols efficiently. In order to decode an entropy encoded data set it is a requirement to also specify the statistics used to encode the data. Such statistics are normally sent in the form of metadata which is typically incompressible. This results in an overhead in the process which must be considered. Whilst it is possible to further subdivide the data to be encoded into smaller and smaller sets, to do so results in an increase in the metadata overhead. As such it is important to ensure that the growth in metadata required to describe the data is not greater than the savings made by utilising the enhanced entropy encoding, which results in a tradeoff.

Some known codecs, such as AVC, will subdivide a frame of data into blocks and will vary the size of the blocks and will calculate statistics for the variable sized blocks. Such statistics may then be used in the encoding process. However, due to the metadata overhead associated with the statistics, again there exists a tradeoff between the amount of statistics and the cost associated with the provision of such statistics.

There remains difficulty in optimising the decoding process for example to take advantage of parallel decoding optimisations or separate decoding of subsets of the stream. Each block is concatenated with the other blocks and sent as one stream and therefore to accurately install each transformed block in the correct location in the plane each of the previous blocks must have been decoded sequentially from the combined stream—the order of the blocks as they appear in the stream dictates the location of the block in the grid.

Similarly, to search for and access each block in a stream to allow for parallel or separate decoding is not possible without decoding the previous blocks. Imagine some kind of boundary symbol between blocks. Then one wouldn't be able to search for a desired block, but the system would be able to search for a block (one can not say which one; one can just grab a boundary symbol guaranteed to be used for no other reason) and access the block. Additionally, some entropy encoding algorithms will conflate the blocks such that they can't be separated unless the entire steam is decoded in one entropy decoding operation. Alternatively, if each of the parts of the stream have a variable length (in most coding algorithms) identifying suitable boundaries in the data to enable separating the stream into subsets is difficult without compromising compression, further reinforcing the need for sequential decoding.

To implement parallel processing, it has previously been proposed to divide the image data into multiple parts and combine compressed streams. An alternative approach that has been proposed is to scan the compressed stream for boundaries in the encoded data or alternatively insert markers in the stream with predefined codes to aid the scanning process. None of the proposed approaches have been shown to be optimal.

It has been previously proposed to encode data in a hierarchical manner so as to reduce the overall data size of a signal. In such encoding techniques, residual data (i.e. the data required to correct low quality information present in a base layer) is used in progressively higher levels of quality. Such a hierarchical technique is described in WO 2013/171173 which proposes a tiered hierarchy of renditions of a signal. In this proposed technique, a base layer of quality represents the image at a first resolution and subsequent layers in the tiered hierarchy are residual data or adjustment layers necessary for the decoding side to reconstruct the image at a higher resolution. Techniques are proposed in this WO 2013/171173 which structure the data in each layer to exploit correlation in the residual layers to reduce information entropy by transforming a block of values into a set of directional components. Each layer in this hierarchical technique, particularly each residual layer, is often a comparatively sparse data set having many zero value elements.

The concept of a hierarchical, tiered data structure is also disclosed in earlier filed patent application GB1812407.3 and WO2013/171173. Both of GB1812407.3 and WO2013/171173 are incorporated by reference.

It has previously been proposed to store sparse matrices using quadtrees. The techniques build a tree to store the spatial structure of the matrix. When considering any possible implementation of the known formats for reconstructing images using sparse matrices, each requires intensive memory usage. Each of the known formats that demonstrate efficiency gains require a large amount of data to be stored in memory to properly reconstruct the locations and values of the data in a matrix.

It remains a goal of industry to reduce the size of image and video data stored or transmitted and to reduce the processing time and memory utilisation of encoding or decoding sparse data sets in image reconstruction.

SUMMARY

According to an aspect of the present invention there is provided a method of decoding a received set of encoded data representing information that has been compressed, the method comprising: obtaining, a set of attribute indicators from the data set, each indicator of the set of indicators is associated with a subset of the data set; and, decoding a plurality of subsets of the data set, comprising: retrieving decoding parameters for each subset according to the attribute indicator associated with each subset; and, decoding each subset according to the retrieved decoding parameters for each subset. The invention provides for subsets of a data set to be grouped together according to common features of the subsets irrespective of the spatial location of those subsets. Thus it becomes possible to reduce the metadata overhead of a data set while maintaining optimal decoding performance provided by decoding different subsets according to different decoding parameters. The attribute indicator may be considered an index value or key. Preferably the set is received as a stream, and each subset is a portion of that stream. In sum, subsets can be grouped together and assigned a value but those parameters may be indicated separately in the data set.

The groupings may not necessarily be spatial but by correlation and the metadata may not necessarily be intrinsic to the codec. The groupings provide a granularity at a data structure level (referred to as a Tessara elsewhere).

Preferably the step of retrieving may comprise retrieving a plurality of decoding parameters according to each attribute indicator, the plurality of decoding parameters corresponding to different functions of a decoding process. In this way multiple decoding parameters can be signalled using only a single attribute indicator.

The plurality of subsets may contain encoded data values and wherein the method may further comprise: recreating the information that has been compressed from the data values.

Each indicator of the set of indicators may be associated with a respective subset of the plurality of subsets of the data set. Thus the subsets can be optimised individually according to an index sent separately which allows for selective optimisation of the subsets.

A plurality of the indicators may be identical.

The encoded data set may be divided into a hierarchy of subsets. Thus the attribute indicators may be comprised in a different layer of the hierarchical data structure and configured to correspond to a respective subset of a subsequent layer to signal correspondence of the attribute indicators to the subsets without explicitly signalling the correspondence and reducing the metadata overhead. The attribute indicators of subsets may contain data values obtained by separately decoding an attribute metadata subset of the data set. Thus, a first decoding process may be performed prior to identifying the parameters to decode the later data sets. This may be considered a combination of serial and parallel processing.

In certain embodiments, the method may further comprise: obtaining an initial attribute indicator associated with an initial subset of the data set; retrieving initial decoding parameters of the initial subset according to the initial attribute indicator; decoding the initial subset according to the initial decoding parameters, wherein the initial subset contains the attribute indicators of the plurality of subsets of the data set. This embodiment provides that an initial part of the data set can be decoded from an initial index value without explicit initial signalling of parameters for an initial subset. Thus for example a header may signal the index for a first data structure and that data structure may be decoded to identify index values corresponding to later data structures of the encoded data set. In this, way a hierarchical processing technique may be optimised to reduce metadata overhead.

The decoding parameters may include quantization parameters. Thus, quantization parameters for multiple subsets may be signalled according to a group of similar parameters thus reducing the metadata overhead and optimising quantization of subsets of the data while allowing dynamic optimisation of the parameters.

The decoding parameters may include entropy decoding probability metadata. The entropy decoding probability metadata may represent a cumulative distribution function for a range decoding operation. In this way the entropy decoding operation performed on the dataset can be optimised for a group of subsets without those subsets having to be spatially proximal in the dataset or information to be compressed. Selective statistical transmission can be provided while reducing the overall metadata overhead as the statistics need only to be sent once or alternatively can be retrieved from a store at the decoder and referenced only by a suitable index.

Techniques of the invention may thus be thought of as an element of a header, i.e. the attribute indicator if signalled in the header, tells the decoder attributes by key and not by data then an index refers to a set of keys in a header.

According to a further aspect there is provided an apparatus for decoding an received set of encoded data representing information that has been compressed, comprising a processor configured to carry out the method of the above aspect.

According to a further aspect there is provided a method of encoding information to be compressed into an encoded data set, the method comprising: encoding a plurality of subsets of the data set, comprising: retrieving encoding parameters for each subset; and, encoding each subset according to the retrieved encoding parameters for each subset; and, generating a set of attribute indicators, each indicator of the set of indicators being associated with a subset of the data set according to the retrieved encoding parameters for each subset. The step of retrieving comprises retrieving a plurality of encoding parameters, the plurality of decoding parameters corresponding to different functions of an encoding process. The plurality of subsets contain encoded data values, such that the information to be compressed can be recreated from the data values. Each indicator of the set of indicators is associated with a respective subset of the plurality of subsets of the data set. A plurality of the indicators may be identical. The encoded data set may be divided into a hierarchy of subsets. The attribute indicators for subsets containing data values are separately encoded as an attribute metadata subset of the data set. The method may further comprise: encoding an initial subset according to retrieved initial decoding parameters, generating an initial attribute indicator associated with an initial subset of the data set; wherein the encoded initial subset contains the attribute indicators of the plurality of subsets of the data set. The encoding parameters may include quantization parameters. The encoding parameters may include entropy coding probability metadata. The entropy coding probability metadata may represent a cumulative distribution function for a range coding operation.

According to a further aspect there may be provided an apparatus for encoding information to be compressed into an encoded data set, comprising a processor configured to carry out the method of the above aspect.

According to a further aspect of the invention there is provided a method of decoding an encoded data set comprising a header and a payload, the payload comprising a plurality of encoded data symbols representing information that has been compressed. The decoder is configured to decode subsets of the payload according to a predetermined decoding process. The method comprises: decoding the header to derive a set of metadata elements; retrieving from the set of metadata elements, a variation parameter which indicates how the predetermined decoding process should be varied; decoding the payload according to a modified decoding process based on the variation parameter, such that the decoding process is optimised for the plurality of encoded data symbols; and, reconstructing the information that has been compressed from the decoded payload.

Thus a decoding module may obtain a value from a header which indicates that the decoding module should adapt its operations based on the indication and/or implement a decoding process using the variation parameter or shortcut. This solution allows a decoder to optimise its computational efficiency based on the expected content of the data set for example. In addition, the overall size of the data set can be reduced or optimised depending on the application of the decoding process, i.e. how the process it to be applied to information and the desired information to be recreated.

In one embodiment, the variation parameter may indicate multiple subsets of the payload shall be decoded according one or more of the same decoding parameters. Thus individual decoding parameters may not need to be signalled for parts of the payload and the decoder can optimise implementation as checks or variations may not be necessary.

In a particularly advantageous embodiment, the variation parameter may indicate quantization is disabled, such that the plurality of encoded data symbols are not quantized during decoding. In this way, the solution may provide dynamic lossless encoding of an area of a whole data set such as an image. This may be beneficial for regions of interest. Similarly, with the ability to dynamically disable quantization, parameters may not need to be signalled and the quantization steps not performed, reducing data size and computational efficiency.

The payload may comprise a plurality of data structures each comprising metadata and a plurality of encoded data symbols, wherein the metadata may indicate features of the data structure, encoded data symbols or both, and wherein the variation parameter indicates that expected optimisations on the metadata of the optimisation process have not been performed. Such a solution is particularly advantageous when used in combination with other aspects of the disclosure, for example, metadata may be processed efficiently to improve computational efficiency without compromising data overhead.

The predetermined decoding process may expect the payload to comprise a plurality of data structures each comprising metadata and a plurality of encoded data symbols, wherein the metadata may indicate features of the data structure, encoded data symbols or both, and wherein the variation parameter may indicate the data structures comprise only data symbols and do not comprise metadata. Where there is no metadata, this may reduce the overall data size but the decoding process may be varied to use a predetermined approach to properly decode the data and reconstruct the information that has been compressed.

In an example, a decoder may know that a data tier is being decoded, and may keeps track of tiers in the bytestream, so it may not be given an explicit indication that a tile contains only data leaves not metadata leaves.

This is particularly advantageous when the metadata are node symbols as described in other aspects of the disclosure such that the ordered quadtree is dense.

The variation parameter may indicate groups of subsets of the payload shall be decoded according to the same decoding parameters. For example, groups may be versions or any type of common aspects of the subsets. Such a solution facilitates optimisations on the data to enable faster and more efficient processing according to commonality.

In certain embodiments the variation parameter indicates an expected decoding parameter for the payload is signalled explicitly in the encoded data set and is not signalled by reference. Thus a predetermined or standard parameter can be varied on demand.

Further, the payload may comprise a plurality of subsets, each subset being decoded according to a set of decoding parameters, and wherein the variation parameter may indicate that an indicator element of the encoded data set that indicates which set of decoding parameters shall be used for a subset references a list of tuples of a plurality of lists of tuples, each element of the tuple referencing a parameter to be used from a different set of parameters. Thus the decoding process can be varied according to the types or features of the data to be decoded. Where there is repetition in the information signalled, i.e. parameters, the information that needs to be passed can be reduced by referencing a table or otherwise. Thus, the overall data size is reduced and computational efficiency is improved.

Alternatively or additionally, the payload may comprise a plurality of subsets, each subset being decoded according to a set of decoding parameters, and wherein the variation parameter indicates that an indicator element of the encoded data set that indicates which set of decoding parameters shall be used for a subset is a reference to a set of parameters from a plurality of different sets of parameters. Thus, the decoding process may be informed the parameters are listed in a table rather than having to consult a table to find further pointers to other data sets. This advantageous usage provides optimisation depending on the number and size of the parameters and their frequency.

As can be seen, aspects of the disclosure thus provide a flexible and dynamic way of signalling optimisations and subsequently modifying decoding operations to improve computational speed, efficiency and memory overhead and also to reduce overall data size. Thus, the general advantage provided by the variation parameters is to reduce the amount of data to be encoded/decoded and/or to optimise the execution time at the decoder, for example by optimising processing of the bytestream. This is performed by modifying decoding operations according to a retrieved variation parameter.

According to a further aspect of the invention there may be provided an apparatus for decoding an encoded data set comprising a header and a payload, comprising a processor configured to carry out the method of the above aspect.

According to a further aspect of the invention there may be provided a method of encoding a data set into an encoded data set comprising a header and a payload, the payload comprising a plurality of encoded data symbols representing information to be compressed, wherein a decoder is configured to decode subsets of the payload according to a predetermined decoding process, the method comprising: retrieving a variation parameter which indicates how the predetermined decoding process should be varied; encoding the variation parameter in a set of metadata elements into the header; encoding the information to be compressed into the payload according to an encoding process based on the variation parameter, such that the decoding process is optimised for the plurality of encoded data symbols. The variation parameter may indicate multiple subsets of the payload shall be decoded according one or more of the same decoding parameters. The variation parameter may indicate quantization is disabled, such that the plurality of encoded data symbols are not quantized during decoding. The encoded payload may comprise a plurality of data structures each comprising metadata and a plurality of encoded data symbols, wherein the metadata indicates features of the data structures, encoded data symbols or both, and wherein the variation parameter indicates that expected optimisations on the metadata of the optimisation process have not been performed. The predetermined encoding process may expect the payload to comprise a plurality of data structures each comprising metadata and a plurality of encoded data symbols, wherein the metadata may indicate features of the data structure, encoded data symbols or both, and wherein the variation parameter indicates the encoded data structures comprise only data symbols and do not comprise metadata. The variation parameter may indicate groups of subsets of the payload are encoded according to the same encoding parameters. The variation parameter may indicate an encoding parameter for the payload is signalled explicitly in the encoded data set and is not signalled by reference. The payload may comprise a plurality of subsets, each subset being encoded according to a set of encoding parameters, and wherein the variation parameter indicates that an indicator element of the encoded data set that indicates which set of encoding parameters have been used for a subset references a list of tuples of a plurality of lists of tuples, each element of the tuple referencing a parameter used from a different set of parameters. The payload may comprise a plurality of subsets, each subset being encoded according to a set of encoding parameters, and wherein the variation parameter indicates that an indicator element of the encoded data set that indicates which set of encoding parameters have been used for a subset is a reference to a set of parameters from a plurality of different sets of parameters.

According to a further aspect of the invention there may be provided an apparatus for encoding a data set into an encoded data set comprising a header and a payload, the payload comprising a plurality of encoded data symbols representing information to be compressed, wherein a decoder is configured to decode subsets of the payload according to a predetermined decoding process, the apparatus comprising a processor configured to carry out the method of the above aspect.

According to further aspects of the invention there may be provided computer readable media which when executed by a processor cause the processor to perform any of the methods of the above aspects.

DETAILED DESCRIPTION

Examples of systems and methods in accordance with the invention will now be described with reference to the accompanying drawings, in which:—

FIG. 1 shows a conceptual diagram of an index used to indicate multiple parameters to decode a data structure;

FIGS. 2A-C show a simplified bytestream for transmitting a hierarchical data structure;

Figure 1:
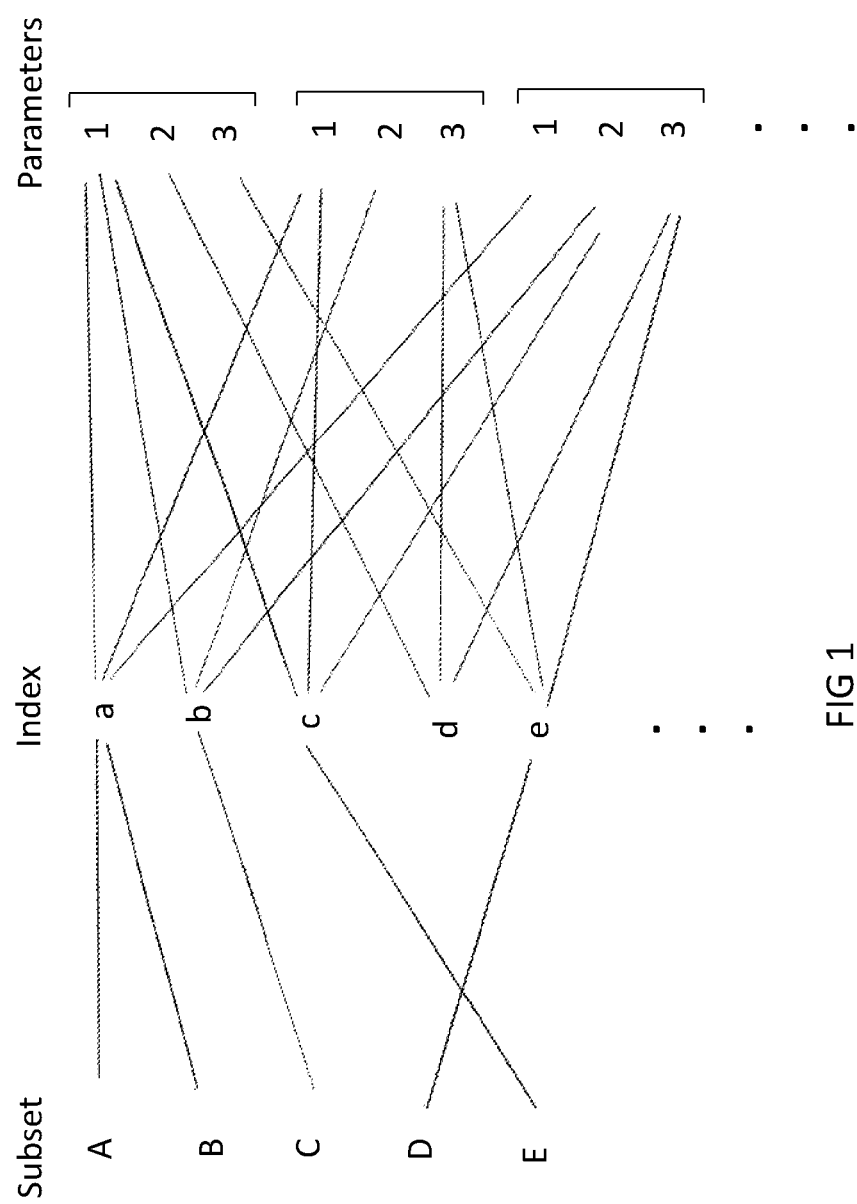

The present invention provides a technique and apparatus for encoding, and decoding, data, in particular image and video data. In the concept described herein it is proposed to divide a bytestream or bitstream into a plurality of subsets each of which are to be decoded separately. It is proposed that parameters to enable or facilitate decoding of those subsets are signalled elsewhere in the bytestream. The bytestream includes a pointer or indicator associated with each subset that enables the decoder to retrieve a set of parameters from elsewhere which should be used for that associated subset. Advantageously, each of the subsets are grouped according to their common features to facilitate optimal processing of those subsets.

Thus it becomes possible to reduce the signalling required to process and decode similar subsets separately. This and other benefits of the proposed technique will be outlined below.

Optionally for these purposes it may not matter what the subsets of the bytestream represent. For example, the subset may represent data values or residual values that may be used to recreate an image plane or the subset may be metadata which describes either another subset in the stream or describes an aspect of the image plane or some other data. The technique allows for any subset to be selectively encoded and decoded using specific metadata without unduly increasing overall bytestream size.

The decoding parameters retrieved according to the indicator may be signalled separately within the bytestream itself or they may be retrieved from a store at the decoder, with the bytestream providing an indication of which parameters should be used from that store. For example, the indicator will point to an entry in a table and function much like an index. The indicator may be sent in the header of the bytestream, in a different subset of the bytestream to that to be decoded and associated with each subset through a predetermined mapping, or optionally together with subset and located primarily in the bytestream for ease of association.

Throughout the present description the terms index, index value, indicator, indicator value, attribute index, attribute indicator and attribute key will be used interchangeably to refer to the reference that is used to signal to the decoder which set of parameters should be used to facilitate decoding a particular subset. The parameters may be referred to as decoding parameters or attributes.

Specific decoding parameters will be described throughout the present description however examples of categories of metadata that might be required for decoding each subset include:

Statistics metadata used for decoding a particular type of data structure;

Quantization parameters metadata used for decoding that data structure; Statistics metadata used for decoding a metadata part of a data structure in conjunction with a data part of a data structure which uses different statistics; and, Auxiliary attribute metadata used with a data structure, for example to signal to the decoder that the data structure represents a particular feature such as a car or sky or any other auxiliary or auxiliary metadata to selectively signed information from the encoder to the decoder for a group of subsets.

In each indicator there may be multiple index values, each index value of the indicator referring to a single parameter to be used. However, preferably, each indicator will refer to a set of parameters each having a different function or type. That is, the indicator may be a set of values each indicating which parameter from a set of parameters of each type to use or may alternatively be a single indicator which refers to multiple parameters of different types. For example, the functions may be quantization parameters and multiple different types of statistics used for decoding each data structure, where each data structure comprises different types of symbol encoded using different encoding entropy encoding techniques. This will become clear from the examples below.

Table 1 shows conceptually how an indicator may refer to multiple parameters. If the bytestream signals that an indicator should be used for a particular subset then the decoder may use that indicator or index to identify which of a set of parameters should be used for that subset.

TABLE 1

| Indicator | Statistics Metadata #1 | Quantization Parameters | Statistics Metadata #2 |
|---|---|---|---|
| a | 1 | 1 | 1 |
| b | 1 | 2 | 2 |
| c | 1 | 1 | 2 |
| d | 2 | 3 | 3 |
| e | 3 | 3 | 3 |

As shown in Table 1 for example, an indicator value of a may correspond to a first set of statistics 1 for one type of symbol from a set of three possible statistics metadata (1,2,3), a set of quantisation parameters 1 from a set of three possible quantisation parameters (1,2,3) and a set of statistics 1 from a set of three possible statistics metadata (1,2,3). Thus the decoder is able to identify which of a set of three should be used for each parameter when decoding a particular subset of the bytestream. It will of course be understood here that the numbers are merely exemplary.

FIG. 1 illustrates conceptually the principle of the attribute indicator. On the left of FIG. 1 are shown five subsets of a bytestream. Each of the five subsets corresponds to a data structure. Within a bytestream, there may be included an indicator value. Here again we show five index values. Subsets A and B are each associated with indicator value a. That is, indicator value a is sent and associated with subset A and B. Similarly, subset C is associated with indicator value b, subset E is associated with indicator value c and subset D is associated with indicator value e.

Each of the indicator values point to a set of parameters which can be used for decoding. For example, indicator a points to parameters {1,1,1}. Indicator b points to parameters {1, 2, 2}. Thus, within the bytestream the indicator is signalled and the decoder can interpret this indicator and retrieve a set of parameters according to that indicator for use in decoding each subset. Thus, within the bytestream, the decoded will identify the indicator a that corresponds to subset A. The decoder will retrieve the parameters {1,1,1} in order to appropriately decode the subset A from the bytestream.

Each indicator in the bytestream may be difference encoded. That is, the indicator value may be calculated based on the difference between the current indicator and the previous indicator. For example, if a first data structure A has an indicator a, then the indicator value transmitted in the bytestream for data structure B may be sent as indicator value b-a. Where data structures correspond to neighbouring sections of the information to be compressed, the statistics are likely to be similar. Therefore, the difference encoded indicator value may in fact be 0 where the statistics are the same, which reduces the metadata needed to be transmitted to signal multiple decoding parameters to the decoder. This significantly reduces the size of the bytestream. An example of where this is useful may be for example an image of the sky where neighbouring data structures each have a similar profile of blue data and are likely to have similar decoding parameters. To decode these indicator values, the decoder must store the previous indicator value and sum the indicator values to derive the indicator value associated with the subset in question.

There are numerous advantages of the described technique. For example, the technique provides for the reduction in metadata signalling—it becomes possible to signal decoding parameters only once while still enabling differential encoding of subsets of the bytestream. Additionally, it becomes possible to group together spatially different but statistically similar clusters or regions. This is an improvement on any statistical-based clustering technique which possibly provides statistics based on a grouping of regions within a grid. Further, by grouping the statistics together, entropy encoding efficiencies can be achieved.

By selectively sending quantization parameters grouped by an indicator, different regions of information can be selectively quantized. This enables regions which are important to be quantized to a higher quality, for example where there is an edge in the information or where the readers eye might be drawn to a low quality, importantly, without introducing an overhead to the data size as the quantization parameters can be sent only once and referred to by the indicator for a particular subset or region.

Where the subsets are grouped together, multiple different types of parameters can be used and signalled for each region using only one reference (i.e. index). This further reduces the metadata overhead. Similar regions are likely to have similar statistics and quantization parameters, which further reduces the overall bytestream size.

Another advantage lies in the ability to, without increasing the metadata overhead, make frame, plane or level of quality based decisions on the encoding and decoding. Finally, selective entropy encoding is possible to improve decoding speed and or detail.

The concept of an attribute indicator which informs the decoder of a set of attributes or parameters used to decoding subsets of a bytestream will now be described in the context of a technique for hierarchically encoding a sparse plane of an image or video into a data stream and recreating that plane from an encoded data stream so that the data stream can be separated into subsets with each subset being decoded separately.

A hierarchical structure is proposed comprising tiers. For a tier of a first type, a first type of data element is defined comprising a subset of the set of encoded data; and for a tier of a second type, a second type of data element is defined comprising one or more attributes associated with the first type of data element. The location of the first type of data element in the recreated array is determined from the information contained in the second type of data element.

By defining the data structure required to map the instances of where residual data occurs within a frame of data, it is possible to provide a faster decoding and encoding methodology. Furthermore, the data, and metadata describing the structure of the data allows for individual portions of the frame to be selectively decoded without reference to other portions of the frame. Thus it is possible to parallelise the decoding process. The technique further reduces the data in memory, for example by allowing data in memory at an instant to be a subset of the data for the whole plane.

Typically the data can be of any nature as long as the values can be mapped into an array, although the techniques are also applicable to linear data and most beneficial for image reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream. Residuals are further defined in the present application, but in general residuals refer to a difference between a value of a reference array and an actual array of data.

It should be noted that techniques described in the following description are agnostic as to the meaning or use of the decoded array. Rather the concept of decoding a sparse array from an encoded bytestream is discussed, for example. Of course, the data set may be used to reconstruct a larger dataset by combining multiple decoded data sets. Once recreated the data may represent any information which has been compressed, such as an image or sonogram.

As implied above, the techniques described here relate to the general principle of separately decoding data structures using information contained within a different data structure. An alternative way of considering the techniques described is that the techniques provide for the "breaking-up" or deconstruction of a graph to allow for separate decoding of sections of the graph. That is, an unbroken graph can be broken into a series of graphs or separate data structures which can be separately decoded.

The techniques described herein provide for the benefits that when such broken data structures are sent separately they can be correctly put back together in the graph and further that the total data transmitted can be reduced by implicitly signalling data structures which represent consistent values, e.g. sparse data.

To provide these benefits the technique maps subsets of a datastream onto a data structure, such as a tree. In other words the technique creates a data structure of 'pieces', the data structure storing the spatial information. If the data structure is a tree, the technique could be considered to be a hierarchical 'tree of pieces'. To recreate the data, the pieces can be mapped to a data structure to create a data structure of the pieces which stores the spatial information. The process can be recursed for more tiers in the hierarchy.

Figure 2A:
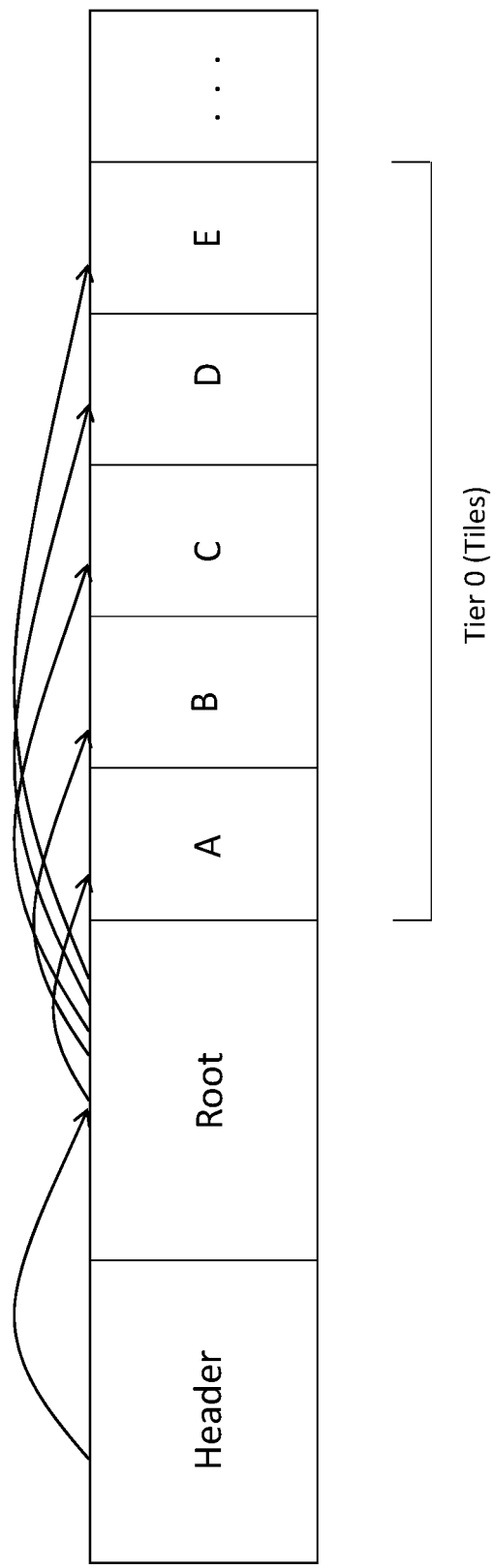

FIG. 2A illustrates an exemplary representative bytestream or bitstream. These latter terms will be generally used interchangeably throughout the specification. The illustrated bytestream is simplified and representative of an implementation only. The bytestream is divided into a root tier and a Top tier. The root tier contains attribute metadata relating to the Top tier. The Top tier contains data elements which map to the image to be recreated. An intermediate tier, not shown, may be provided where the root tier contains attribute metadata relating to the intermediate tier and the intermediate tier contains attribute metadata of the Top tier. As will be understood from the description below the order of the elements is representative only for understanding the technique.

FIG. 2B represents the data structures of the Top tier which will herein be referred to as the top tier, data tier, tile tier or tier 0, interchangeably. The bytestream of the data tier comprises a series of data structures, each comprising structure metadata and data elements. The data elements represent the information that has been compressed. As illustrated in FIG. 2B, certain parts of the information may not be included in the bytestream and may be implicitly signalled. The data structures of the data tier each correspond to a block of the array, or tile, as illustrated in FIG. 2C. FIG. 2C shows how each of the blocks map to a region of the array and that certain regions may not be included in the bytestream and instead are implicitly signalled.

The proposed tiered structure is visualised in FIG. 2 in a bottom-to-top structure. It will be understood that this is merely a visualisation used to aid in understanding the principles of the invention.

The hierarchical structure defines instances of when data is present (and therefore needs to be encoded) and provides a mapping to identify where such data is present.

The root tier contains a set of attribute metadata elements which indicate attributes of the subsequent tier. Based on the attributes, the decoder can identify if a data structure is included in the subsequent tier. Each attribute metadata element of the root corresponds to, or describes, a location of a data structure of the subsequent tier, that is, the attribute metadata element may include information about a data structure in the subsequent tier or may indicate that no data structure is included in that predetermined location. A defined mapping of the elements maps to a location in the data structure.

The root tier may optionally be a data structure itself. That is, the data structure may comprise structure metadata which describes the attribute metadata elements. In other words the data elements of the data structure are metadata (or attribute metadata elements) which relate to the subsequent tiers and the data structure comprises metadata (or structure metadata) which describes the metadata (or attribute metadata elements). The root tier may be referred to as a metadata tier. A metadata tier preferably contains metadata but no data, whereas a data tier contains metadata and data.

The root and intermediate tiers each demonstrate similar functionality. That is, the attribute metadata elements of the root tier each describe a data structure of the first tier (or lack thereof) and attribute metadata elements of the first tier each correspond to a data structure of the second tier (or a lack thereof). In other words, each attribute metadata element corresponds to a sub-grid of the overall grid to be decoded. That sub-grid either being represented by an additional tier of metadata elements, a plurality of data structures having data elements or that sub-grid may be void of data. As will become clear, void here refers to an area of the grid having a consistent value.

In the exemplary data structure and technique described, a plane of data is divided into a series of tiles, each having a set of dimensions. Throughout the present description we use the size 16×16 but this may be any size N×N. Depending on the size of the plane to be decoded, only a root metadata tier may be needed. For example, a root data structure storing attributes in a 16×16 array may correspond to 256 data structures in the top tier. If the top, or data, tier contains 256 data structures, each storing a 16×16 array of data symbols, then a 256×256 array can be mapped. The addition of an intermediate tier provides for the possibility of mapping a 4096×4096 array of data. If the array is a plane of an image, planes of data are suitable to decode UHDTV video streams.

The term tiles may be used interchangeably throughout the description to refer to the data structure of the data tier which is a subset of the bytestream used to represent the data values of the information to be compressed. The tile corresponds to a region of that information (or a grid) and comprises data symbols that may or may not be quantized and transformed and associated with corresponding metadata elements within the same data structure.

As indicated, each data structure of the data tier corresponds to a section of the array. It is contemplated that each data structure of the data tier may be decoded separately and in parallel. However, the data tier may possibly not be located within the array until the previous tiers have been decoded. Thus the technique provides a combination of serial and parallel processing.

Once the data structures in the data tier are decoded, the data elements of the data structures are optionally each mapped to the array in a predetermined order. A predetermined value is inserted in the information where the attribute metadata elements of the tiers below indicated that there is a void area. That is, when the data structures are arranged as visualised in FIG. 2 the attribute metadata elements of the previous tiers indicate there are no data structures sent in the bytestream for that position of the array. Each attribute of the lower tier describes a data structure (or lack thereof) in a particular location in the immediately higher tier.

The attributes stored in the data structure of the metadata tiers, i.e. the root tier and tiers-k, may comprise one or more of the following, non-exhaustive, list of attribute metadata elements:

a positive or negative flag indicating if a corresponding data structure exists in a subsequent tier;

the dimensions of a corresponding data structure in a subsequent tier;

information to enable the decoder to locate a corresponding data structure in a subsequent tier in the bytestream, such as: lengths of streams; an offset from the current location in the stream; or, a fixed location in the stream;

information to facilitate entropy decoding of a corresponding data structure in the subsequent tier such as indication of parameters to use in a range decoding operation; and, other parameters or attributes associated with a corresponding data structure in a subsequent tier in the bytestream such as quantization parameters or a predetermined value to be used where no data symbols are included in the data structure.

According to the present invention, instead of explicitly signalling each attribute metadata element, the attribute metadata element may be an indicator, or index, which refers to a set of attributes or parameters to be used. For example, a single indicator may be used to signal all of the dimensions, the statistics and the quantization parameters for the data structure of the data tier. The indicator and its corresponding attributes may be sent separately in the bytestream or be predetermined by the decoder by retrieving the attributes from a store. Thus, a data stream need only to send the indicator and its corresponding parameters (or attributes) once and then subsequently re-use those parameters throughout the bytestream, thus reducing the metadata overhead.

For completeness, the parameters themselves may be signalled in the bytestream separately and referred to by an indicator value so that they are only signalled in the bytestream once or they may be pre-coded into the decoder or may be retrieved from a separate store by the decoder and pointed to by the indicators signalled in the bytestream.

As mentioned above, each subset of the bytestream may be a data structure. It has previously been described in this document how multiple data structures may be sent within a bytestream and hierarchically encoded in order to separately decode each of the plurality of data structures. Thus, according to an example or implementation, the indicator value associated with each subset may be transmitted within the attributes metadata element of the lower tier. Such a concept is illustrated conceptually in FIG. 3.

Figure 3:
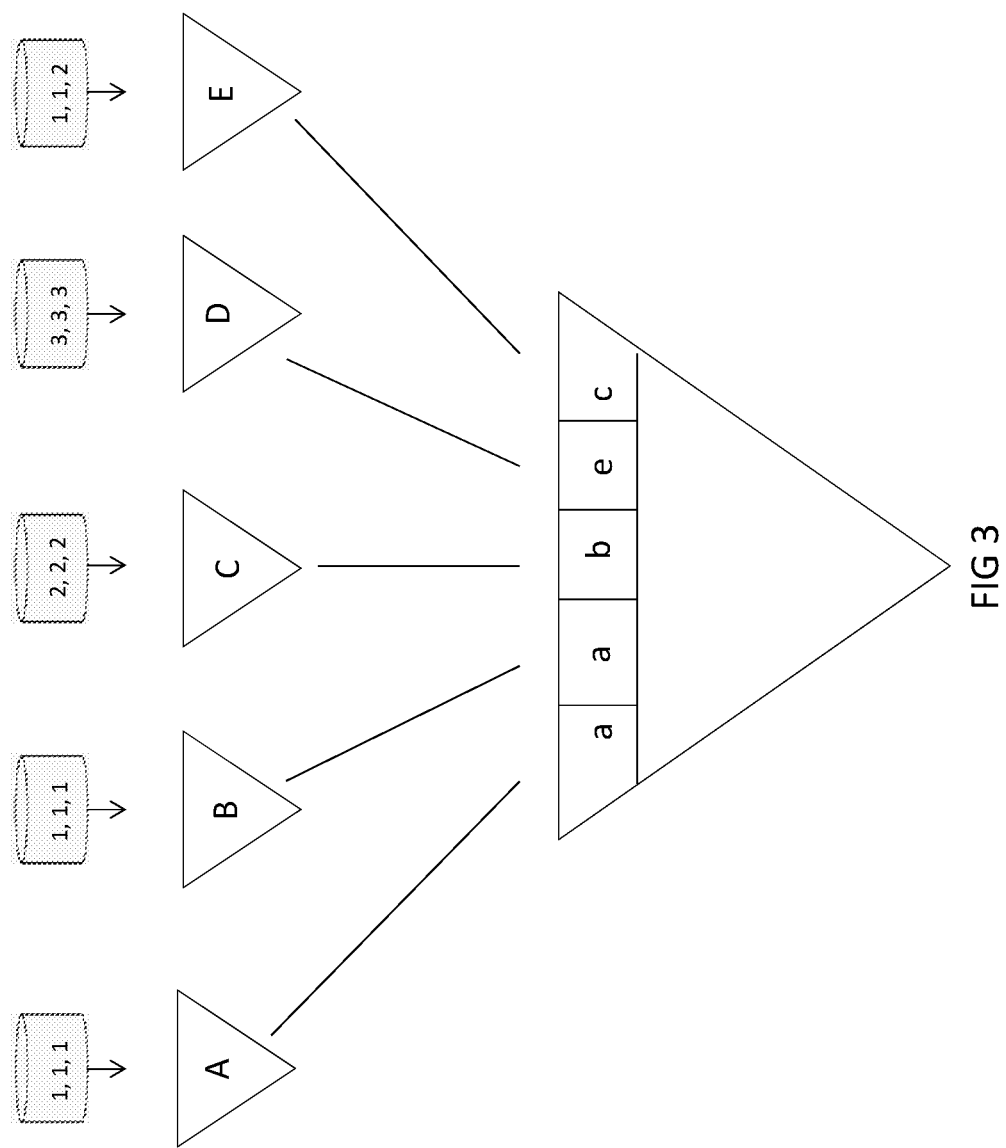
FIG. 3 shows the hierarchical data structure and the conceptual index values being associated with a data structure of a data tier.

FIG. 3 illustrates a root tier of a pyramid of pyramids in which the top layer of the first pyramid points to a data structure of a higher tier. Using the same notation of FIG. 2, the values in the top layer of the root tier are the indicator values here [a,a,b,e,c]. Once decoded, these indicator or index values can be used to retrieve a set of decoding parameters to decode each of the subsets of the higher tier.

The concept illustrated in FIG. 3 is that once the indicator is retrieved, each of the decoding parameters is retrieved from a database store in order to retrieve the parameters suitable for decoding that data structure indicated by the attribute indicator and the location of the attribute indicator within the hierarchical data structure.

The invention herein may be applicable to decoding any type of data structure. For example, any structure of decoded symbols. The indicator may be used to point to parameters to facilitate decoding of those symbols.

It is contemplated that each data structure may be any suitable data structure for encapsulating the necessary information and each of these attribute elements may be stored in the data structure in any known manner such as a tuple. For example, the attribute metadata in the root tier may be a relatively simple set of encoded bits, each indicating the attributes of the next tier. Similarly each data structure of the data tier may optionally be a tree to store the necessary data elements or any suitable data structure combination of metadata and data symbols used to encode the information.

The data structure of the top tier may preferably be a sparse quadtree as defined in GB1812407.3, the content of which is incorporated by reference in its entirety. The term sparse quadtree will be used throughout the present invention to refer to a data structure as specified in this document. The structure will be summarised below. The data elements of each N×N tile may be accurately, spatially located within the array when the tile is mapped to the array and the data elements which correspond to the sparse information within each tile may not be included, i.e. signalled implicitly, within the data structure.

Similarly, the data structure of the other tiers may also be a sparse quadtree. In this way, the attribute metadata elements may be the data elements of the top layer of the sparse quadtree which are each associated with (or describe) a data structure of the top tier. Where the sparse quadtree of the root or metadata tiers indicates that no attributes exist in the data structure in the top layer for a particular section of the data structure, optionally, the technique may insert a predetermined attribute that indicates that there is no data structure included for a corresponding part of the data tier. Alternatively, that attribute may be assumed or is implicit, thus signalling that no corresponding data structure is included in the top tier for that part of the array.

Alternatively, each quadtree of the root and first tiers may be a dense quadtree with the quadtree structure being used to locate the attributes in the top layer spatially to generate the higher tier but may not signal information implicitly.

In an implementation, each data structure may thus be an abstract data type, optionally of the sparse quadtree data type.

It will thus be understood that the benefits of the concepts described herein may be realised with any data structure in each tier. Nevertheless for clarity, the preferred implementation of the concepts in which the sparse quadtree is used in all tiers will be described throughout the examples given in the present application.

In the sparse quadtree data structure, once the tree is built, the Top Layer of the tree, or the final layer, may include data symbols. The order in which the data symbols are included in the tree represents the spatial information of an array. The sparse quadtree may retrieve any data element in the Top Layer depending on the tier in which it is used. For example, the sparse quadtree data structure may include a list, tuple, set or integer.

When the sparse quadtree data structure is used for the data tier, the bytestream will include data symbols to recreate an array and in the metadata tiers may include a tuple representing the attributes. As that array is located within the tiered structure defined above, the array is located in a larger array from the tiered structure.

We are illustrating the concepts using a quadtree to recreate a 16×16 array of data and therefore there are four layers and a root in the tree giving 256 possible leaves, each representing a value in the 16×16 gild. Other sized grids may utilise different ordered trees.

The following sets out an example process of decoding an exemplary sparse quadtree data structure. During the process of decoding, an ordered tree is built. Code symbols from the bytestream are converted to decoded symbols and attached to nodes of the tree. The data structure introduces a special symbol which is used by the decoder to build the tree. We refer to this special symbol here as a node symbol. The node symbol indicates to the decoder how to build the tree. Within the node symbol is information which tells the decoder how to map the information from the bytestream to the tree and what it can expect in the bytestream. Using a specific traversal order, the decoder maps the node symbols to the tree and can subsequently map the data received in the bytestream to leaves of the tree in the correct locations. The spatial information or the order of the original information is then contained within the tree. The mapping of the node symbols and traversal leaves blank spaces in the tree which can be simulated or inferred to indicate that a predetermined value was in that location in the original information but was not sent in the bytestream.

The node symbol is a series of binary values or flags that indicate to the decoder if a particular branch in the tree has an expected child where the branch has an expected child if there is a node included in the data set for the Top Layer descendants of that branch. That is, the bytestream contains information on the existence of a child node or not. \Mien the decoder traverses the tree to reach a leaf (a node in the Top Layer), the bytestream contains a series of elements, such as four data symbols or four attribute metadata elements (e.g. a tuple), each representing a value of the leaf of the tree. The tree can be subsequently mapped to a grid using a defined order with each leaf on the tree corresponding to a location in the grid. If the sparse quadtree is a structure in the metadata tier, the attribute metadata element is not mapped to a location in the grid but instead is mapped to the data structure.

Within the bytestream, the node symbols of the data structure are interspersed. That is, the node symbols and data symbols (or attribute elements) occur between or amongst one another within the bytestream. A feature of the data structure is that the decoder cannot know the order of node symbols and data symbols (or attribute elements) prior to the decoding process. Thus there is no set or predetermined ordering to the interspersal of the information. The location of the data symbols (or attribute elements) is deduced from the information contained within the node symbols. The node symbols and data symbols (or attribute elements) may not occur within the bytestream one by one or regularly but rather will be present within the bytestream irregularly and sequentially, but not randomly.

The same traversal is used in the decoding as the encoding to ensure that spatial information is retained. Thus, the sparse quadtree data structure defines the instances and location of the elements. Preferably the tree is traversed according to a depth-first pre-order traversal and, in the data tier, the data symbols are mapped to an array according to a Morton order but any other order may be used provided the encoder and decoder agree. In the metadata tier, the Morton order can be used to associate the attribute metadata elements with the data structures of the subsequent tiers.

Figure 4:
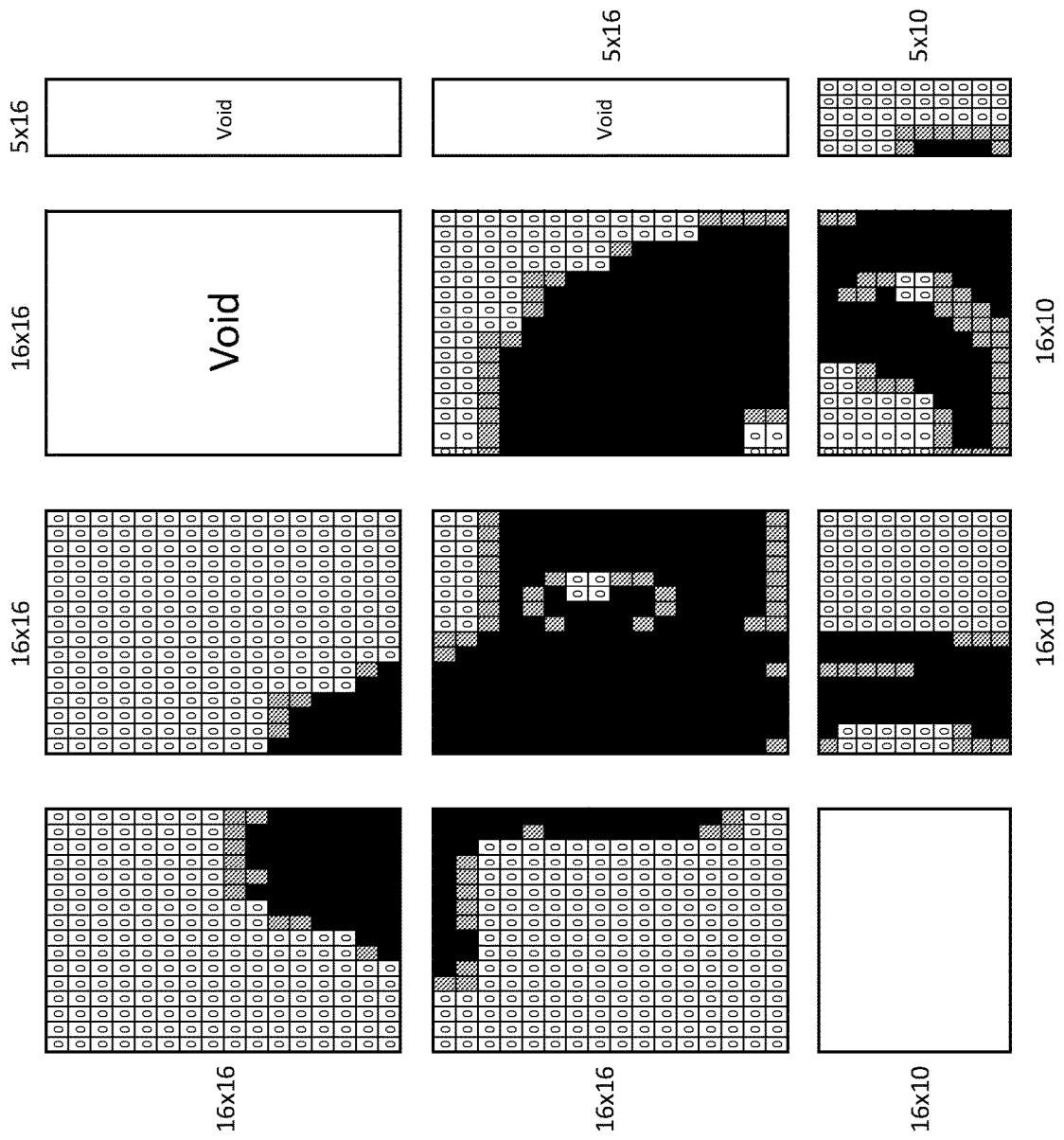
FIG. 4 shows a diagrammatic illustration of an image plane separated into subsets.

FIG. 4 illustrates an image that will be used throughout the present description. The image reflects both the data to be encoded as well as the reconstructed image. It will of course be understood that the image is a simplified plane of data that could represent residual data or component data of an image.

As can be seen, there are four regions of the image that are void of data, that is, are entirely sparse, and eight regions that contain data elements.

In the exemplary data structure and technique described, the plane of data is divided into a series of tiles, each having a set of dimensions. Throughout the present description we use the size 16×16 but this may be any size N×N. In this simplified example, only a root tier and top tier (or data tier) may be included in the bytestream and accordingly we will omit discussion of any intermediate metadata tier.

Figure 5:
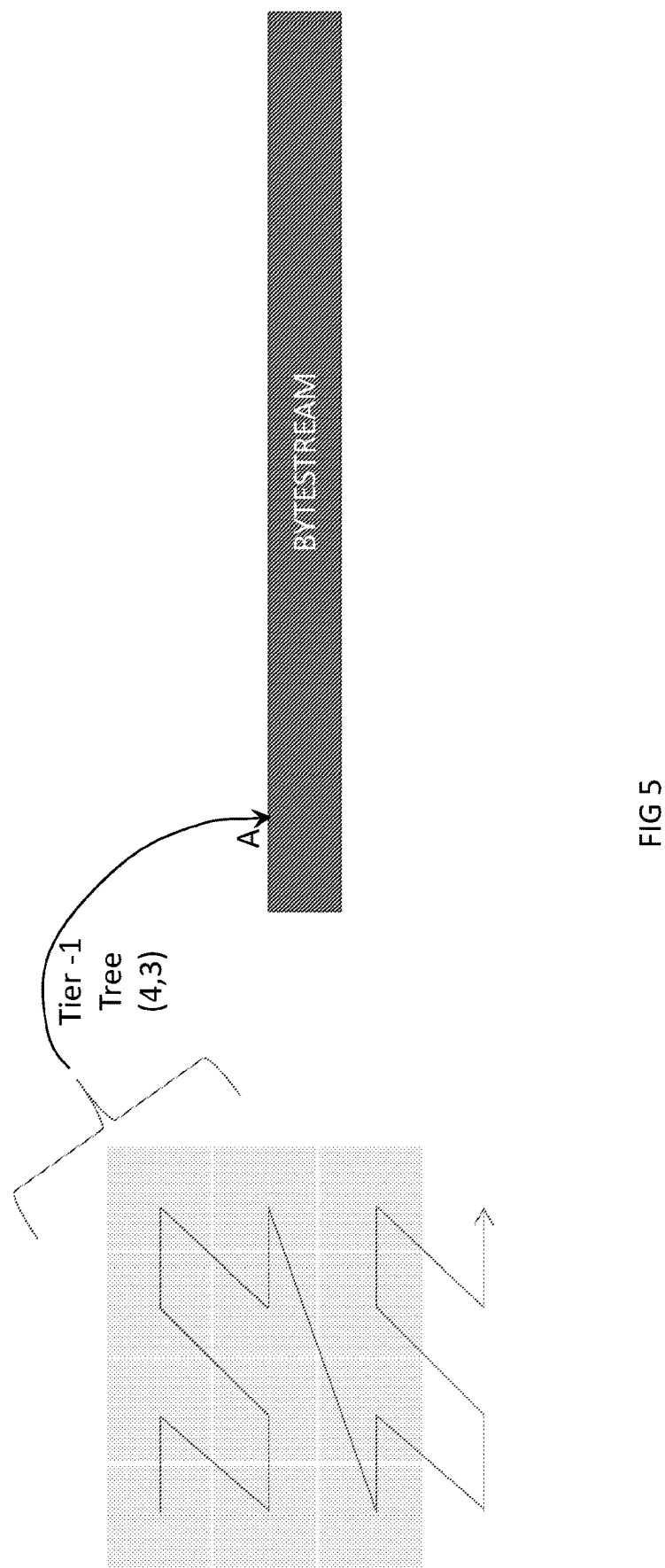
FIG. 5 illustrates a root tier mapped to a bytestream.

FIG. 5 shows schematically the 12 grids that may hold data of the Surface of FIG. 4, where the term Surface represents a plane of data or other large array of data. FIG. 5 also depicts the bytestream.

First, the start location of the root tier may be signalled in a header of the stream. This may take the form of an offset A from the start of the bytestream as shown in FIG. 5.

Second, the decoder may start to read a data structure from the stream corresponding to the data structure of the root tier.

The decoder may start to read a data structure with a dimensions tuple (4,3) which contains metadata about all the 12 gilds. The dimensions may be signalled separately, either in the header or elsewhere. The concept of dimensions of the grid will be discussed in more detail below. As will be clear from the discussion below, the signalled dimensions may be of the root data structure in which the root data structure then contains the dimensions of the subsequent data structures or may be derived from a signalled dimensions tuple of the plane of data that is encoded in the hierarchical structure.

Figure 6:
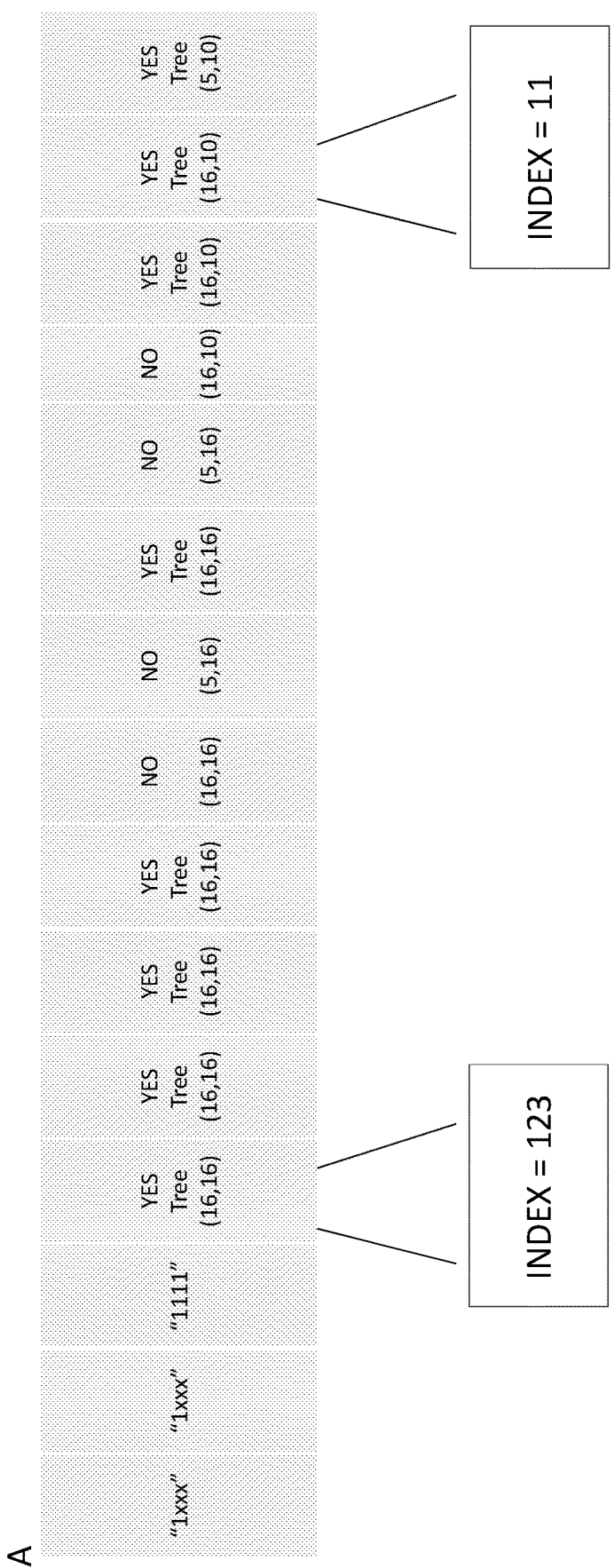
FIG. 6 illustrates a root tier bytestream portion.

FIG. 6 illustrates the data structure of this example and shows schematically the structure of the part of the bytestream starting at offset A and describing the root tier. It will be seen that the bytestream comprises three node symbols followed by metadata about data structures that possibly convey actual data. In this diagram, YES stands for metadata that indicates use of the bytestream to convey data and NO stands for a void data structure, absent from the bytestream, since its entire data are implicit zeros.

Some digits of the node symbols in FIG. 6 have been masked with an "x". This is connected with the dimensions of the array (4,3) being smaller than (16,16) which is the dimensions of the quadtree made possible by the sparse quadtree data structure having 4 layers. Masked digits indicate that the corresponding child itself is inactive and automatically has zero children. The values of these masked digits play no role in decoding and can be optimized by an encoder to minimize entropy.

FIG. 6 is supplemented to show how the attribute metadata elements may also comprise an index value which refers to the decoding parameters suitable for decoding a particular subset.

In the following description active will mean unmasked and representing data in the compressed information and inactive will mean masked and including optionally transmitted data outside the information to be compressed.

Figure 7:
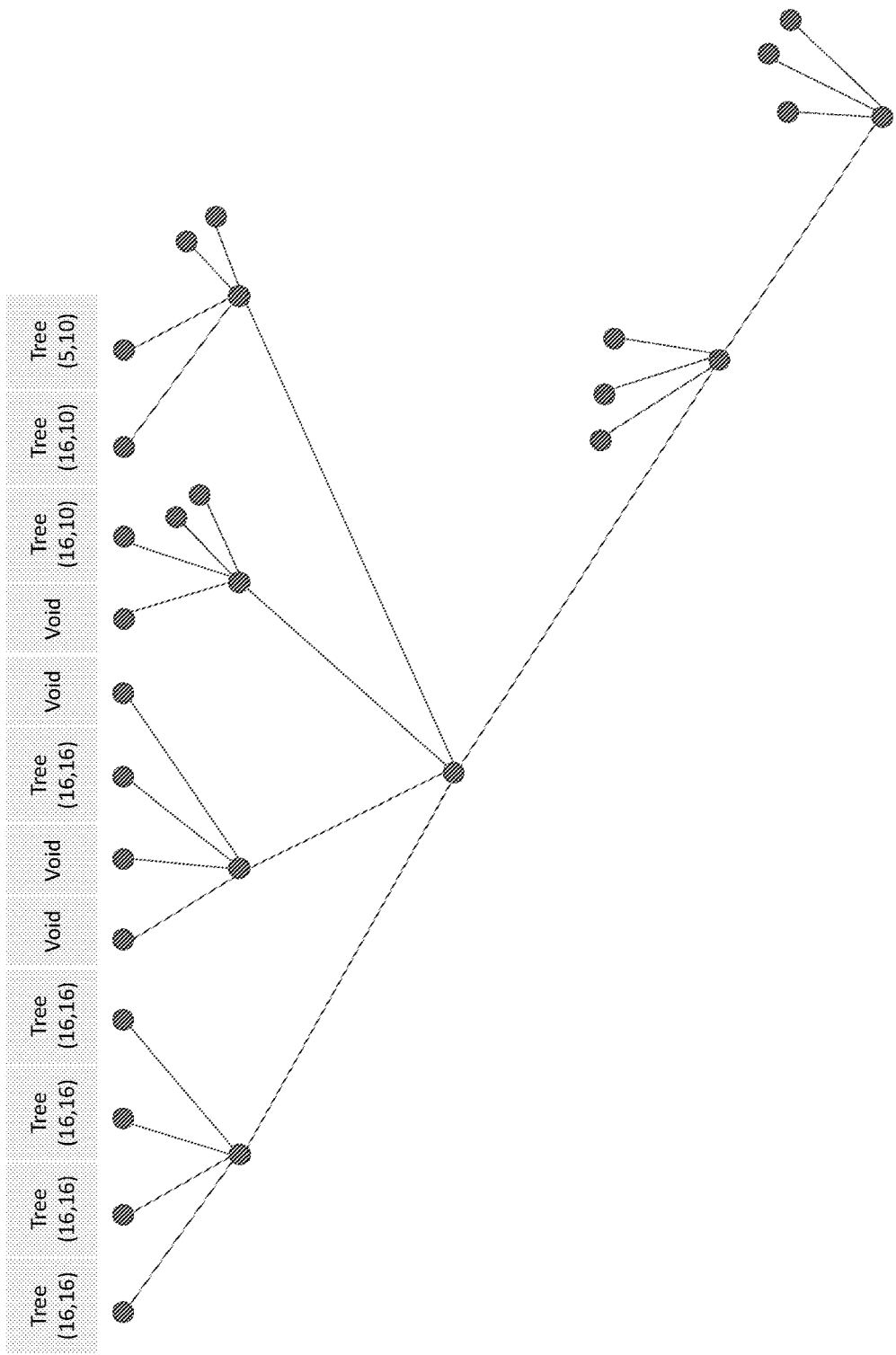
FIG. 7 illustrates a root tier data structure.

FIG. 7 illustrates the process by which the data structure of the root tier is built from the bytestream. The process begins to build a tree and assigns a root node. The node symbol [boa] is read from the bytestream. The first flag, 1, indicates that further information for this branch is included in the bytestream. The three masked flags are a result of the other branches of the root node of the data structure being inactive.

The decoder detects inactivity from the signalled dimensions and implements masking by a rule during depth-first discovery. The decoder masks bits in the first node symbol that correspond to inactive children. For an active child, it assigns the appropriate quadrant, every time a new active node is placed.

Following a depth-first pre-order traversal (as pre-agreed with the encoder) the traversal visits to the next node of the tree. Again referring to FIG. 6, we see that the next node symbol is [1xxx]. As with the root node, this gives one active branch and three inactive branches.

The depth-first pre-order traversal then visits the next node. The next node symbol is read from the bytestream which is [1111]. This indicates that there are four branches in this layer of the tree, each having a child and grandchild node.

In the data structure of a sparse quadtree, the next layer of the tree is optional. The node symbols that correspond to the penultimate layer in the tree are not sent but rather are implicitly assumed by the decoder. It will be understood that the node symbols in this layer would be understood to include a set of positive flags (or [1111]). Another way of looking at this implicit signalling feature is that a node symbol is sent or included within the bytestream only if a grandchild node exists for the visited node of the tree. In other words, a node symbol shall have a grandchild node.

Accordingly, the decoder knows that the next symbol to be expected from the bytestream is an attribute metadata element representing an attribute of a data structure of the subsequent tier, as it has reached the top layer of the tree following the depth-first pre-order traversal.

Since we are in the root tier, the decoder retrieves the attribute metadata element (for example a tuple of attributes) from the bytestream and associates the element with the node in the top layer. Following the depth-first pre-order traversal and the implicitly signalled penultimate layer, the next three elements to be decoded from the bytestream will also be attribute(s) of the data structures in the subsequent tier.

Descending the tree the decoder will see that the node symbol was [1111] indicating that the next branch is active and there are data symbols in the bytestream for this branch. The decoder ascends the tree until the Top Layer is reached. Here again, the next four attributes will be retrieved from the bytestream and associated with the next four nodes of the tree.

Descending the tree the decoder will see that the node symbol was [1111] indicating that there are data symbols in the bytestream for this branch. However, the signalled dimensions imply that only two of the branches of the penultimate layer are active. Accordingly, the decoder will retrieve only two attributes from the bytestream.

Again, descending the tree the decoder will see that the node symbol was [1111] indicating that the next branch is active. However, the signalled dimensions imply that only two of the branches of the penultimate layer are active. Accordingly, the decoder will retrieve only two attributes from the bytestream. This section of the top layer has now been filled.

Following the depth-first pre-order traversal, the decoder descends to Layer-3. Since this layer only indicates one branch and this branch has already been visited, the process of building the ordered tree will end as all nodes have been visited and populated.

FIG. 7 shows 10 inactive nodes (on dashed branches). During discovery of the tree's topology, metadata as well as node symbols were encountered. This information (or attributes) about other data structures is passed through as elements which are depicted (unchanged from FIG. 5) above certain top layer nodes of the tree.

Figure 8:
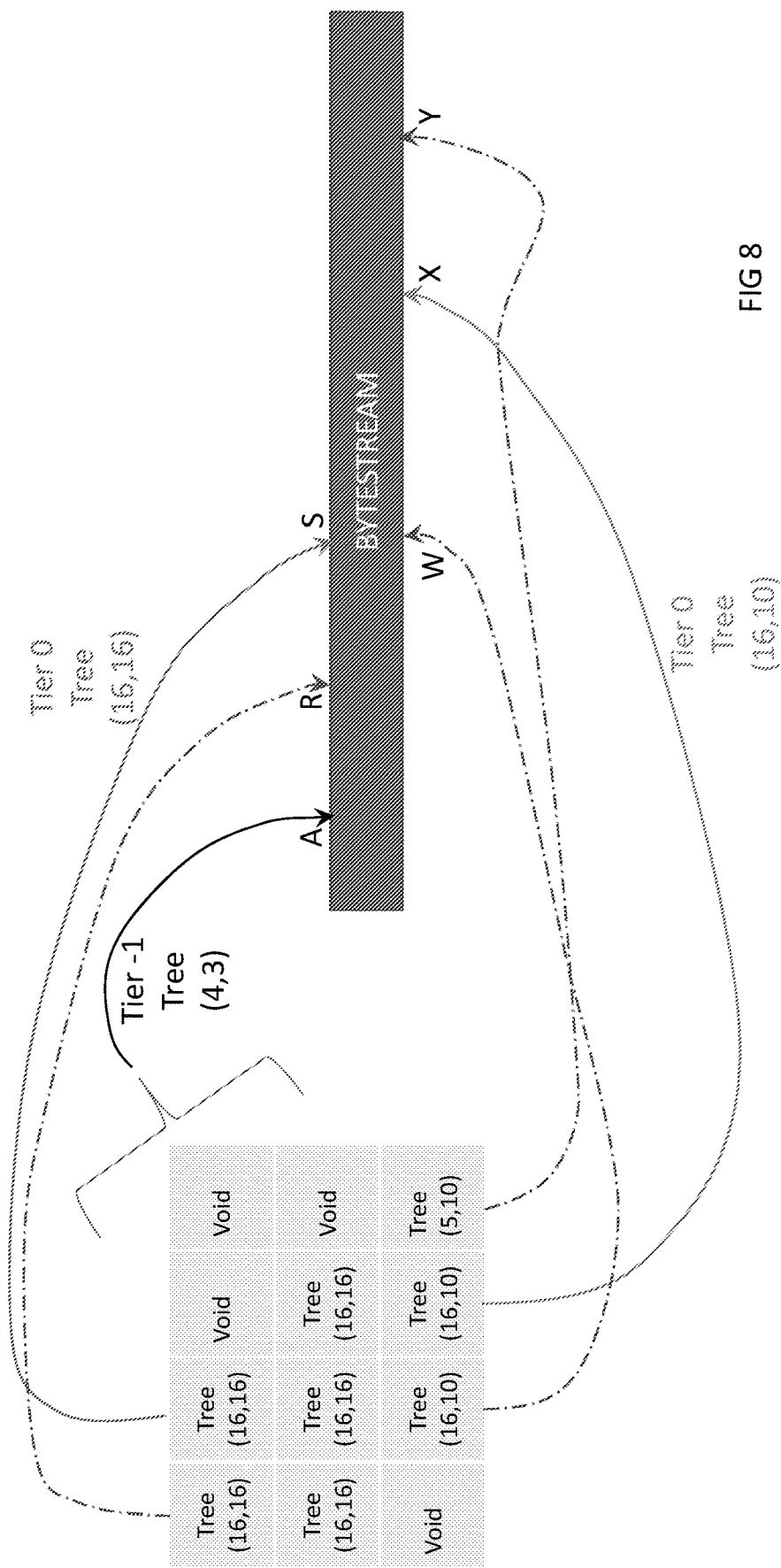
FIG. 8 illustrates attribute metadata elements mapped to bytestream.

These elements are now allocated to a 3×4 pattern as shown in FIG. 8. The scan order is called Morton order and is illustrated in FIG. 5. Note that four vertices on the path shown in FIG. 5 are inactive. This is reflected in FIG. 7 by the corresponding inactive nodes in the Top Layer of the tree.

The values in the stream shall be interleaved in the example in depth-first order. In the example, the data of the tree is mapped in a Morton ordering. A Morton ordering maps multidimensional data to one dimension while preserving locality of the data points. It was introduced in 1966 by G. M. Morton. The terms Z-order, Lebesgue curve, Morton order or Morton code are used in the art.

Morton ordering is well known in the art and will be understood. It will also be understood that any suitable mapping of the data from the tree into the grid may be utilised.

In practice Morton ordering using 2×2 blocks means that the symbols of the tree are mapped to the grid in the following example order for an 8×8 grid:

| 0  | 1  | 4  | 5  | 16 | 17 | 20 | 21 |
| 2  | 3  | 6  | 7  | 18 | 19 | 22 | 23 |
| 8  | 9  | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

When considering the mapping of the tree to the pattern, it can be considered that the z-order mapping results in each branch of the tree being a quadrant of the overall array.

While a Morton ordering is a preferred ordering, it is also contemplated that other orders such as a Hilbert space-filling curve, also known as a Hilbert pattern or Hilbert curve, may be used which may provide implementation or efficiency gains depending on the array to be compressed and the likely locations of non-zero elements in the array. In certain circumstances the Hilbert curve ordering will also have better locality preserving behaviour.

FIG. 8 illustrates how the pattern of attributes mapped from the root tier corresponds to data structures received in the bytestream and the order in which the data structures are received in the bytestream.

At this stage of the process, the decoder knows the order of each of the data structures of the top tier in the bytestream. The decoder knows where there are void areas of the array where no data structures are included in the bytestream and accordingly knows how to arrange the data elements of the data structures once the data structures have been decoded.

Accordingly, each of the data structures in the data tier can now be decoded and their encoded data added to the array.

In decoding this data structure, the decoder follows the sparse quadtree decoding technique. The reader will be reminded that while it is described that the data structures of this tier are sparse quadtrees, the data structures may be any suitable data structure suitable for spatially locating data elements within in an array. From the decoding process above, we know where the data of this data structure will be stored in the wider array. The sparse quadtree data structure of this example stores a 16×16 array of data and accordingly includes five layers: a data or top layer, layer-1, layer-2, layer-3 and a root layer.

As illustrated in FIG. 6, the attribute metadata for the fourth element in the bytestream is an index value {123}. When this is mapped into the tree of FIG. 7, it can be seen that the first node in the outer layer will have this corresponding attribute metadata element. Using the predetermined mapping order, and as illustrated in FIG. 8, the attributes can be mapped to a corresponding data structure retrieved in the bytestream and that bytestream decoding using the indicated parameters.

Returning to FIG. 4, this figure shows the reconstruction of all the Tiles into a decoded image of a horse. It will be recalled from the Morton Order of illustrated in the path of FIG. 4 that this is the bottom right and is included last in the bytestream, starting from position Y of the bytestream shown in FIG. 8. For brevity we have not described in detail the content of the bytestream between the end of the root tier at position R to the beginning of the final data structure at position Y. The content of these can be deduced from the horse image and from following the process describes above.

In order to decode each data structure in parallel, the start location of each data structure to be decoded may need to be known. In certain embodiments, the data structures of the top tier may be of a fixed length so that the decoder may predict the locations of each structure. Alternatively, the start locations of each structure may be separately signalled. In preferred embodiments the attributes of each data element included in the lower tiers indicate to the decoder how to decode the corresponding data structure. For example, the attribute may include the start location of the data structure within the stream and also may indicate that the data structure is not included at all as was explained above. The attribute may accordingly be a 0 value if the corresponding data structure is not included in the stream and may be a positive value indicating the start of the data structure.

It has been described above how optimally a data structure may be constructed and decoded to incorporate a set of interspersed node symbols and data symbols. Once the symbols have been output they may be subsequently entropy encoded. The encoded stream may be entropy decoded before the set of symbols are processed. For example, the symbols may be divided into codes which are then encoded using a Huffman encoding and decoding operation. Alternatively, the stream of symbols may be encoded and decided using an arithmetic coding operation, such as a range encoding and decoding operation. These and other similar entropy coding techniques are well known in the art.

Entropy coding is a type of lossless coding to compress digital data by representing frequently occurring patterns with few bits and rarely occurring patterns with many bits. In broad terms, entropy coding techniques take an input codeword and output a variable-length codeword using the probability of the input codeword occurring in the data set. Therefore, the most common symbols use the shortest codes. The probability information is typically stored in metadata used by the decoder to recreate the input information from the output codeword.

The attributes may include probability information directly or may alternatively, and preferably, indicate to the decoder which of a set of probability information should be used to decode that particular data structure referenced by the attribute. The probability information may be stored in the decoder or may be signalled separately in the bytestream.

An entropy decoding operation may retrieve metadata from a store of metadata corresponding to the attribute signalled. The metadata may include decoding parameters for example and may include an indication of probability. For example if the decoding operation is a range decoder, the metadata may include a probability distribution or cumulative distribution function.

In an implementation, one entropy decoding operation may sequentially decode the data structures or multiple entropy decoding operations or modules may be used. In practice, each data structure may be decoded using a different type of entropy decoding for example, the attributes may indicate that a data structure is encoded using Huffman encoding and a separate data structure is encoded using arithmetic encoding. Preferably though, a range decoder is used with the attributes indicating to the range decoding module used to decode the data structure, which set of metadata should be used to decode that data structure.

The following describes an improved and innovative technique for entropy coding a bytestream. Immediately above we described how the process of decoding, once performed can then be applied to a process of de-sparsification to identify sparse areas of an array and accurately locate values in the array. The described operation couples the de-sparsification and decoding steps together.

Figure 9:
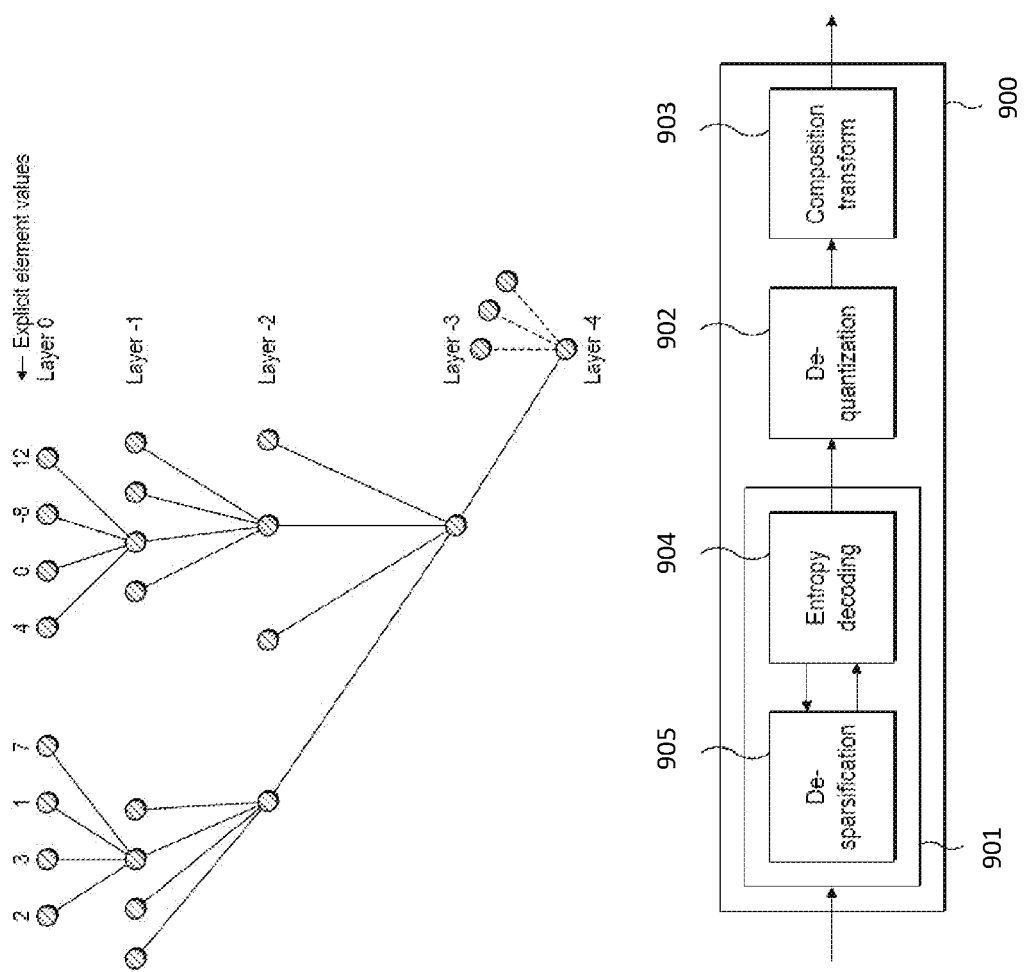
FIG. 9 illustrates an overview of coupled de-sparsification and decoding modules.

A high level overview 900 is shown in FIG. 9. After the bytestream is decoded in a decoding operation 901, an output plane of data undergoes a dequantization 902 stage and a composition transform 903 stage. The composition transform stage 903 and de-quantisation stage 902 are known in the art. For example the composition transform stage 903 may include a directional transform of a plane as described in WO2013/171173 or a wavelet or discrete cosine transform. In these examples, the quantisation parameter may be signalled for that data structure by the attribute metadata elements which include an index value.

It is described herein that the decoding operation 901 may include two stages, that is, an entropy decoding stage 904 and a de-sparsification stage 905. The stages of the decoder are coupled together and are interrelated so as to efficiently identify the compressed information. The entropy decoding stage acts to decode a symbol from a stream of data. The de-sparsification stage acts to analyse the symbol and inform the entropy decoder what type of symbol is next to be decoded.

In preferred embodiments, the de-sparsification stage or module 1705 builds a tree as described above. The de-sparsification stage receives a symbol from the entropy decoder and builds the tree. The de-sparsification stage then, from the process of building the tree informs the entropy decoder what type of symbol to expect next, i.e. a node symbol or a data symbol. By analysing the node symbols in the manner described, the de-sparsification stage can identify that the next symbol will be a node symbol or a data symbol by following the tree traversal and identifying that no data symbol is expected for a branch of the tree where the node symbol includes a flag indicating as such.

The terms de-sparsification stage, de-sparification module and de-sparsifier may be used interchangeable throughout the present description to refer to the functionality of the module. Similarly, the terms entropy decoding stage, entropy decoding module and entropy decoder may be used interchangeably to refer to the functionality of that module. It will of course be understood that the functionality may be provided by a combined module or multiple sub-modules.

At the entropy decoding stage, the module has access to multiple sets of metadata used to decode different types of symbols using the entropy decoding operation.

The attribute index value indicates to the entropy encoding stage which metadata should be used for the different types of symbols. For example, the index may point to a first set for a node symbol and a second set for a data symbol.

First, the entropy decoding stage will first decode a symbol using a first set of metadata. The entropy decoding stage will then send that symbol to the de-sparsification stage. The entropy decoding stage will then wait to receive an indication of the type of symbol that is to be expected next. Based on the received indication, the entropy decoding stage will use a respective set of metadata according to the type of symbol expected in order to decode the next symbol using entropy decoding. In this way, different metadata can be used to decode a data set even when the data within the data set does not follow a predetermined pattern and the different symbol types are irregularly interspersed within the original data to be encoded or reconstructed.

Thus, here the index value will refer to two sets of metadata for decoding that data structure. The index will be set at the encoder according to which two sets are best for this data structure. Using the terminology above, the data structures are grouped according to their similar characterising and index sets for each group. Thus, only an index needs to be set. The metadata needs only to be set once or stored and not set multiple times.

It will of course be understood that instead of using one entropy encoder and multiple sets of metadata the system may instead utilise multiple entropy encoder modules for each type of symbol to be decoded. For example, the desparsification module may instruct a different module to perform an entropy decoding operation based on the type of symbol it expects next in the dataset. Thus, the index could indicate the parameters to be used for each decoder or which decoder is to be used for each symbol. This also applies where there is only one type of symbol in a data structure.

The process will now be described. We start by assuming that the first symbol in the stream is of a first type. In the implementation it is not relevant if the de-sparsification stage instructs the entropy decoding stage that the first symbol is of a first type of the entropy decoder inherently has a degree of intelligence or predetermination to identify the first expected type.

The entropy decoding stage will retrieve metadata from a store of metadata corresponding to the first symbol type: the metadata being chosen according to the index value. The metadata may include decoding parameters for example and may include an indication of probability. For example if the decoding operation is a range decoder, the metadata may include a probability distribution or cumulative distribution function. The index will thus refer to which cdf to use for that symbol. The operation of a range decoder in the context of the present disclosure will be described below in the context of FIG. 10.

As indicated above, there may be a degree of intelligence or predetermined expectation coded into the entropy decoding stage or module. For example, when it knows a data symbol is to be retrieved it may know to retrieve four. Depending on implementation, the entropy decoding stage may of course wait for an indication of the symbol type each time it tried to identify a symbol from the stream.

It is recalled that rather than the entropy decoding stage switching between sets of metadata, there may instead be multiple entropy decoding modules, each using one set of metadata and each retrieving a symbol from the stream of interspersed symbols of different types according to which type of symbol is to be expected next.

It was described above that the entropy decoding stage may be any type of entropy decoding module. For example, the entropy decoding module may be a Huffman decoding module where the symbols in the stream are of a fixed length. Preferably however the entropy decoder is a range decoder, the operation of which will now be described in the context of FIG. 10. If multiple decoding modules are used, the first type of symbols may be decoded using a first type of entropy decoder and the second type of symbols may be decoded using a second type. For example, the fixed length nodes symbols may be decoded using a Huffman decoder and the data symbols may be decoded using an arithmetic decoder, which may be beneficial if the types of symbol are of differing lengths or is one type lends itself to a fixed length operation and the other to a variable length operation.

Figure 10:
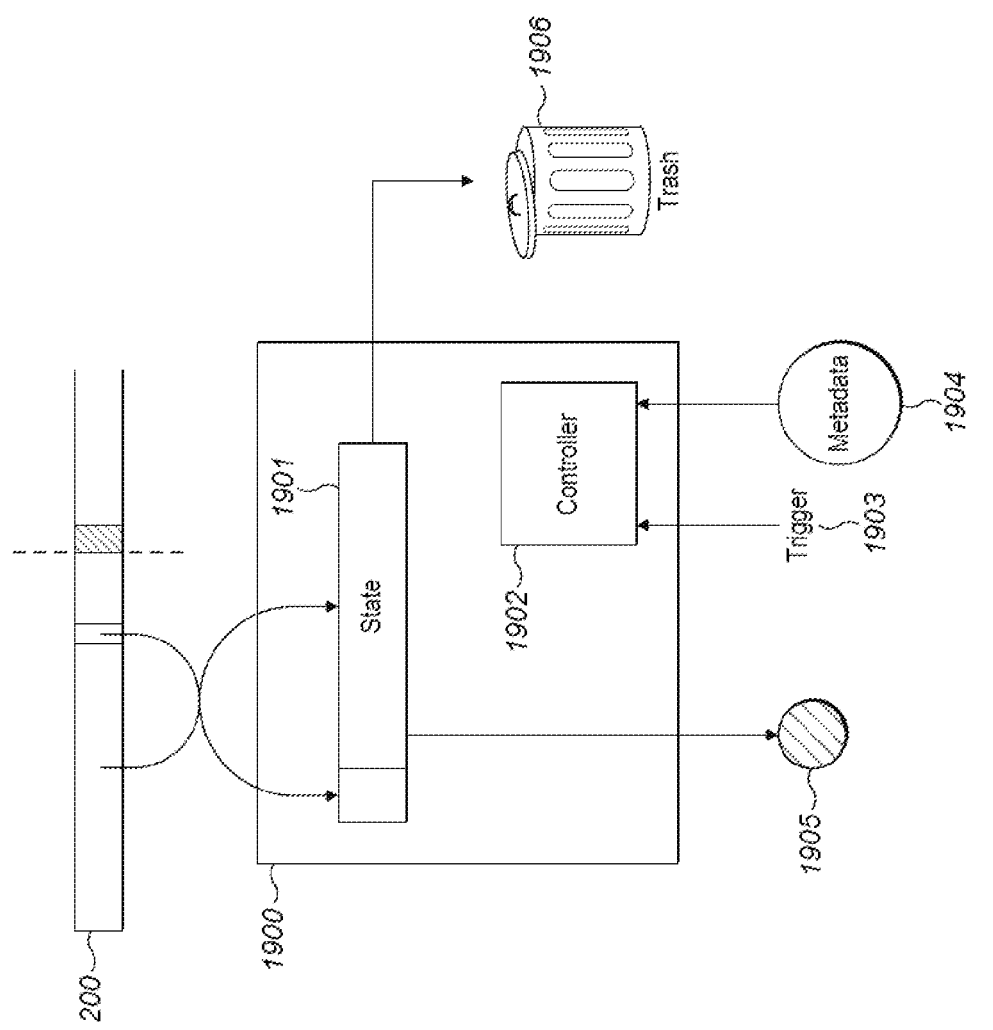
FIG. 10 illustrates a range decoder schematically.

FIG. 10 illustrates a range decoding module for implementation in the present system which may perform incremental decoding. FIG. 10 illustrates a sequence 200 of bits. The range decoder 1000 takes a portion of this sequence and updates an internal state register 1001.

To begin the decoding process, the decoder must have enough information to decode the first symbol unambiguously. The decoder controller will retrieve a first set of metadata from a store of metadata 1004, the metadata including a first cumulative distribution function which metadata to use is indicated by the index value. From the metadata, the range decoder can identify the smaller number of bits it needs from the stream to identify the node symbol with unambiguous probability, shown with a dotted line here in the sequence 200.

The range decoder sequentially analyses increasingly larger portions of the stream until it can be confident of the probability of the symbol that has been encoded. That is, the decoder compares the increasingly larger portions of data to the cumulative distribution function by narrowing the possible symbol with every portion of data analysed. Once the symbol has unambiguously been identified, the symbol is output 1905.

The controller 1002 of the range decoder will now wait until it receives a trigger 1002 to decode the next symbol. The trigger 1903 may include the type of symbol to be decoded and the decoder will choose for the set or may indicate the metadata to use based on the index value. From this information, the decoder will retrieve the respective metadata from the metadata store 1004 which will include a cumulative distribution function for the symbol to be retrieved next.

From the cumulative distribution function, the decoder will identify if it should update its state (or tag) and either read in more bits from the sequence 200 or shift out bits 1006 (i.e. or otherwise discard bits into trash). For example, the decoder will identify if the most significant bit of the state (or tag value) is the same or different between the upper and lower limits of the possible values and whether the amount of bits it holds in its state is sufficient to identify the smallest or most infrequent value in the distribution function. If the most significant bit is the same between the upper and lower limits of the potential symbols, that most significant bit can be discarded.

Figure 19:
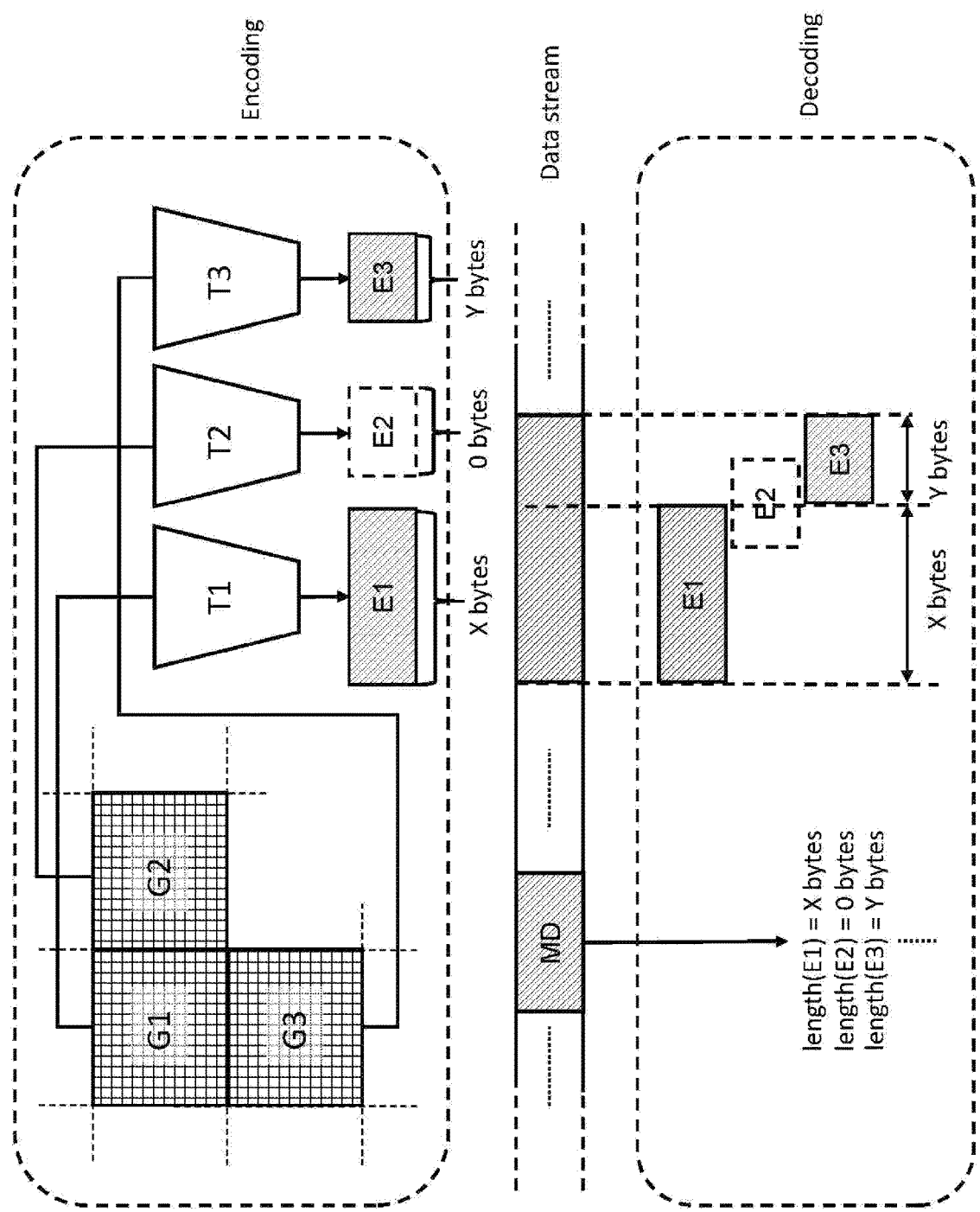
FIG. 19 illustrates an elementary data structure.

Schematically, the image of FIG. 10 shows how the state may show that the data in the stream may be retrieved from a later part of the encoded data stream and that the next identified symbol may not be the initial bits of the data stream but may be retrieved from a latter part of the data stream. Such eventuality is well known to the skilled addressee who will be familiar with range encoding techniques. FIG. 19 merely attempts to demonstrate that the range decoding technique incrementally reads a sequence of bits and from that sequence identifies a symbol based on a probability function, preferably a cumulative distribution function and that the functions may be pointed to by an index value so as to group data structures together. The symbols may not be included within the sequence of bits in a strictly sequential manner.

While we have not described the functionality of a range decoder for brevity, we believe it is well known in the art. However, the functionality of the system is clear. The range decoder of the present disclosure is configured to use a respective cumulative distribution function according to a type of symbol expected next in the bytestream and form an index value indicated for that data structure.

For example, given that the final symbol can be recognized from the previously decoded interspersed symbols, a range decoder may be able to work with just the location of the start of the data structure. It is possible to define the start in terms of an offset from the start of the previous stream. Nevertheless, there are certain implementations of range decoder where reading data from the bytestream stops before the final symbol or symbols are deduced (not deduced at all, or not entirely deduced) and a final series of calculations is performed. In such a case it may be necessary to know where the structure ends, so that the handover to the final calculations can be done at the right stage in decoding. The stream length may accordingly be signalled.

As indicated above, in preferred embodiments the type of symbol to be expected in the data may be determined by mapping the first type of symbols to an ordered tree where the first type of symbols are node symbols as described above. The second type of symbols may be data symbols as described above. In the range encoding example, the data symbols may not be of a fixed width. It will be understood that the process of coupling a de-sparsification algorithm and an entropy decoding algorithm may be applied to other de-sparsification algorithms or alternatively other algorithms comprising interspersed symbols of different types.

The process of encoding the bytestream may be substantially mirrored. That is, a sparsification algorithm as described above outputs a symbol to an entropy encoder, optionally together with an indication of the type of symbol being passed. The entropy encoder then encodes that symbol based on parameters or metadata for that type of symbol. The type of symbol may be determined from the symbol itself or based on an explicit signal from the sparsification module. The first type of symbol encoded represents an indication of the symbols expected later in the data set.

As described above, the present invention provides a methodology and apparatus for encoding and decoding image and video data in a manner that enables a full flexibility in terms of being able to collect and determine statistics associated with video data. Such data provides advantages in terms of encoding, and decoding, as well as a greater understanding of the data to be encoded. In particular, the present invention allows for the identification of tiles with the same or similar statistics to be grouped together, even though they may be spatially separate. Thus the overhead in metadata is lowered, whilst allowing for the recordal, and transmittal, of the statistics. In contrast to prior art systems, the may optionally utilises blocks of tiles of a fixed size (or dimensions) and allows for non-adjacent, spatially separate, tiles to be grouped together. Again, a tile here refers to a data structure representing an area of the information that is to be compressed.

Figure 11:
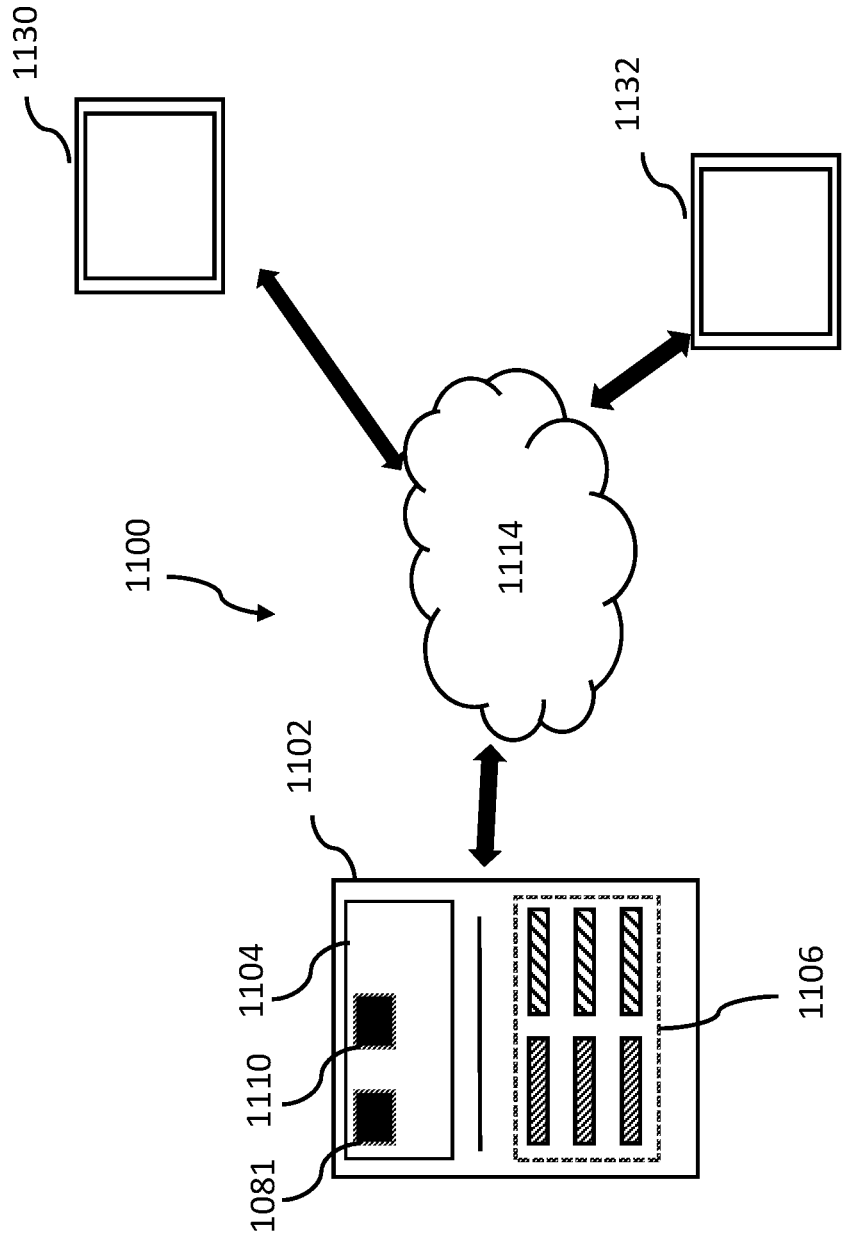
FIG. 11 is a block diagram showing a system for performing an example encoding method.

FIG. 11 is a block diagram of a system for performing the statistical coding methodology.

In FIG. 11, there is shown the system 1100, the system 1100 comprising a streaming server 1102 connected via a network 1114 to a plurality of client devices 1130, 1132. The streaming server 1102 comprising an encoder 1104, the encoder configured to receive and encode a first video stream utilising the methodology described herein. The streaming server 1104 is configured to deliver an encoded video stream 1106 to a plurality of client devices such as set-top boxes smart TVs, smartphones, tablet computers, laptop computers etc., 1130 and 1132. Each client device 1130 and 1132 is configured to decode and render the encoded video stream 1106. The client devices and streaming server 1104 are connected via a network 1114.

For ease of understanding the system 1100 of FIG. 11 is shown with reference to a single streaming server 1102 and two recipient client devices 1130, 1132 though in further embodiments the system 1100 may comprise multiple servers (not shown) and several tens of thousands of client devices.

The streaming server 1102 can be any suitable data storage and delivery server which is able to deliver encoded data to the client devices over the network. Streaming servers are known in the art, and use unicast and/or multicast protocols. The streaming server is arranged to encode and store the encoded data stream, and provide the encoded video data in one or more encoded data streams 1106 to the client devices 1130 and 1132. The encoded video stream 1106 is generated by the encoder 1104. The encoder 1104 in FIG. 11 is located on the streaming server 1102, though in further embodiments the encoder 1104 is located elsewhere in the system 1100. The encoder 1104 generates the encoded video stream utilising the techniques described herein.

The encoder further comprises a statistical module 1108 configured to determine and calculate statistical properties of the video data.

The client devices 1130 and 1132 are devices known in the art and comprise the known elements required to receive and decode a video stream such as a processor, communications port and decoder.

The technique takes into account the fact that areas of an image may be identified by virtue of the fact that they have similar, or identical, statistics. Regions which have the same statistics can, by using Shannon encoding (or any other form of entropy encoding), be described in a low data manner. As the entire region is defined in the same manner, this only needs to be defined once. It is known in the art to group regions spatially, on the assumption that pixels which are proximate to each will often show similar or identical properties. However, such spatial grouping will not be particularly effective where strong discontinuities are present (for example in the form of a feature or edge). Furthermore, the inventors have beneficially realised that whilst spatial proximate areas will have similar statistics, often areas which are spatially distinct will also have similar or identical statistics.

The described concept is based on the idea of identifying areas within the image which have similar statistics, and grouping these regions in order to reduce the amount data required to define such areas by encoding the groups using entropy encoding.

Figure 12:
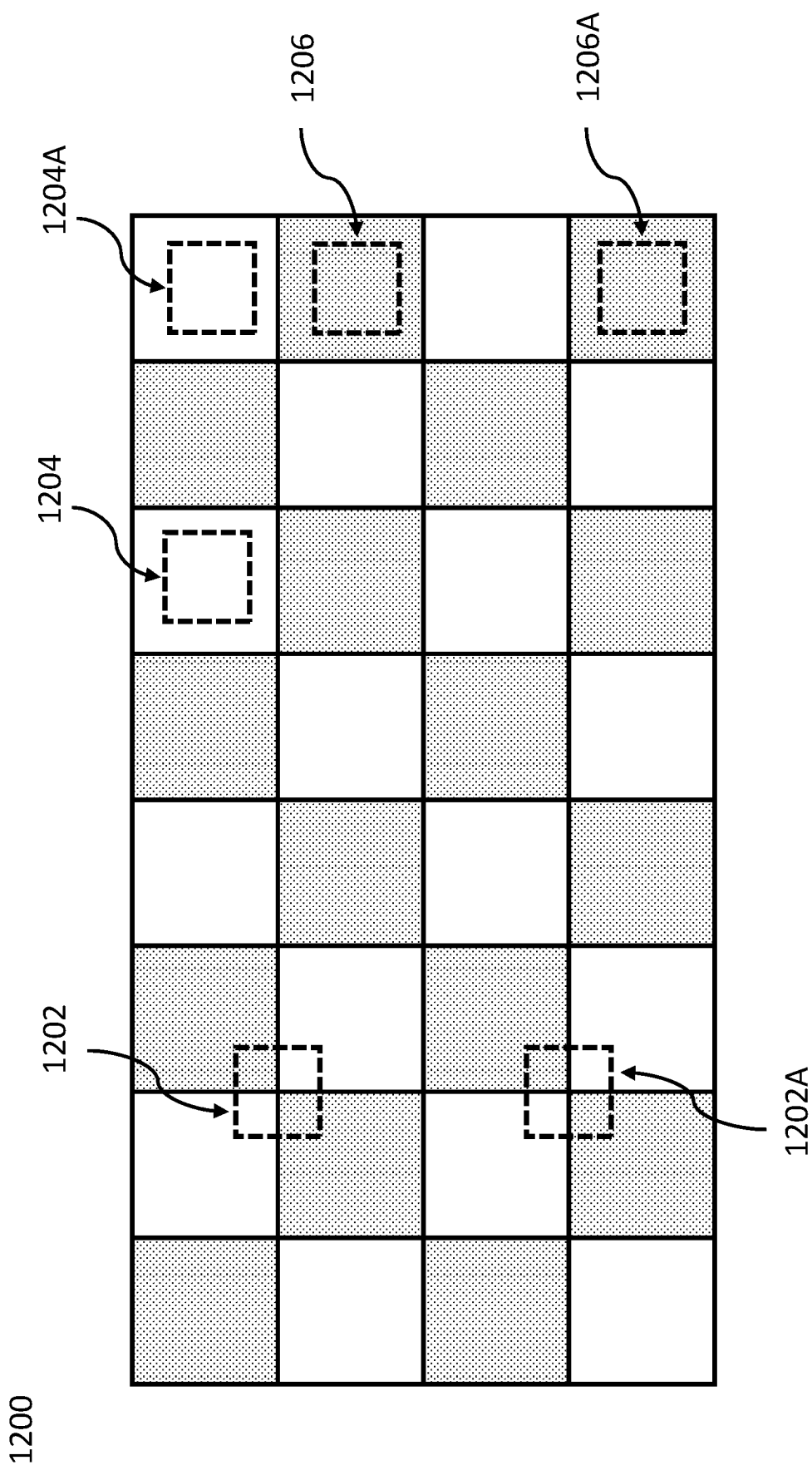
FIG. 12 is an example of an image to be encoded.

FIG. 12 is an example of an image to be encoded using the method. The ability is provided to group tiles based on statistical properties, wherein the decision regarding the grouping is independent of the location of the tile within the image. Accordingly, such grouping allows for tiles to be grouped which would not otherwise be grouped based on spatial properties.

In FIG. 12, the image to be encoded is that of a chessboard 1200. As is known with such boards, the board is defined by a set of alternating black and white squares. Three separate and equal sized regions have been identified on the board 1202, 1204 and 1206. Whilst the image of the chessboard has been used for ease of understanding, the skilled person would realise that the described concepts are applicable to any form of image.

In FIG. 12, the first region 1202 defines a region which comprises both a portion of a black and a white square. As can be seen, whilst the pixels in the first region 1202 are spatially proximate, they will have different properties. In particular, the statistical properties of the pixels (for example luma, chroma, number of bits required to define the pixel, etc.) will be different for the black and white pixels within the first region 1202. There is also shown region 1202A, which is spatially separate from the first region 1202, but has identical content As such region 1202A would have identical statistical attributes to 1202.

Similarly, the second 1204 and third 1206 regions consist of solely black and white pixels respectively. The second 1204 and third 1206 regions also have further regions 1204A and 1206A which are identical, and therefore will respectively have identical statistical attributes.

The example shown in FIG. 12 is an example where the properties of spatially distinct regions will be the same, or substantially similar. However, it is found that such clustering is found in many scenes, and thus can be used for the basis for entropy encoding.

Whilst it is possible to encode based on grouping of statistics, the amount of metadata required will also increase when more groups are introduced. As metadata is generally incompressible, the cost of the metadata must also be considered in order to ensure that the cost of the metadata does not exceed the benefit of the entropy based encoding.

Figure 13:
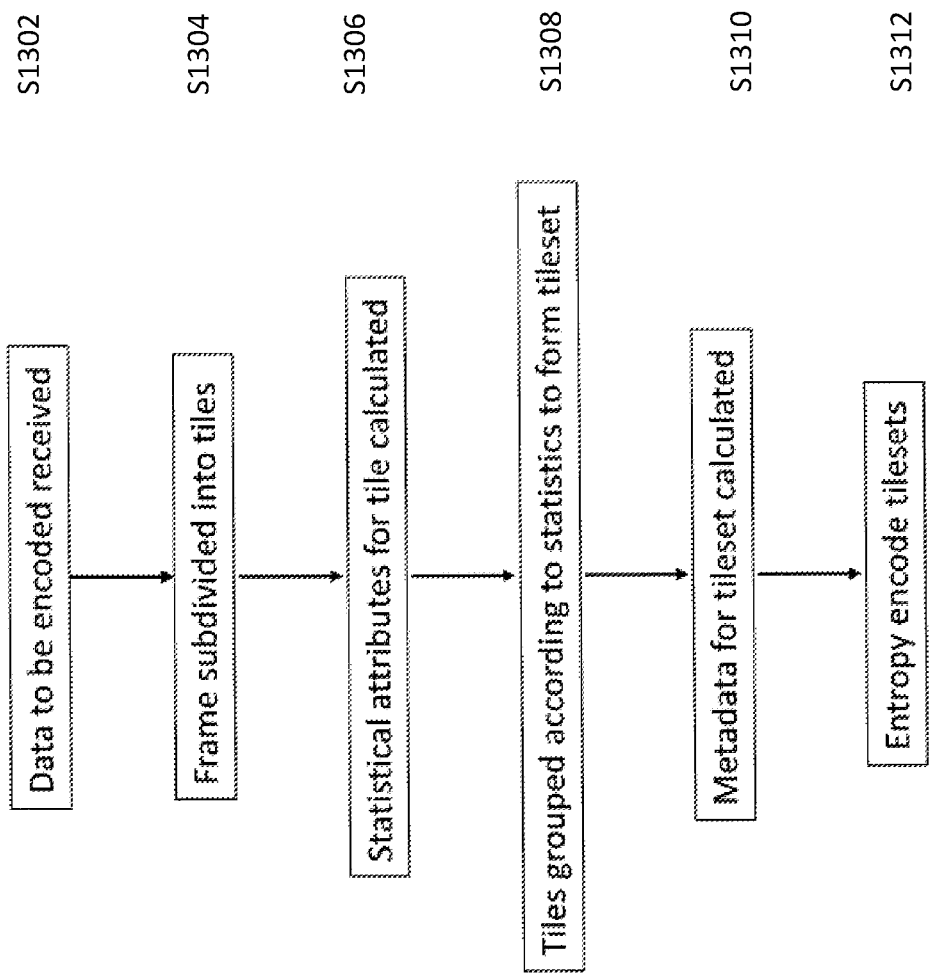
FIG. 13 is a flow chart of the methodology of encoding a frame of video data.

FIG. 13 is a flow chart of the process of clustering data. At step S1302, a first frame of video data to be encoded is received. The data may be stored locally, or received from an external source such as a server. At step S1304, the frame is subdivided into a plurality of tiles. The tiles may be of any suitable size such as 8×8, 16×16, 32×32 etc. pixels. The size and number of tiles for the frame may vary according to available processing power, and the need to obtain a suitable size of tile in order to obtain meaningful statistics. Preferably, the number and size of tiles is fixed for the frame and all other frames of video data. The step of portioning an image in such a manner is known in the art. Each tile is preferably assigned an index which is indicative of the position of the tile within the image. Preferably the tiles are ordered within the image in a set-order. In a preferred embodiment, the order is set according to a z-order traversal of the tiles, as exemplified in FIG. 14.

Figure 14:
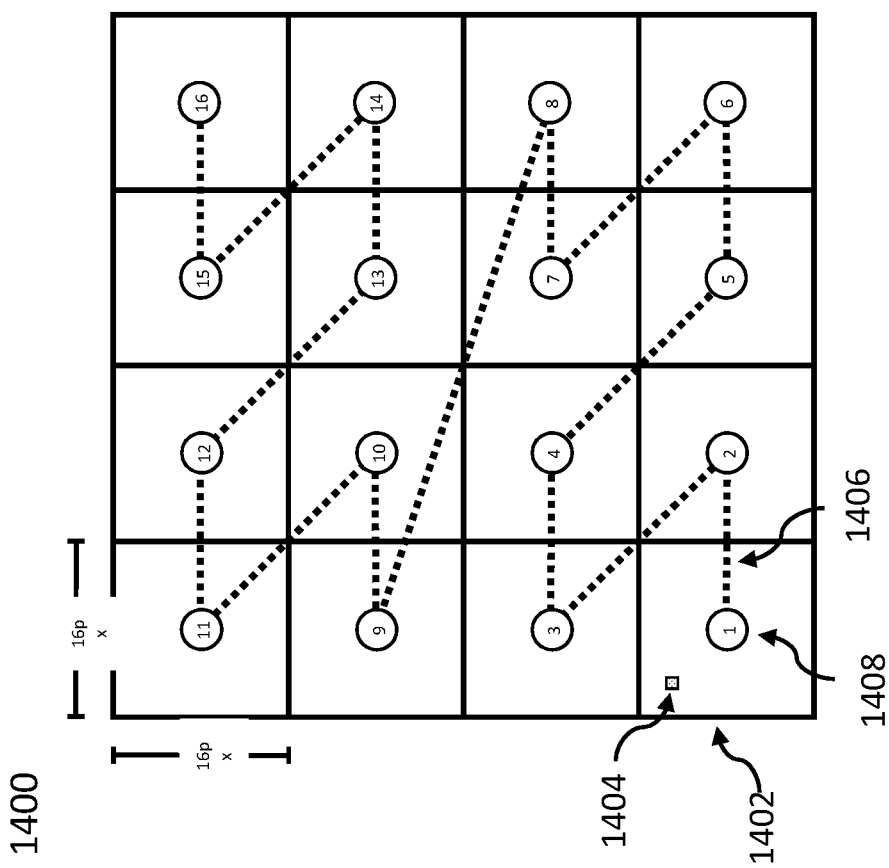
FIG. 14 is an example of z-order traversal of an image partitioned into tiles.

In FIG. 14 there is shown an image 1400 which is subdivided into a plurality of tiles 1402, each tile containing a number of pixels 1404. Each tile 1402 is assigned an index 1408 found according to the z-order traversal 1406 which preserves the spatial proximity of the tiles. Efficiently computing the z-order traversal 1406 is known in the art. Thus, there is defined a set of indices which define the tiles. As the order is set, and the size of the tiles consistent, the individual pixels which define a tile can be readily determined.

Returning to FIG. 13, at step S1306, for each of the tiles identified at step S1304, the statistical attributes for the tile are calculated.

In an embodiment, the tile is of dimension 16×16 pixels and therefore contains 256 total pixels. This allows for meaningful statistics to be calculated. The statistical attributes of the tile define one or more properties of the tile such as luma, chroma, number of bits required to define the tile, etc. An aspect is that the statistical attributes are objectively measurable, thus allowing for an objective comparison of the statistics between tiles to be made. The measurement of statistics for a tile is known in the art, and occurs via known means.

Therefore at step S1306 for each tile one or more properties/statistical attributes for each of the tiles are identified.

However, in an embodiment whilst such properties or statistics are calculated, they are not stored with the source data stream as metadata. They are stored separately from the data stream; for example, in memory associated with a processor performing the encoding.

At step S1308, instances of tiles defining the same or similar instances of a statistical attribute are identified. The identified tiles are grouped together so as to define a tileset. A tileset is therefore a group of tiles (which may, or may not, be spatial connected) that are grouped on the basis of having similar statistical attributes. As the tiles within a tileset have similar, or identical attributes, they will be near identical (or identical).

Figure 15:
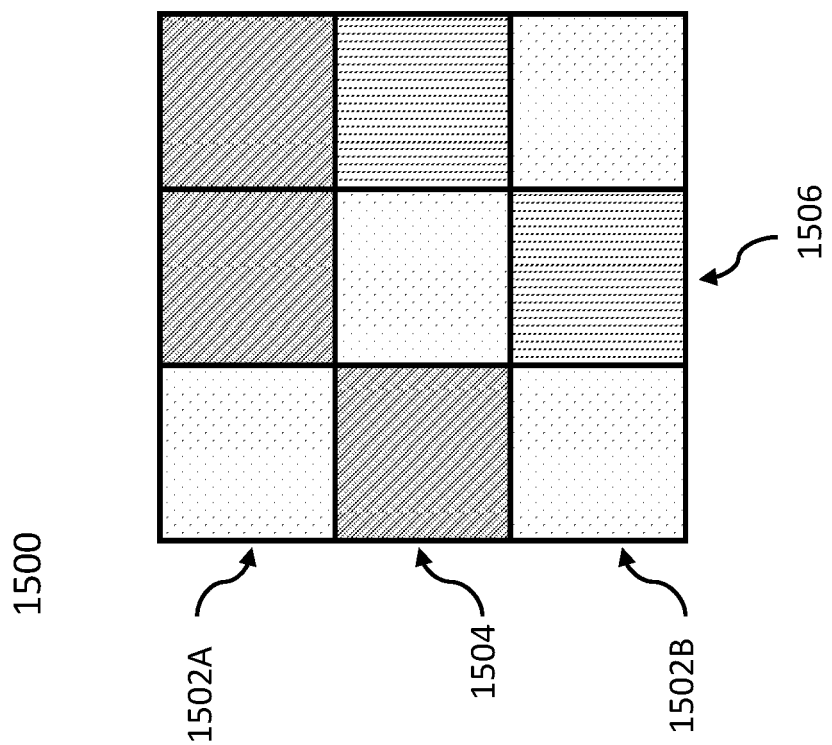
FIG. 15 is an example image subdivided into tiles and subsequently clustered into tilesets.

By grouping similar tiles into tilesets, the amount of metadata needed can be reduced. FIG. 15 is an example image 1500 that has been subdivided into 9 tiles. Without the use of tilesets, metadata corresponding to 9 separate tiles would need to be used. However, some tiles share similar statistic properties with other tiles, such as 1502A and 1502B. Therefore, similar tiles are grouped together to form tilesets, exemplar tiles for each tileset being 1502A, 1504, and 1506. As such, metadata corresponding to three tilesets would need to be used leading to a more compact metadata representation of the image 1500. Thus, an important aspect is the clustering of tiles into tilesets according to their statistical attributes or properties, S1308.

As each group has similar or identical statistical attributes, the group can be defined by their statistical attributes and are identified as tile sets.

In an embodiment, tilesets are formed according to the cumulative probability distribution function of a particular statistic or set of statistics computed over the tiles. An example of a cumulative probability distribution function is shown in FIG. 18.

Figure 18:
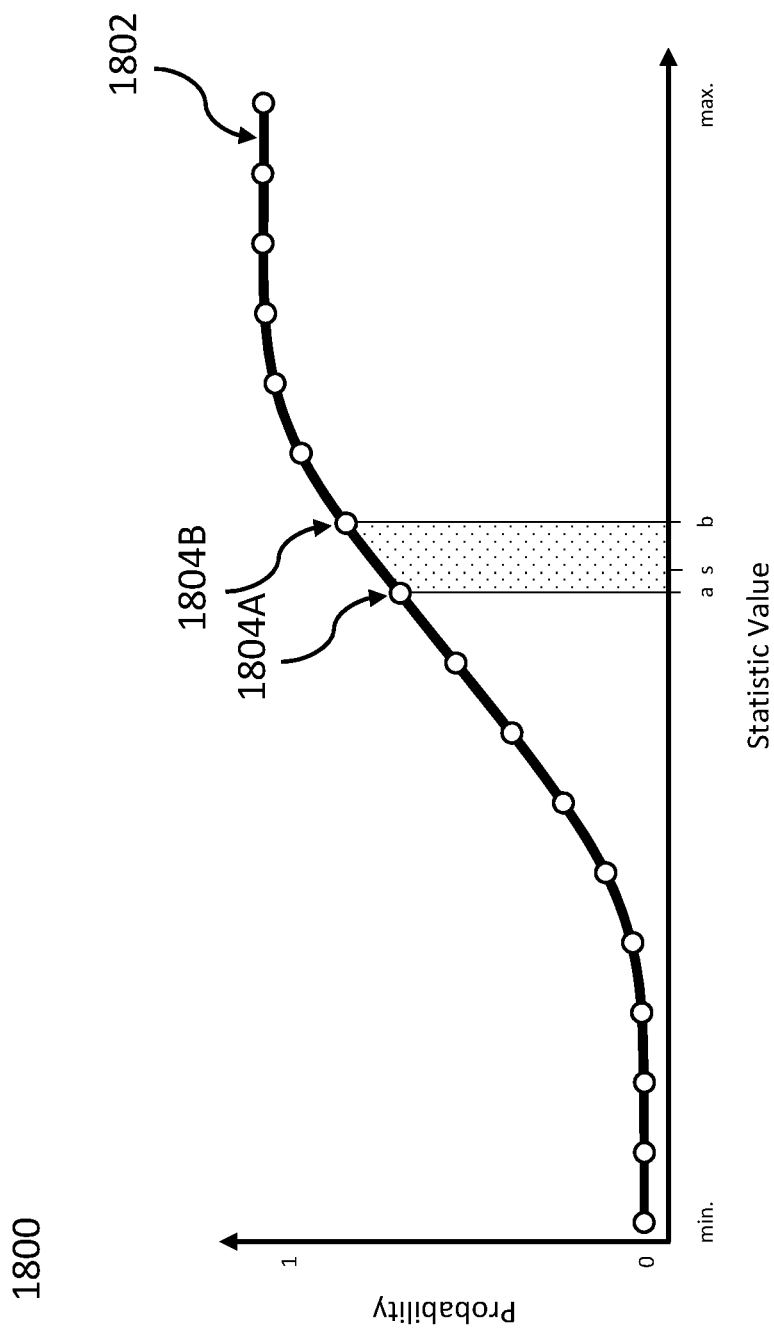
FIG. 18 illustrates a cumulative distribution function.

FIG. 18 is a representative example of a statistic plotted against its cumulative probability to form a cumulative probability distribution 1802. Whilst the general shape (the elongated s-shape) of the distribution function 1802 will be the same across different frames, the specific form of the distribution will be dependent on the values for the frame. As the values for each frame change, the specific shape of the distribution function 1802 will change. Thus, having tilesets defined on the distribution function provides a more effective measure across a frame. The use of a distribution function furthermore allows for tiles with similar statistics to be easily identified. In a preferred embodiment, sixteen groups of tiles (i.e. tilesets) are identified. The tilesets are identified in this instance by sampling 17 points across the cumulative probability distribution function 1802. These points then form the boundaries for each tileset. 1804A and 1804B define the boundaries for one such tileset whereby any tile that has a statistic value, s, in the range, a<s≤b, is assigned to that tileset. As the statistics and their distribution will change for each frame, the boundary values will also change between frames. Whilst sixteen tilesets is preferred, in further embodiments other numbers of tilesets may be used.

In further embodiments, other forms of ordering of statistics, and clustering of tiles based on the similarity of statistics, are used. As each group has similar or identical statistical attributes, the group can be defined by their statistical attributes and are identified as tile sets.

A key aspect is that the identification of the individual tiles which form the tile set is independent of the spatial distribution of the tiles. Therefore tiles which are spatially distinct may form part of the same group. Thus at step S1308 the identity of the titles forming each tileset is recorded.

At step S1310 metadata for each identified tileset is calculated. The metadata describes the properties of the tiles which form the tileset, preferably comprising the data to describe one or more statistical attributes of the tileset, and the identification of the tiles which form the tileset. In one embodiment, the statistics for the entire tileset are recalculated using all tiles within the tileset. In further embodiments, the statistics for the tileset are taken from a single tile (for example the median tile of the tileset) and applied across the whole tileset. Thus, the metadata defines one or more statistical attributes for the tiles, as well as the individual tiles which form the tileset.

The process at step S1310 is repeated for each of the tilesets. Thus, as well as the identity of the tiles forming the tileset (as determined at step S1308) the properties of the tiles—which are identical or similar—are also determined. Such data is stored in the form of metadata associated with the image and tileset.

As the tiles are encoded in a sequential manner, the data or metadata is in the form of a set of indices which define the statistical attributes by which the tilesets are defined. These indices may be costly in terms of overhead. The inventors have beneficially realised that by clustering the tiles into tilesets, via their statistics, a measure of the likelihood of the data having a particular value (i.e. the value of the statistics by which the tileset is defined) can be made. Thus at step S1310, in an embodiment, entropy encoding is used to reduce the cost associated with encoding. As the tilesets are defined by multiple tiles, the overhead associated with the metadata for entropy encoding is less than the cost of entropy encoding thereby producing a reduction in data size.

At step S1312 for each of the tilesets, the tileset and metadata describing the tileset are encoded.

As the tilesets are identified by their similar, or identical, statistical attributes, the metadata to describe the statistical properties of the tiles in the tileset is constant for all tiles within the tileset. Thus, as the tiles within the tileset share the same properties, the data requirement in order to encode the frame is greatly reduced as the metadata required to describe each tile in the frame in an embodiment is entropy encoded.

Whilst the above process allows for reductions in the dataset to be made based on the statistical similarity of the tiles in the dataset, further gains may be made by taking advantage of the similarity of tiles which are neighbouring each other. As is known, tiles which are adjacent to each other often show little or no variation. Therefore, in order to reduce the amount of data required to encode the tiles, the tiles are preferably encoded in a set order, such as a z-order traversal as shown in FIG. 14. Preferably, the value encoded is the difference between the value for the tile and the preceding value. Thus if the two tiles are identical in value then the encoded value is zero, or if they are similar then the value is small. Both of which have a low bit cost associated with their encoding. As stated above, tiles which are spatially similar (i.e. near to each other) will also typically have similar statistics. Therefore, whilst the invention will beneficially group the tiles in the tileset without any consideration to the spatial similarity, by ordering the encoding of the tiles in a z-order traversal, the encoding process can beneficially use the advantages associated with both the spatial and statistical similarities during the encoding process.

A further advantage associated with the use of tilesets is that they allow for decisions to be made at statistical level across the entire image. It is known in video encoding to encode different frames at different levels of encoding as part of an adaptive encoding methodology. The decision is made based on the frame level statistics which have been determined. A further advantage of the present invention is that the use of tilesets, and the metadata associated with the tilesets (which is applicable to all the tiles that form the tileset) allows for decisions regarding adaptive encoding to be made on a frame-by-frame basis, with the variation in the encoding occurring within the individual frames.

Figure 16:
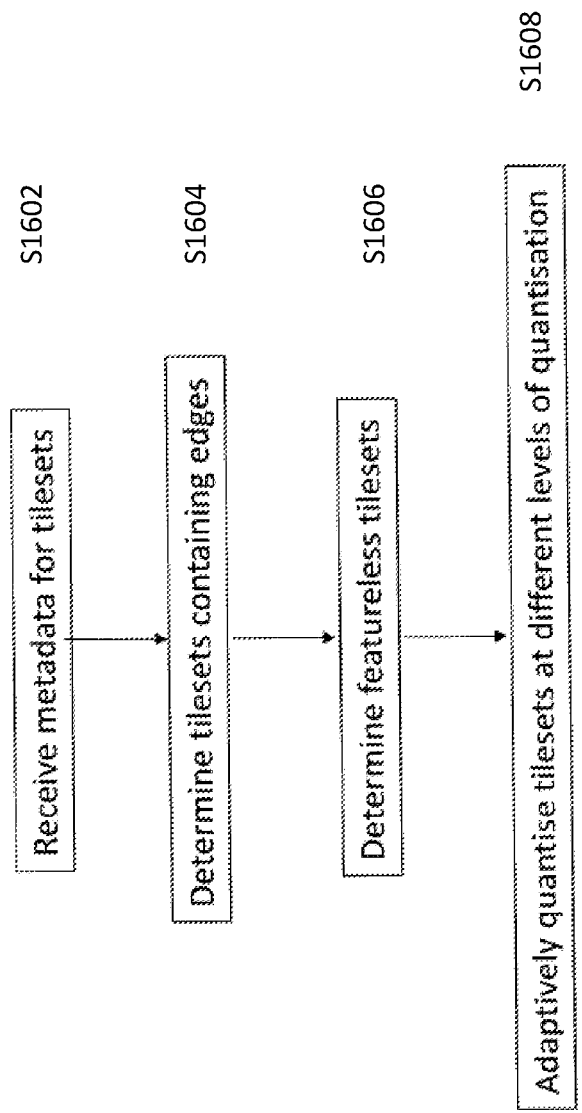
FIG. 16 is a flow chart of the methodology of adaptively encoding a frame of video data.
Figure 17:
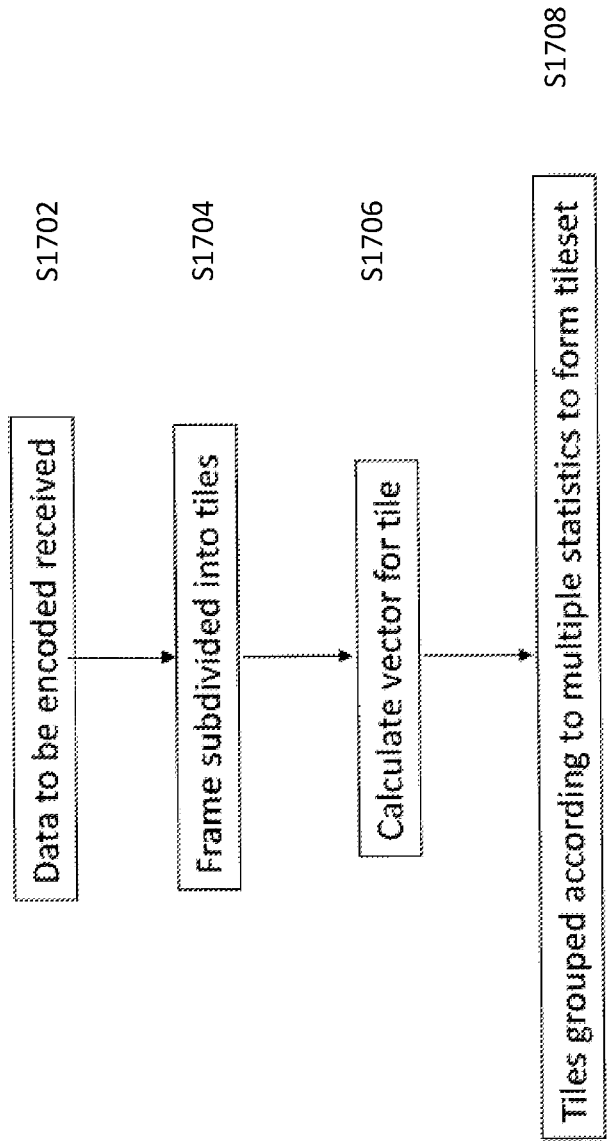
FIG. 17 is a flow chart of the methodology of encoding a frame of video data.

FIG. 16 is a flowchart of an adaptive encoding process within a frame.

As is known in video encoding, the bandwidth available is a limiting factor to the amount of data that can be sent and ultimately the level of quantisation used when encoding. There are a number of objective quality of frame metrics which are used to provide an objective measure to the encoded picture quality when compared to the original source data. Such measures are made across the entire frame. There are also a number of subjective measures, which define how well the end user will perceive the image. As the above described methodology allows for the local statistics to be obtained, it is possible to use such information in order to identify areas within a frame which are likely to be seen as visually more important to the end user. Such areas can be selectively encoded at a higher level of quantisation in order to provide a higher quality image for those areas. However, due to the finite amount of bandwidth, a trade-off must be made and the level of quantisation in other areas of the image must be lowered. As such the objective image quality metric for the entire image remains constant, but the areas which are deemed to be visually more important are quantised at a higher level. This therefore helps to provide a subjectively improved image.

At step S1602, the process begins with the receipt of the metadata for each tileset as determined at step S1310.

At step S1604, the metadata is used to determine tilesets which are likely to contain edges, or feature information, in the image. Features, such as edges, are known in video encoding to be a source of compression artifacts. Such features may be identified by the statistics of the frame, with certain statistics being associated with encoding errors. As compression artifacts are visible to the user, tiles which have compression artifacts will have, on a user subjective level, a lower level of quality.

In an embodiment, the tilesets are ranked by a statistical value to define an order of visual "importance". In an embodiment, the statistics relate to the error associated with the encoding process and the tilesets are ranked from smallest to largest error. Tilesets which are identified as having the largest error are typically those associated with edges, or feature information, and will be perceived by the end user as having the lowest level of quality. In further embodiments, other suitable methods of ranking the tilesets are used.

At step S1606, the metadata is used to determine tilesets which are likely to be featureless, containing a uniform colour with little or no variation. Such tiles may be associated with a uniform background feature, or a consistent feature. Such tiles are also identified by the statistics as they show no variation in values across the tile. As such features are constant that are associated with having no compression artifacts or the like.

At step S1608, an adaptive quantisation decision is made in order to determine what level of quantisation is used to encode the individual tilesets. As a default, all tiles are encoded at the same level of quantisation. This is the standard encoding behaviour where the entire image is encoded at the same level of quantisation.

It has been beneficially realised that the level of quantisation across tilesets may be varied, with certain tilesets being encoded at a higher level of quantisation than others. Such decisions can be made as statistics are provided at an individual tileset level, thereby providing the information required to make the decision. Beneficially, by encoding tilesets, and therefore the tiles, identified at step S1604 (i.e. those which are likely to be associated with compression artifacts), such tiles will show fewer compression artifacts and therefore will be perceived by the end user/viewer of the video to be of a higher quality. However, as the bandwidth cannot be increased, a corresponding decrease in the level of quantisation is made for some or all of the tilesets identified at step S1606. As the level of quantisation for these tilesets has decreased, fewer bits are required in order to encode such frames. Thus, the overall amount of data required to encode the frame remains the same, but the level of quantisation is varied across the frame in order to provide enhanced regions (and corresponding regions with lower quantisation) within the image. Therefore, the subjective measure for the image will increase as the regions which are likely to show compression artifacts are quantised at a higher level, whereas areas which are uniform can be encoded at a lower level of quantisation without adversely affecting the end user experience.

In an embodiment at step S1608, a first tileset is selected to be encoded at a higher level of quantisation. Preferably the tileset to be encoded at the higher level of quantisation is the tileset which is ranked as the visually most important tileset. Subsequently, the increase in the size of the encoded frame as a result of encoding the tileset at the higher level of quantisation is determined. In order to ensure that the encoded dataset does not exceed the available bandwidth, one or more further tilesets are identified to be encoded at a lower level of quantisation. Preferably, the identified tilesets are those which are deemed to be visually the least important. \Mien the tilesets are encoded at the lower level of quantisation, the decrease in the size of the encoded frame is determined and compared with the increase as a result of the quantisation of the tilesets at the higher level of quantisation. This process is repeated until such time that the overall size of the frame is the same, thus ensuring that the bandwidth requirement is not increased. Accordingly, the process provides an improved encoding process.

The process of creating tilesets can be repeated for an individual frame multiple times, with each set of tilesets determined based on a particular statistical attribute. By having multiple sets, further information regarding the underlying frame of video data is recorded and can be beneficially used in the encoding and decoding process. However, as there is an overhead associated with the creation of the set, in practice it is not desirable to have multiple sets.

A further aspect of the invention is the ability to group tiles into tilesets based on multiple statistical attributes. FIG.

7 is a flowchart of the process of defining a set of tilesets based on multiple statistical attributes.

Steps S1702 and S1704 are identical to steps S1302 and S1304 respectively.

Whilst it is possible to define and record the data for each statistical attribute separately this is costly in terms of the size of data required. Beneficially, the above methodology can be used to group tiles to form a tileset using several statistics.

In order to group the statistics, at step S1706 each statistic is defined in terms of a vector and a single vector score is determined for the statistics. It is found that clustering of up to three different statistics is preferred though in further embodiments a different number of statistics are grouped.

Therefore, following the same principles described above with respect to step S1308 of FIG. 13, at step S1708 the tiles are clustered in groups of tiles having the same or similar vector (and thus same or similar statistics). As described with reference to FIG. 13, such clustering of the tiles allows for the tilesets to be encoded and further allowing for entropy encoding.

In further embodiments the value of each statistic is stored in a single matrix and the clustering is based on instances of the same of similar statistics.

The following sets out features of the hierarchical data structure used in accordance with certain embodiments and associated advantages of that hierarchical data structure.

There is provided a method of decoding a received set of encoded data representing information that has been compressed, wherein the encoded data set is divided into a hierarchy of subsets, the method comprising: decoding at least one first subset to delve a respective set of attribute metadata elements; separately decoding a plurality of second subsets comprising data elements, wherein each second subset describes a region of the information that has been compressed; and, reconstructing the information that has been compressed from the data elements, wherein the region of the information that has been compressed is identified from the attribute metadata elements.

It is provided that individual portions of a bytestream can be decoded without reference to other similar sections of the same bytestream. This facilitates increased memory utilisation as each portion, once separately decoded, can be spatially located in the information being compressed without having any knowledge of the other similar sections and without additional information being stored in memory. The data in memory at an instant may be a subset of the data of a whole plane. Conventionally, an entire plane is decoded as one such that it cannot be broken to enable separate decoding. By separately we consider that the first subset may be separately decoded from the second subsets, the second subsets may be decoded separately from other, or preferably both. That is, that each subset is decoded separately from any other subset.

Each second subset may comprise a data structure of structure metadata elements and data elements and reconstructing the information that has been compressed from the data elements may comprise spatially arranging the data elements in an array based on the structure metadata elements. Thus each of the second subsets may themselves be a data structure. In this way the proposed technique can be thought of as the breaking down and reconstruction of a larger data structure with each part of the data structure being separately decodable so that data stored within each structure can be spatially located without knowledge of the other parts of the data set.

Reconstructing the information that has been compressed may comprise: inserting a predetermined series of data values in regions of the array where the attribute metadata elements indicate that no second subset is included in the dataset for a region of the array. Regions of the information which have consistent values need not be signalled explicitly in the bytestream and therefore the overall size of the data can be reduced. This may be thought of as sparsifying the data. The hierarchical data structure provides a mechanism by which a region implicitly signalled in the data set can be accurately located and the information contained therein populated without that region being included within the bytestream or decoded at the decoder. Not only does this reduce data size but it also dramatically increases decoding speed as swathes of subsets do not need to be decoded for largely consistent data arrays, such as residuals.

The attribute metadata elements may indicate the predetermined series of data values for a respective one of the plurality of second subsets. It thus becomes possible to signal the large swathes of information above differently where there are different consistent regions within a plane or between planes. Alternatively, the predetermined series of data values may be known to the decoder and may be zero values.

The attribute metadata elements may comprise a flag indicating that no second subset is included in the dataset for a region of the array. The flag facilitates the decoder identifying that a subset is not expected in the dataset for that region. Where the first subsets correspond to a first tier of the hierarchical data structure and the second subsets correspond to a second tier of the hierarchical data structure, the flag may indicate if a corresponding data structure exists in a subsequent tier.

Each of the attribute metadata elements may describe a respective one of the plurality of second subsets. For example, the attribute metadata elements may indicate specific attributes or parameters of a specific one of the second subsets. In this way, one first subset may describe a plurality of second subsets. Where the first subsets correspond to a first tier of the hierarchical data structure and the second subsets correspond to a second tier of the hierarchical data structure, the data structure may be visually represented as an inverted pyramid or tree. Each attribute metadata element may accordingly correspond to a sub-grid of an overall-grid to be decoded.

In general, the technique proposes the concept of separately decoding data structures using information contained within a different data structure.

The attribute metadata elements may comprise the dimensions of a data structure in a respective one of the plurality of second subsets. Thus when decoding the second subsets and placing the subsets in the array, the decoder is able to identify the expected shape and size of the data for placing in the region. Alternatively, the dimensions may be signalled separately or may be of a fixed size for each tier of the hierarchy.

The attribute metadata elements may comprise location information to enable the decoder to locate a respective one of the plurality of second subsets, and the step of separately decoding a plurality of second subsets may further comprise: searching for at least one of the plurality of second subsets based on the location information. The attribute metadata elements thus provide for the parallel decoding of the second subsets and the random access of those subsets such that each does not need to be decoded to accurately recreate portions of the information that has been compressed. The location information may be for example lengths of subsets, an offset from a location in the dataset or a fixed location in the data set.

The attribute metadata elements may indicate decoding parameters. The decoding parameters may be used by the decoder to differentially decode the second subsets from one another and thus improve the efficiency of the overall decoding process as parameters can be optimised for each subset. The decoding parameters may for example be entropy decoding parameters such as statistics or an indication of statistics to use for decoding a subset. Additionally, parameters signalled by the attribute elements may be quantization parameters.

The plurality of second subsets may be decoded based on the attribute metadata elements. Where the attribute metadata elements indicate decoding parameters the decoding may be performed according to those parameters to improve decoding efficiency. Where the attribute metadata elements include for example a length of the second subset or dimensions of the data structure, the decoder may be tailored to that particular subset to improve overall efficiency. In the art, typically the entirety of the data elements or the entirety of a graph is decoded together and is not decoded separately and therefore such benefits of decoding each subset differently cannot be realised.

The method may further comprise: mapping the attribute metadata elements to a first tier of a hierarchical data structure; and, mapping each decoded second subset to a second tier of the hierarchical data structure. The mapping of each subset to a tier in a data structure facilitates the implementation of the spatial location of the subsets. Once the information has been decoded it can be placed in the data structure. The data structure may be a linear data structure or a non-linear data structure such as a graph. This technique allows a data structure to be broken into sections which can be decoded separately and the data structure to be subsequently recreated at the decoder without explicitly signalling the data structure. That is, an unbroken graph may be broken into a series of graphs or separate data structures which can be separately decoded. Optionally, the decoded second subset may be grated to the decoded attribute metadata elements. For example, where the first and second subsets are a each portions of a graph, metadata of a second subset may replace leafs of first subset graph to recreate an unbroken graph.

The method may further comprise: mapping each data element of the second subsets to an array based on its location in the data structure. In this way the spatial location of the original data elements in the original data structure is maintained where the data structure reflects an array of information. The mapping of the data to a data structure helps identify the spatial location without storing the data structure in memory.

Each decoded second subset may be mapped to the hierarchical data structure based on the attribute metadata elements. For example, the method may comprise mapping each decoded second subset to a location in the second tier of the hierarchical data structure based on the attribute metadata elements. The attribute metadata elements may indicate that a location of the second tier of the data structure does not correspond to a second subset.

The mappings may be performed according to a predetermined order, for example a Morton or z-order. Alternatively the ordering of the second subsets may be indicated in the attribute metadata elements. The spatial information of the data set or data structure may be varied by explicit signalling in the attribute metadata elements.

The encoded data set may further comprise a plurality of first subsets, and the method may further comprise mapping a subset of the plurality of first subsets to a root tier of the hierarchical data structure; mapping another subset of the plurality of the first subsets to an intermediate tier of the hierarchical data structure, wherein the attribute metadata elements of the root tier describe the first subset of the intermediate tier. In this way the hierarchy may be increased to multiple tiers such that a large amount of data can be encoded and decoded in manageable portions. The process may be recursed for multiple tiers.

The first subset may be a data structure comprising structure metadata which indicate that no attribute metadata element is included in the first subset for a location in the data structure and that a corresponding location of the second tier does not correspond to a second subset. In this way the overall size of each subset may be reduced and the decoder may be able to easily identify that a regions of the array should be recreated as having consistent values without a suitable attribute metadata element being explicitly included in the subset.

Preferably the data elements may be data symbols and the set of attribute metadata elements may be in the form of a tuple.

Further, there is provided a method of processing metadata associated with a stream of video data, the method comprising the steps of, for a first frame of video data: subdividing the first frame of video data into a plurality of tiles; calculating a first statistical attribute for each of a plurality of tiles; identifying tiles having a first instance of identical, or similar, statistical attributes; grouping said identified tiles together as a tile set; for each tile set defining metadata for the tile set, said metadata indicative of the statistical attribute of the tiles defining the tile set; and encoding data indicative of the metadata for the tiles of the first frame of video data based on the metadata defined for each of the tile set to which said tile belongs.

Thus, the method provides the means for identifying and grouping tiles which are not necessarily linked spatially, but are linked by their statistical properties. Being able to group tiles in such a manner provides an improved understanding of the properties of the data, and furthermore allows for groupings to be made which would not otherwise be made.

Optionally, the encoding occurs using an entropy encoding based technique. As the groupings are based on their statistical similarity, the probability of the occurrence of the data can be calculated allowing for entropy based encoding.

Optionally, the metadata for a tile set further defines a location of each of the tiles forming the tile set, and preferably wherein the size of the tiles is fixed. This allows for an improved understanding of the data which can be repeated across multiple frames or datasets.

Optionally, wherein the step of identifying the tiles that form a tile set comprises further comprising ordering the tiles, based on their statistical attributes, preferably wherein the ordering of the tiles defines a probability distribution function of the statistical attributes. Such ordering enables the easy identification of tiles which have identical or similar attributes.

Optionally, wherein tiles are encoded in a set order, preferably wherein the method further comprises determining the difference between the metadata of a tile and its preceding tile, and encoding the metadata as the difference, preferably wherein in the set order is a z-order traverse. This allows for further reductions in data to be made.

Optionally, wherein the method further comprise the step of encoding the tiles, preferably wherein the step of encoding the tiles comprises determining a level of quantisation and encoding tiles at said level of quantisation, more preferably wherein tiles belonging to a first a first tile set are quantised at a first level of quantisation and tiles belonging to a second tile set are quantised at a second, different, level of quantisation. The improved understanding of the video data provided by the clustering based on the statistics allows for areas of the image to be selectively quantised at higher rates of quantisation. Thus specific areas within the image which are deemed to be important can be encoded at a higher level of quality thus producing an improved image.

It has been described above how attributes of a later data structure may be signalled in the bytestream. Specifically, it is described that a hierarchical data structure may be provided. The following describes how a decoding module may obtain a value from a bytestream or data set and determine based on this value a type of shortcut used in the encoding process and/or to be used in the decoding process. The decoding module may configure the decoding process to adapt its operations based on the indicated shortcut and/or implement a decoding process which was the indicated shortcut. The specific types of shortcuts, what each type means and what advantages it provides may be described below.

In certain examples, the value may be included in a header of a bytestream and may indicate one or more modifying operations used in the encoding process when building a header and/or to be used in the decoding process in order to decode a bytestream. These modifying operations, or shortcuts, provide many general advantages such as to reduce the amount of data to be encoded/decoded and/or to optimise the execution time at the decoder, for example by optimising the processing of the bytestream.

The terminology used herein may describe these shortcuts as transformation rules, variation parameters or adaptation parameters which indicate modifying operations or a modified decoding process or decoding module to be used. Such terminology may be used interchangeably to refer to similar functionality.

In certain examples, the decision to implement these operations may be a rate-control decision.

As noted above, the shortcut may be implemented as a string of bits in a header of a bytestream or bitstream. Thus, depending on the configuration of the header and payload, the modifying operator may be applied to the whole of a plane of data, multiple planes or to a particular level of quality (LOQ) or set of data. It is of course contemplated that the shortcut value may be signalled in any other suitable means to modify operation of the decoding module.

The choice of shortcut may for example be constant for a version of a plane and the shortcut is fixed. For a new plane or version of a plane, one can change the shortcut.

When encoding a plane, the encoder can consider which modifying operation or option will be more beneficial. For example, an extra table will take up space in the stream but can save overall space. If there are 1000 tuples all having a number 5 or less then a list may need to be 5 long but supplies an attribute to a 1000 different subsets. In this way, the shortcut can indicate how the data is set or retrieved at the decoder.

In a particular example, this concept may have particular utility with other aspects of the present disclosure. For example, in certain embodiments the shortcuts control which attributes are associated with the data structures. Similarly, the shortcuts can indicate which implementation option is shown from a plurality of implementation options.

Examples of several possible shortcuts will now be described.

In one example, the shortcut may indicate that where there is a list of attributes, a single index value may indicate which of a set of attributes are to be used for each subset. That is, where a tableau data structure or root data structure indicates the attributes of a later data structure, an index value may point to a set of attributes to be used.

Alternatively, the index value may instead point to a set of further indices. The shortcut may indicate which of these options is to be used.

In a specific example, an index of 33 in the data structure may indicate that a later data structure should be decoded according to a set of attributes pointed to by 33 in a list. A different shortcut may indicate that instead 33 points to a list of tuples e.g. {43, 18, 5}, i.e. row 43 in list A, row 18 in list B and row 5 in list B. Thus, the shortcut can optimist the communication of index values to the decoder from the encoder and the speed of decoding the data, together with data overhead.

Of course it will be understood that these attributes and tuples may be stored in a data store or signalled in the bytestream or bitstream.

In a further example, a shortcut may indicate that an index is not sent or an attribute is not indicated in the data structures. That is, the shortcut may indicate that some data structures are decoded according to different attributes and some do not. In a detailed implementation of this example, data structures of a different plane are not allowed to have different attributes but between planes they can be different, possibly without those being signalled in the header. This can be summarised as an intra-plane or inter-plane difference.

In an additional shortcut example, the shortcut may indicate to the decoder that no node signals are sent. For example, in the decoding process described above, all node signals can be assumed to be [1111] and thus cost nothing to send. The data structure may only contain data elements but these can be spatially located using the predetermined mapping orders described above. In sum, all quadtrees may be dense, but the symbols are not sent to reduce overhead.

In a particularly advantageous example of a shortcut, the encoder may indicate to the decoder that no quantization parameters are sent and quantization has not occurred. Thus the decoder may not implement quantization for the data structure. This provides for selective lossless encoding. In sum, the shortcut may indicate that quantization is disabled.

Similarly, a shortcut may indicate a particular transformation should be performed on a block.

Thus it can be seen how a shortcut value or variation parameter can be used by the decoder to vary a decoding operation or utilise a different decoding operation to optimise decoding of a set of data.

It will be clear to one skilled in the art how techniques described herein may be embodied within a system comprising an encoder and a decoder. At the decoder, the encoded data set may be retrieved from a data store or received from a streaming server. In such a further embodiment, one or more streaming server(s) may be connected to a plurality of client devices. At the streaming server, the encoder may receive and encode a video or image stream and deliver the stream (e.g. bytestream or bitstream) to the client devices. Thus the stream can be decoded by a decoder to recreate the information that has been comprised. Any suitable mechanism to deliver the stream may be used, such as unicast or multicast, as would be well-known to the skilled person.

Techniques described here may be suitable for the encoding, decoding and reconstruction of any dimension array of data. However, although the techniques are also applicable to linear data, they are most beneficial for image or video reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream or bitstream. Residuals are further defined in the present application, but in general residuals refer to a difference between a value of a reference array and an actual array of data. Thus, the techniques are most suitable for any plane of data.

It should be noted that techniques described in the following examples are agnostic as to the meaning or use of the decoded array. Of course, the data set may be used to reconstruct a larger dataset by combining multiple decoded data sets. Once recreated the data may represent any information which has been compressed, such as an image or sonogram. As will be understood from the following described examples, encoding and decoding techniques wherein a quantity of data to be compressed and transmitted or stored by way of a scheme involving encoding the data in a hierarchy of data structures from which the original data can be reconstructed are especially suitable for use with the invention.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programed GPU or a specifically designed FPGA may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

A technique for decoding a bytestream will now be described.

A decoding module would receive a portion of data to be decoded (e.g., Stream). This portion of data would be part of a data stream, such as a Bytestream or Bitstream. This portion of data may be of variable length (for example, 3 bytes or equivalently 24 bits) and is typically associated with an elementary data structure that describes the data to be decoded, for example the data structure called Tile as further described in the present application and other applications by the same applicant such as European patent application No. 17386045.3 and/or 17386046.1 both filed on 6 Dec. 2017 and incorporated herein by reference.

To enable decoding of the portion of data, use of some additional data such as metadata may be required. This metadata may be present in the portion of data itself (for example, the portion of data may include a header field containing said metadata and a payload field containing data to be decoded), or could be received as part of a separate data field, such as a data field including metadata for multiple portions of data (e.g., for all the Streams in a Surface, wherein Surface is described elsewhere) with the portions of data included in a payload field. This separate data field may be received prior to the portion of data. The header field of the portion of data may be decoded ahead of the payload field in order to enable decoding of the data to be decoded. This separate data field may be decoded ahead of a portion of data. The metadata themselves may be associated with the elementary data structure that describes the metadata, for example the data structure called Tableau as further described in the present application and other applications such as the above-mentioned European patent application No. 17386045.3 and/or 17386046.1.

Note that Tile and Tableau are two embodiments of the same data structure called Tessera, as further described in the present application and other applications by the same applicant such as the above-mentioned European patent application No. 17386045.3 and/or 17386046.1.

As discussed above, the data stream (e.g., Bytestream) may include multiple portions of data. Typically, there are no gaps between different portions of data—in other words, the last byte (or bit) of a first portion of data is followed in the data stream by the first byte (or bit) of a second portion of data. The metadata may be used to indicate a length associated with a portion of data (e.g., a StreamLength). These lengths can range from zero to an arbitrary maximum number of bytes associated with a portion of stream.

During encoding, the data to be encoded (for example, transformed residual data) are processed so that they are divided into groupings of data, with each grouping of data associated with an elementary data structure (e.g., Tessera) as discussed above. For example, with reference to FIG. 19, a first grouping of data G1 may be associated with a first elementary data structure T1 and gets encoded as first encoded data set E1, a second grouping of data may be associated with a second elementary data structure T2 and gets encoded as second encoded data set E2, a third grouping of data G3 may be associated with a third elementary data structure T3 and gets encoded as first encoded data set E1, and so forth. When transmitting to the decoder, a data stream would need to be created, said data stream being formed by a sequence of bytes corresponding to the sequence of encoded data sets, first E1, then E2, then E3 and so forth.

Since the data to be encoded may be sparse in nature (e.g., many of those data to be encoded are either zero or below a certain threshold), some of these groupings of data to be encoded may be completely empty, for example G2 may be completely empty. That means that whilst G1 and G3 contains some data to be decoded and therefore the corresponding encoded data sets E1 and E3, respectively, contains data to be decoded, G2 does not contains any data and therefore the corresponding encoded data set E2 contains no data. Accordingly, the data stream will contain a first portion of data corresponding to E1 and a second portion of data corresponding to E3, with no portion of data corresponding to E2.

Since the decoding module would not know a priori that there is no portion of data corresponding to E2, and since the data stream as discussed above has no gaps, the decoder needs to receive information about the length of each of the portion of data to reconstruct and decode the various groupings of data. Accordingly, the metadata MD will contain information about the length of the various portions of data in the data stream. In the exemplary FIG. 19, E1 has length of X bytes, E2 has a length of 0 bytes, E3 has a length of Y bytes.

The decoding module will extract the length information from the metadata MD, and based on it extract from the data stream the corresponding portions of data. With reference to the exemplary FIG. 19, the decoding module extracts the length of E1 as X bytes, Accordingly, the first X bytes of the payload data will be associated with E1. Further, since the decoding module would extract the length of E2 as 0 bytes whilst the length of E3 as Y bytes, the decoding module will associate the next X bytes in the payload data with E3, therefore knowing that E2 has no data associated with it. Accordingly, the decoding module will decode E1 and E3 to arrive at the reconstructed versions of, respectively, groupings of data G1 and grouping of data G3, but it will not reconstruct any grouping of data G2.

As described in the present application and other applications such as the above-mentioned European patent application No. 17386045.3 and/or 17386046.1, the data to be decoded are organised in tiers of Tesserae, with the top Tier (Tier 0) being the Tesserae associated with transformed residual data (also known as Tiles), Tier-1 being the Tesseare associated with metadata of the Tiles on Tier 0 (these Tesserae also known as Tableaux), Tier-2 being the Tesserae associated with metadata of the Tableaux of Tier-1, and so on and so forth. These metadata could be, for example, the length of the portions of data associated with the Tiles (if we are referring to Tier-1) or the length of the portions of data associated with the Tableaux (if we are referring to Tier-2).

Accordingly, when a decoding module receives the data stream it shall extract information about the length of the portions of data associated with the various Tesserae.

Tesserae are decoded in phases, each phase corresponding to decoding a Tier. This is further described in the present patent application. A Tableau tier decoding phase involves using Streamlengths to "find" the Tableaux for that Tier, then decoding the "found" Tesserae to obtain more Streamlengths. The Tile tier decoding phase involves using Streamlengths to find the Tiles, and decoding the "found" Tiles to get residuals (all other residuals being zero).

Figure 23:
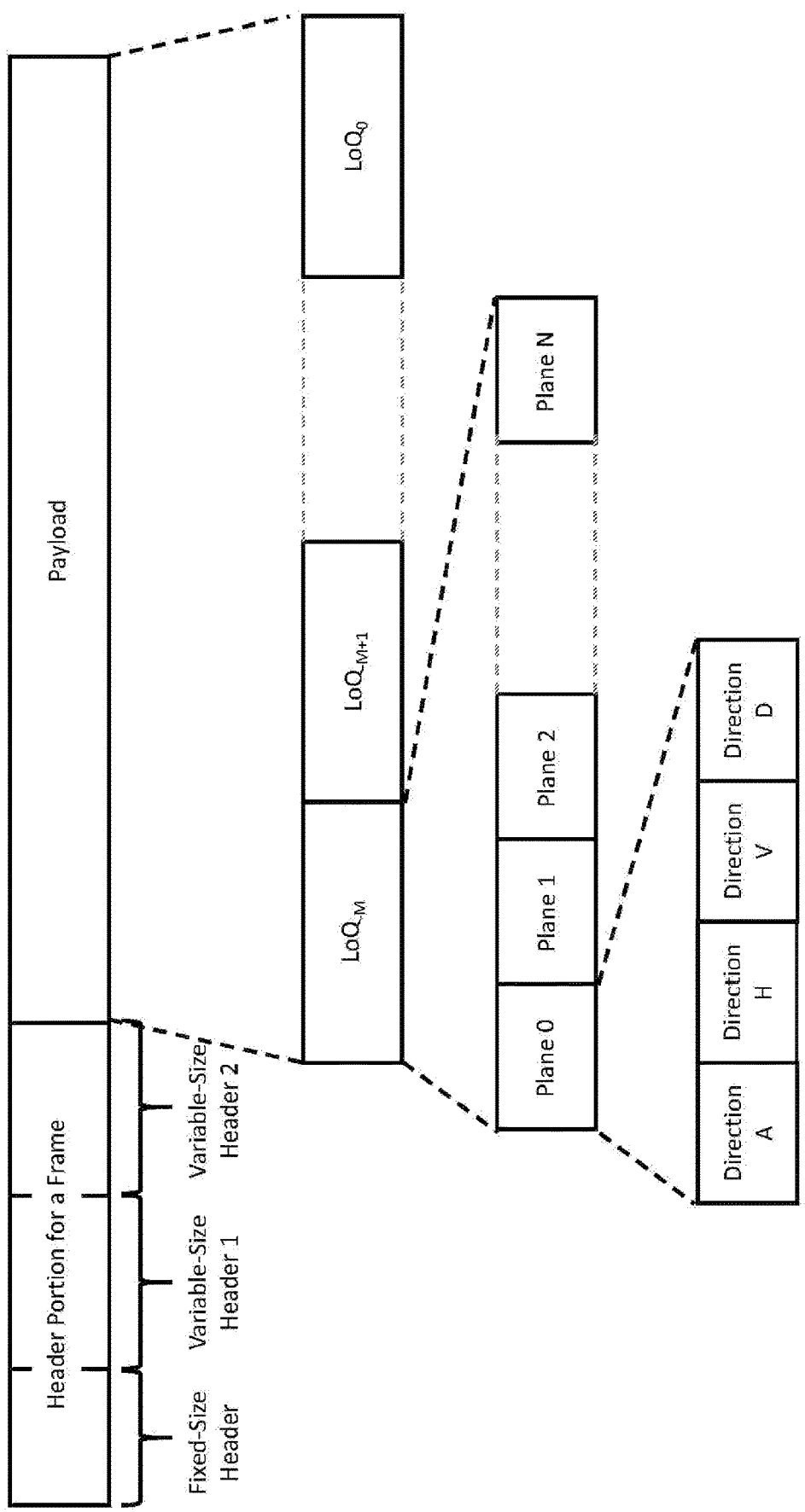
FIG. 23 illustrates a bytestream structure for a frame.

As shown in FIG. 23, the bytestream may include multiple fields, namely one or more headers and a payload. In general, a payload includes the actual data to be decoded, whilst the headers provide information needed when decoding the payload. The payload may include information about a plurality of planes. In other words, the payload is subdivided in portions, each portion corresponding to a plane. Each plane further comprises multiple sub-portions, each sub-portion associated with a level of quality. The logical structure of a Payload is an array of multi-tiered Tableaux, which precedes the Tile Tier with Tiles containing Residuals at their Top Layer. The data in the Payload that represents a Tessera shall be a Stream. In the present example, Streams are ordered by LoQ, then by Plane, then by direction and then by Tier. However, the Streams can be ordered in any other way, for example first direction, then LoQ, the Plane, then Tier. The order between directions, LoQ and Planes can be done in any way, and the actual order can be inferred by using the information in the header, for example the stream_offsets info.

The payload contains a series of streams, each stream corresponding to an encoded tessera. For the purpose of this example, we assume that the size of a tessera is 16×16. First, the decoding module would derive a root tableau (for example, associated with a first direction of a first LoQ within a first plane). From the root tableau, the decoding module would derive up to 256 attributes associated with the corresponding up to 256 tesserae associated with it and which lie in the tier above the root tier (first tier). In particular, one of the attributes is the length of the stream associated with the tessera. By using said streamlengths, the decoding module can identify the individual streams and, if implemented, decode each stream independently. Then, the decoding module would derive, from each of said tessera, attributes associated with the 256 tesserae in the tier above (second tier). One of these attributes is the length of the stream associated with the tessera. By using said streamlengths, the decoding module can identify the individual streams and, if implemented, decode each stream independently. The process will continue until the top tier is reached. Once the top tier has been reached, the next stream in the bytestream would correspond to a second root tableau (for example, associated with a second direction of a first LoQ within a first plane), and the process would continue in the same way.

Figure 20:
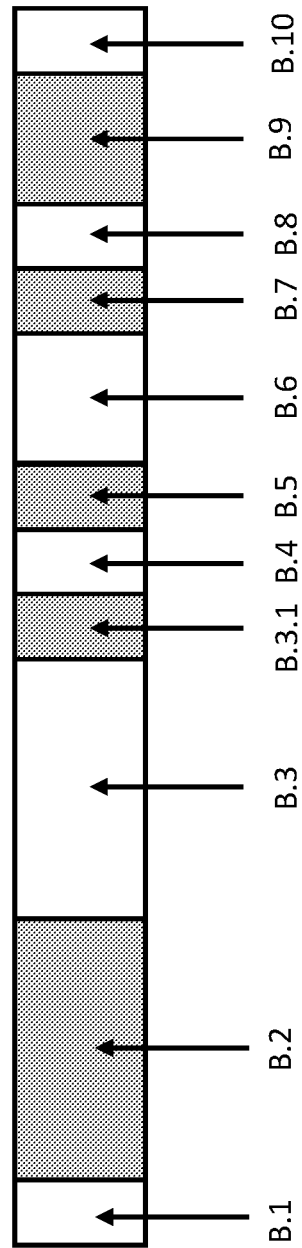
FIG. 20 illustrates a fixed-size header.

The bytestream may include a fixed-sized header, i.e. a header whose byte/bit length is fixed. The header may include a plurality of fields. FIG. 20 shows an example of said fixed-sized header.

The fixed-sized header may include a first field indicating a version of the bytestream format (B.1—also described as format_version: unit8). In an embodiment, this first field may include 8 bits (or equivalently 1 byte). This field may allow flexibility in the encoding/decoding process to use, adapt and/or modify the version of the bytestream format and inform a decoding module of said version. In this way, it is possible to use multiple different version of the encoding/decoding format and allow the decoding module to determine the correct version to be used.

A decoding module would obtain said first field from the bytestream and determine, based on the value included in said first field, a version of the encoding format to be used in the decoding process of said bytestream. The decoding module may use and/or implement a decoding process to adapt to said version.

The fixed-sized header may include a second field indicating a size of the picture frame encoded with a specific bytestream (B.2—also described as picture_size: unit32). The size of the picture frame may actually correspond to the size of the bytestream associated with that picture frame. In an embodiment, this first field may include 32 bits (or equivalently 4 bytes). The size of the picture frame may be indicated in units of bytes, but other units may be used. This allows the encoding/decoding process flexibility in encoding picture frames of different size (e.g., 1024×720 pixels, 2048×1540 pixels, etc.) and allow the decoding module to determine the correct picture frame size to be used for a specific bytestream.

A decoding module would obtain said second field from the bytestream and determine, based on the value included in said second field, a size of a picture frame corresponding to said bytestream. The decoding module may use and/or implement a decoding process to adapt to said size, and in particular to reconstruct the picture frame from the encoded bytestream to fit into said size.

The fixed-sized header may include a third field indicating a recommended number of bits/bytes to fetch/retrieve at the decoding module when obtaining the bytestream (B.3—also described as recommended_fetch_size: unit32). In an embodiment, this first field may include 32 bits (or equivalently 4 bytes). This field may be particularly useful in certain applications and/or for certain decoding modules when retrieving the bytestream from a server, for example to enable the bytestream to be fetched/retrieved at the decoding module in "portions". For example, this may enable partial decoding of the bytestream (as further described, for example, in European patent application No 17386047.9 filed on 6 Dec. 2017 by the same applicant whose contents are included in their entirety by reference) and/or optimise the retrieval of the bytestream by the decoding module (as for example further described in European patent application No 12759221.0 filed on 20 Jul. 2012 by the same applicant whose contents are included in their entirety by reference).

A decoding module would obtain said third field from the bytestream and determine, based on the value included in said third field, a number of bits and/or bytes of the bytestream to be retrieved from a separate module (for example, a server and/or a content delivery network). The decoding module may use and/or implement a decoding process to request to the separate module said number of bits and/or bytes from the bytestream, and retrieve them from the separate module.

The fixed-sized header may include another field indicating a generic value in the bytestream (B.3.1—also described as element_interpretation: uint8). In an embodiment, this first field may include 8 bits (or equivalently 1 byte).

A decoding module would obtain said another field from the bytestream and determine, based on the value included in said another field, a value indicated by the field.

The fixed-sized header may include a fourth field indicating various system information, including the type of transform operation to be used in the decoding process (B.4—also described as pipeline: unit8). In an embodiment, this first field may include 8 bits (or equivalently 1 byte). A transform operation is typically an operation that transform a value from an initial domain to a transformed domain. One example of such a transform is an integer composition transform. Another example of such a transform is a composition transform. The composition transform (integer and/or standard) are further described in European patent application No. 13722424.2 filed on 13 May 2013 by the same applicant and incorporated herein by reference.

A decoding module would obtain said fourth field from the bytestream and determine, based on at least one value included in said fourth field, a type of transform operation to be used in the decoding process. The decoding module may configure the decoding process to use the indicated transform operation and/or implement a decoding process which uses the indicated transform operation when converting one or more decoded transformed coefficient and/or value (e.g., a residual) into an original non-transform domain.

The fixed-sized header may include a fifth field indicating a type of up-sampling filtering operation to be used in the decoding process (B.5—also described as upsampler: unit8). In an embodiment, this first field may include 8 bits (or equivalently 1 byte). An up-sampling filtering operation comprises a filter which applies certain mathematical operations to a first number of samples/values to produce a second number of samples/values, wherein the second number is higher than the first number. The mathematical operations can either be pre-defined, adapted either based on an algorithm (e.g., using a neural network or some other adaptive filtering technique) or adapted based on additional information received at the decoding module. Examples of such up-sampling filtering operations comprise a Nearest Neighbour filtering operation, a Sharp filtering operation, a Bi-cubic filtering operation, and a Convolutional Neural Network (CNN) filtering operations. These filtering operations are described in further detail in the present application, as well as in UK patent application No. 1720365.4 filed on 6 Dec. 2017 by the same applicant and incorporated herein by reference.

A decoding module would obtain said fifth field from the bytestream and determine, based on at least one value included in said fifth field, a type of up-sampling operation to be used in the decoding process. The decoding module may configure the decoding process to use the indicated up-sampling operation and/or implement a decoding process which uses the indicated up-sampling operation. The indication of the upsampling operation to be used allows flexibility in the encoding/decoding process, for example to better suit the type of picture to be encoded/decoded based on its characteristics.

The fixed-sized header may include a sixth field indicating one or more modifying operations used in the encoding process when building the fixed-sized header and/or other headers and/or to be used in the decoding process in order to decode the bytestream (see below) (B.6—also described as shortcuts: shortcuts_t). These modifying operations are also called shortcuts. The general advantage provided by these shortcuts is to reduce the amount of data to be encoded/decoded and/or to optimise the execution time at the decoder, for example by optimising the processing of the bytestream.

A decoding module would obtain said sixth field from the bytestream and determine, based on at least one value included in said sixth field, a type of shortcut used in the encoding process and/or to be used in the decoding process. The decoding module may configure the decoding process to adapt its operations based on the indicated shortcut and/or implement a decoding process which uses the indicated shortcut.

The fixed-sized header may include a seventh field indicating a first number of bits to be used to represent an integer number and a second number of bits to be used to represent a fractional part of a number (B.7—also described as element_descriptor: tuple (uint5, utin3)). In an embodiment, this first field may include 8 bits (or equivalently 1 byte) subdivided in 5 bits for the first number of bits and 3 bits for the second number of bits.

A decoding module would obtain said seventh field from the bytestream and determine, based on at least one value included in said seventh field, how many bits to dedicate to represent the integer part of a number that has both integer and fractional parts and how many bits to dedicate to a fractional number.

The fixed-sized header may include an eighth field indicating a number of planes forming a frame and to be used when decoding the bytestream (B.8—also described as num_plane: unit8). In an embodiment, this first field may include 8 bits (or equivalently 1 byte). A plane is defined in the present application and is, for example, one of the dimensions in a color space, for examples the luminance component Y in a YUV space, or the red component R in an RGB space.

A decoding module would obtain said eighth field from the bytestream and determine, based on at least one value included in said fifth field, the number of planes included in a picture.

The fixed-sized header may include a ninth field indicating a size of an auxiliary header portion included in a separate header—for example the First Variable-Size Header or the Second Variable-Size Header (B.9—also described as aux_header_size: uunt16). In an embodiment, this first field may include 16 bits (or equivalently 2 byte). This field allows the encoding/decoding process to be flexible and define potential additional header fields.

A decoding module would obtain said ninth field from the bytestream and determine, based on at least one value included in said ninth field, a size of an auxiliary header portion included in a separate header. The decoding module may configure the decoding process to read the auxiliary header in the bytestream.

The fixed-sized header may include a tenth field indicating a number of auxiliary attributes (B.10—also described as num_aux_tile_attribute: uint4 and num_aux_tableau_attribute: uint4). In an embodiment, this first field may include 8 bits (or equivalently 1 byte) split into two 4-bits sections. This field allows the encoding/decoding process to be flexible and define potential additional attributes for both Tiles and Tableaux. These additional attributes may be defined in the encoding/decoding process.

A decoding module would obtain said tenth field from the bytestream and determine, based on at least one value included in said tenth field, a number of auxiliary attributes associated with a tile and/or a number of auxiliary attributes associated with a tableau. The decoding module may configure the decoding process to read said auxiliary attributes in the bytestream.

Figure 21:
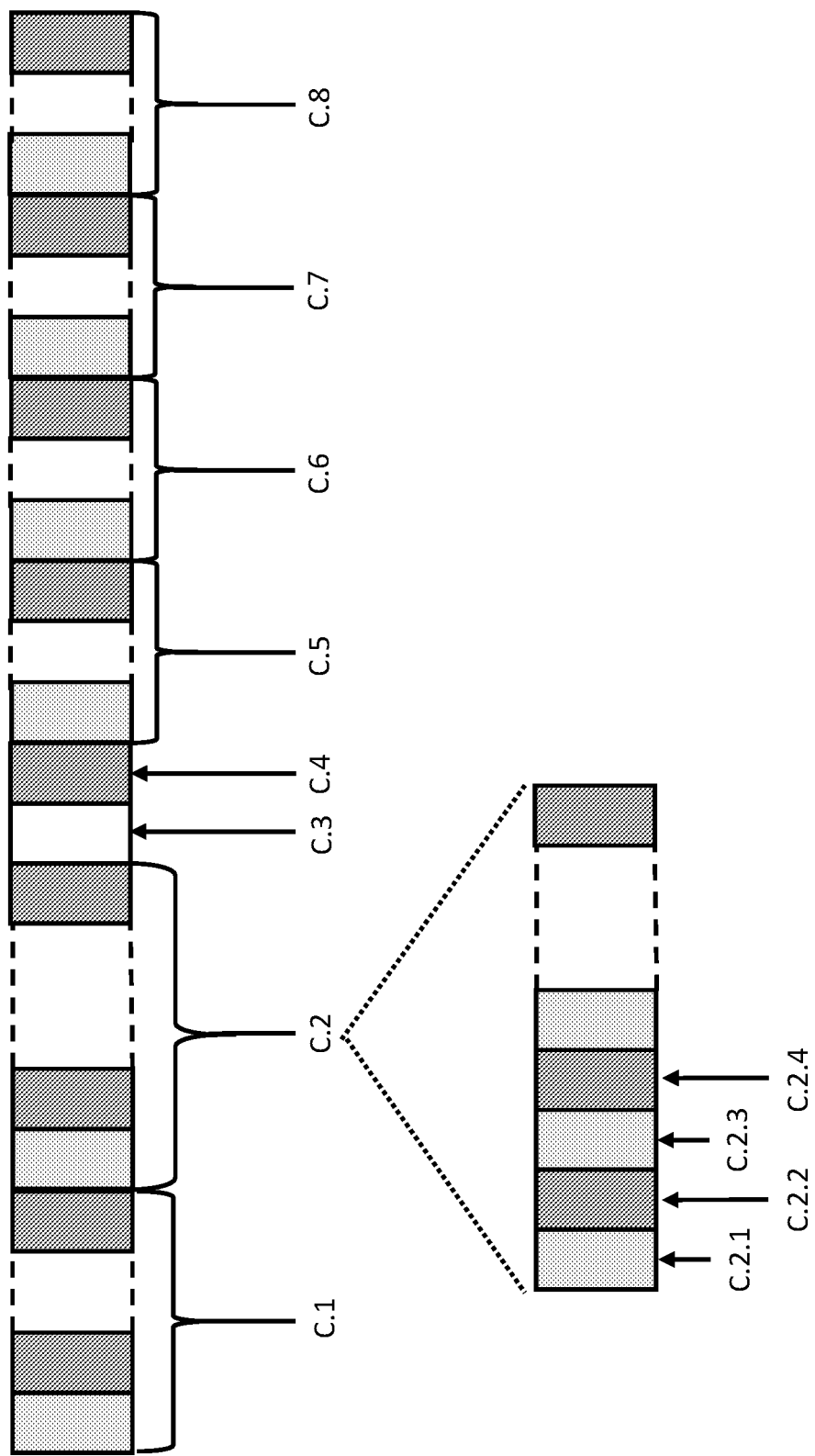
FIG. 21 illustrates a first variable-sized header.

The bytestream may include a first variable-sized header, i.e. a header whose byte/bit length is changeable depending on the data being transmitted within it. The header may include a plurality of fields. FIG. 21 shows an example of said first variable-sized header.

The first variable-sized header may include a first field indicating a size of a field associated with an auxiliary attribute of a tile and/or a tableau (C.1—also described as aux_attribute_sizes: until 6[num_aux_the_attribute+num_aux_tableau_attribute]). In an embodiment, the second field may include a number of sub-fields, each indicating a size for a corresponding auxiliary attribute of a tile and/or a tableau. The number of these sub-fields, and correspondingly the number of auxiliary attributes for a tile and/or a tableau, may be indicated in a field of a different header, for example the fixed header described above, in particular in field B.10. In an embodiment, this first field may include 16 bits (or equivalently 2 bytes) for each of the auxiliary attributes. Since the auxiliary attributes may not be included in the bytestream, this field would allow the encoding/decoding process to define the size of the auxiliary attributes were they to be included in the bytestream. This contrasts, for example, with the attributes (see for example C.2 below) which typically are pre-defined in size and therefore their size does not need to be specified and/or communicated.

A decoding module would obtain said first field from the bytestream and determine, based on a value included in said first field, a size of an auxiliary attribute associated with a tessera, (i.e., either a tile or a tableau). In particular, the decoding module may obtain from said first field in the bytestream, a size of an auxiliary attribute for each of the auxiliary attributes which the decoding module is expecting to decode, for example based on information received separately about the number of auxiliary attributes to be specified. The decoding module may configure the decoding process to read the auxiliary attributes in the bytestream.

The first variable-sized header may include a second field indicating, for each attribute of a tile and/or a tableau, a number of different versions of the respective attribute (C.2—also described as nums_attribute: unti16[4+num_aux_tile_attribute+num_aux_tableau_attribute]). The second field may include a number of sub-fields, each indicating for a corresponding attribute a number of different version of said respective attribute. The number of these sub-fields, and correspondingly the number of standard attributes and auxiliary attributes for a tile and/or a tableau, may be indicated at least in part in a field of a different header, for example the fixed header described above, in particular in field B.10. The attributes may comprise both standard attributes associated with a tile and/or a tableau and the auxiliary attributes as described above. In an embodiment, there are three standard attributes associated with a tile (e.g., Residual Statistics, T-Node Statistics and Quantization Parameters) and two standard attributes associated with a tableau (e.g., Streamlengths Statistics and T-Node Statistics). In an embodiment, since the T-Node Statistics for the tiles and the tableaux may be the same, they may only require to be specified once. In such embodiment, only four different standard attributes will need to be included (and therefore only four sub-fields, C.2.1 to C.2.4, each associated with one of the four standard attributes Residual Statistics, T-Node Statistics, Quantization Parameters and Streamlengths Statistics, are included in the second field, each indicating a number of different versions of the respective attribute). Accordingly, there may be four different sub-fields in said second field, each indicating the number of standard attributes for a tile and/or a tableau which need to be specified for the decoding process. By way of example, if the sub-field associated with the T-Node Statistics indicate a number 20, it means that there will be 20 different available versions of T-Node Statistics to use for tiles and/or attributes.

A decoding module would obtain said second field from the bytestream and determine, based on a value included in said second field, a number of different versions of a respective attribute, said attribute associated with a tile and/or a tableau. The decoding module may configure the decoding process to use the available versions of the corresponding attributes.

The first variable-sized header may include a third field indicating a number of different groupings of tiles, wherein each grouping of tiles is associated with a common attribute (C.3—also described as num_tileset: uint16). In an embodiment, this first field may include 16 bits (or equivalently 2 bytes). In an embodiment, the common attribute may be the T-Node Statistics for a tile. For example, if a grouping of tiles (also known as "tileset") is associated with the same T-node Statistics, it means that all the tiles in that grouping shall be associated with the same T-Node Statistics. The use of grouping of tiles sharing one or more common attributes allows the coding and decoding process to be flexible in terms of specifying multiple versions of a same attribute and associate them with the correct tiles. For example, if a group of tiles belongs to "Group A", and "Group A" is associated with "Attribute A" (for example, a specific T-Node Statistics), then all the tiles in Group A shall use that Attribute A. Similarly, if a group of tiles belongs to "Group B", and "Group B" is associated with "Attribute B" (for example, a specific T-Node Statistics different from that of Group A), then all the tiles in Group B shall use that Attribute B. This is particularly useful in allowing the tiles to be associated with a statistical distribution as close as possible to that of the tile but without having to specify different statistics for every tile. In this way, a balance is reached between optimising the entropy encoding and decoding (optimal encoding and decoding would occur if the distribution associated with the tile is the exact distribution of that tile) whilst minimising the amount of data to be transmitted. Tiles are grouped, and a "common" statistics is used for that group of tiles which is as close as possible to the statistics of the tiles included in that grouping. For example, if we have 256 tiles, in an ideal situation we would need to send 256 different statistics, one for each of the tiles, in order to optimise the entropy encoding and decoding process (an entropy encoder/decoder is more efficient the more the statistical distribution of the encoded/decoded symbols is close to the actual distribution of said symbols). However, sending statistics is impractical and expensive in terms of compression efficiency. So, typical systems would send only one single statistics for all the 256 tiles. However, if the tiles are grouped into a limited number of groupings, for example 10, with each tile in each grouping having similar statistics, then only 10 statistics would need to be sent. In this way, a better encoding/decoding would be achieved than if only one common statistics was to be sent for all the 256 tiles, whilst at the same time sending only 10 statistics and therefore not compromising too much the compression efficiency.

A decoding module would obtain said third field from the bytestream and determine, based on a value included in said third field, a number of different groupings of tiles. The decoding module may configure the decoding process to use, when decoding a tile corresponding to a specific grouping, one or more attributes associated with said grouping.

The first variable-sized header may include a fourth field indicating a number of different groupings of tableaux, wherein each grouping of tableaus is associated with a common attribute (C.4—also described as num_tableauset: uint16). In an embodiment, this fourth field may include 16 bits (or equivalently 2 bytes). This field works and is based on the same principles as the third field, except that in this case it refers to tableaux rather than tiles.

A decoding module would obtain said fourth field from the bytestream and determine, based on a value included in said fourth field, a number of different groupings of tableaux. The decoding module may configure the decoding process to use, when decoding a tableau corresponding to a specific grouping, one or more attributes associated with said grouping.

The first variable-sized header may include a fifth field indicating a width for each of a plurality of planes (C.5—also described as widths: uint16[num_plane]). In an embodiment, this fifth field may include 16 bits (or equivalently 2 bytes) for each of the plurality of planes. A plane is further defined in the present specification, but in general is a grid (usually a two-dimensional one) of elements associated with a specific characteristic, for example in the case of video the characteristics could be luminance, or a specific color (e.g. red, blue or green). The width may correspond to one of the dimensions of a plane. Typically, there are a plurality of planes.

A decoding module would obtain said fifth field from the bytestream and determine, based on a value included in said fifth field, a first dimension associated with a plane of elements (e.g., picture elements, residuals, etc.). This first dimension may be the width of said plane. The decoding module may configure the decoding process to use, when decoding the bytestream, said first dimension in relation to its respective plane.

The first variable-sized header may include a sixth field indicating a width for each of a plurality of planes (C.6—also described as heights: uint16[num_plane]). In an embodiment, this sixth field may include 16 bits (or equivalently 2 bytes) for each of the plurality of planes. The height may correspond to one of the dimensions of a plane.

A decoding module would obtain said sixth field from the bytestream and determine, based on a value included in said sixth field, a second dimension associated with a plane of elements (e.g., picture elements, residuals, etc.). This second dimension may be the height of said plane. The decoding module may configure the decoding process to use, when decoding the bytestream, said second dimension in relation to its respective plane.

The first variable-sized header may include a seventh field indicating a number of encoding/decoding levels for each of a plurality of planes (C.7—also described as num_loqs: uint8[num_plane]). In an embodiment, this seventh field may include 16 bits (or equivalently 2 bytes) for each of the plurality of planes. The encoding/decoding levels correspond to different levels (e.g., different resolutions) within a hierarchical encoding process. The encoding/decoding levels are also referred in the application as Level of Quality A decoding module would obtain said seventh field from the bytestream and determine, based on a value included in said seventh field, a number of encoding levels for each of a plurality of planes (e.g., picture elements, residuals, etc.). The decoding module may configure the decoding process to use, when decoding the bytestream, said number of encoding levels in relation to its respective plane.

The first variable-sized header may include an eighth field containing information about the auxiliary attributes (C.8—also described as aux_header: uint8[aux_header_size]). In an embodiment, this eight field may include a plurality of 8 bits (or equivalently 1 byte) depending on a size specified, for example, in a field of the fixed header (e.g., B.9)

A decoding module would obtain said eighth field from the bytestream and determine information about the auxiliary attributes. The decoding module may configure the decoding process to use, when decoding the bytestream, said information to decode the auxiliary attributes.

Figure 22:
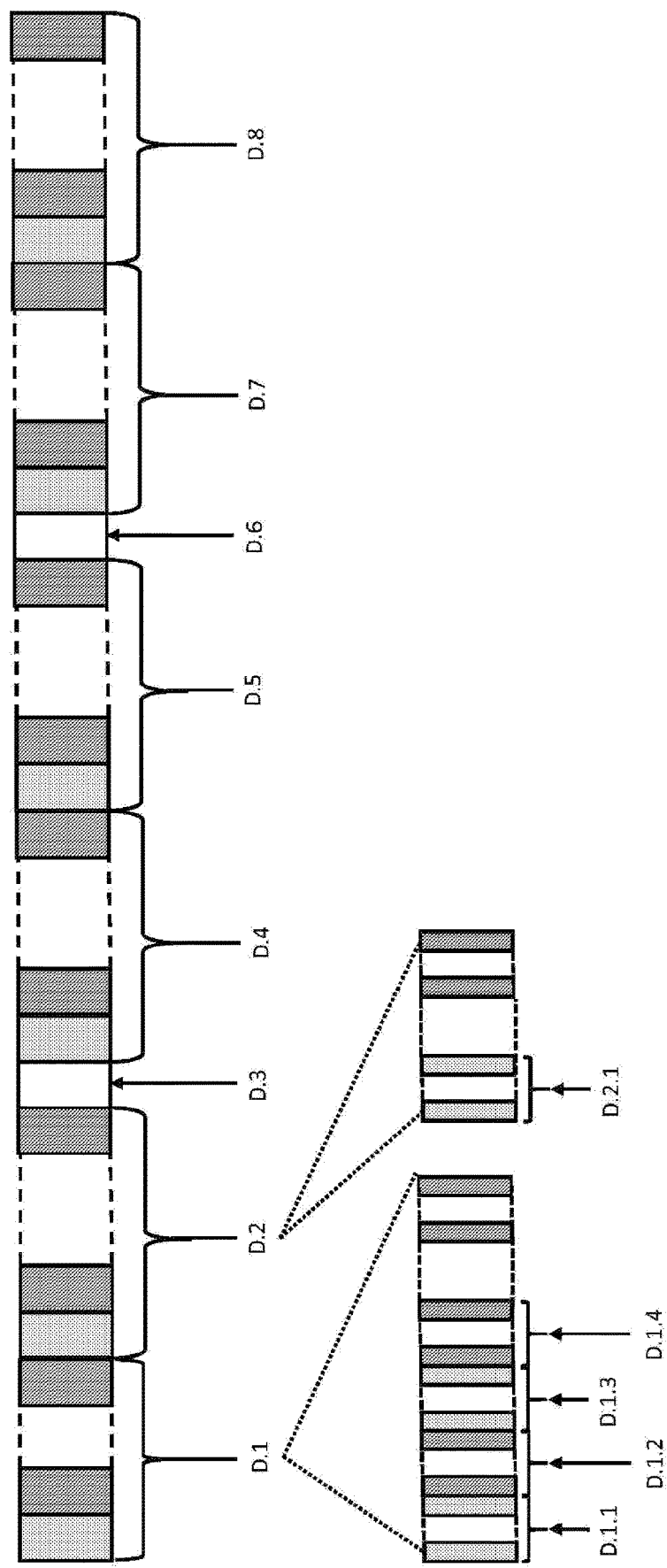
FIG. 22 illustrates a second-variable sized header.

The bytestream may include a second variable-sized header, i.e. a header whose byte/bit length is changeable depending on the data being transmitted within it. The header may include a plurality of fields. FIG. 22 shows an example of said second variable-sized header.

The second variable-sized header may include a first field containing, for each attribute, information about one or more statistics associated with the respective attribute (see D.1). The number of statistics associated with a respective attribute may be derived separately, for example via field C.2 as described above. The statistics may be provided in any form. In an embodiment of the present application, the statistics is provided using a particular set of data information which includes information about a cumulative distribution function (type residual_stat_t).

In particular, a first group of sub-fields in said first field may contain information about one or more statistics associated with residuals values (also D.1.1—also described as residual_stats: residual_stat_t[nums_attribute[0]]). In other words, the statistics may identify how a set of residual data are distributed. The number of statistics included in this first group of sub-fields may be indicated in a separate field, for example in the first sub-field C.2.1 of field C.2 as described above (also indicated as nums_attribute[0]). For example, if nums_attribute[0] is equal to 10, then there would be 10 different residuals statistics contained in said first field. For example, the first 10 sub-fields in the first field correspond to said different 10 residuals statistics.

A second group of sub-fields in said first field may contain information about one or more statistics associated with nodes within a Tessera (also D.1.2—also described as tnode_stats: tnode_stat_t[nums_attribute[1]]). In other words, the statistics may identify how a set of nodes are distributed. The number of statistics included in this second group of sub-fields may be indicated in a separate field, for example in the second sub-field C.2.2 of field C.2 as described above (also indicated as nums_attribute[1]). For example, if nums_attribute[1] is equal to 5, then there would be 5 different t-node statistics contained in said first field. For example, considering the example above, after the first 10 sub-fields in the first field, the next 5 sub-fields correspond to said 5 different t-node statistics.

A third group of sub-fields in said first field may contain information about one or more quantization parameters (also D.1.3—also described as quantization parameters: quantization_parameters_t[nums_attribute[2]]). The number of quantization parameters included in this third group of sub-fields may be indicated in a separate field, for example in the third sub-field C.2.3 of field C.2 as described above (also indicated as nums_attribute[2]). For example, if nums_attribute[2] is equal to 10, then there would be 10 different quantization parameters contained in said first field. For example, considering the example above, after the first 15 sub-fields in the first field, the next 10 sub-fields correspond to said 10 different quantization parameters.

A fourth group of sub-fields in said first field may contain information about one or more statistics associated with streamlengths (also D.1.4—also described as stream_length_ stats: stream_length_stat_t[nums_attribute[3]]). In other words, the statistics may identify how a set of streamlengths are distributed. The number of statistics included in this fourth group of sub-fields may be indicated in a separate field, for example in the fourth sub-field C.2.4 of field C.2 as described above (also indicated as nums_attribute[3]). For example, if nums_attribute[4] is equal to 12, then there would be 12 different streamlengths statistics contained in said first field. For example, considering the example above, after the first 25 sub-fields in the first field, the next 12 sub-fields correspond to said 12 different streamlengths statistics.

Further groups of sub-fields in said first field may contain information about auxiliary attributes (also described as aux_atttributes: uint1[aux_attributes_size[i]] [num_aux_the_attribute+num_aux_tableau_attribute]). The number of auxiliary attributes may be indicated in another field, for example in field C.2 as described above.

Specifying one or more versions of the attributes (e.g., statistics) enables flexibility and accuracy in the encoding and decoding process, because for instance more accurate statistics can be specified for a specific grouping of tesserae (tiles and/or tableaux), thus making it possible to encode and/or decode said groupings in a more efficient manner.

A decoding module would obtain said first field from the bytestream and determine, based on the information contained in said first field, one or more attributes to be used during the decoding process. The decoding module may store the decoded one or more attributes for use during the decoding process. The decoding module may, when decoding a set of data (for example, a tile and/or a tableau) and based on an indication of attributes to use in relation to that set of data, retrieve the indicated attributes from the stored decoded one or more attributes and use it in decoding said set of data.

The second variable-sized header may include a second field containing, for each of a plurality of grouping of tiles, an indication of a corresponding set of attributes to use when decoding said grouping (D.2—also described as tilesets: uint16[3+num_aux_tile_attributes] [num_tiles]). The number of groupings of tiles may be indicated in a separate field, for example in field C.3 described above. This second field enables the encoding/decoding process to specify which of the sets of attributes indicated in field D.1 described above is to be used when decoding a tile.

A decoding module would obtain said second field from the bytestream and determine, based on the information contained in said second field, which of a set of attributes is to be used when decoding a respective grouping of tiles. The decoding module would retrieve from a repository storing all the attributes the ones indicated in said second field, and use them when decoding the respective grouping of tiles. The decoding process would repeat said operations when decoding each of the plurality of grouping of tiles.

By way of example, and using the example described above in relation to field D.1, let's assume that for a first grouping of tiles the set of attributes indicated in said second field corresponds to residuals statistics No. 2, t_node statistics No. 1 and to quantization parameter No. 4 (we assume for simplicity that there are no auxiliary attributes). When the receiving module receives said indication, it would retrieve from the stored attributes (as described above) the second residuals statistics from the 10 stored residuals statistics, the first t_node statistics from the 5 stored t_node statistics and the fourth quantization parameter from the 10 stored quantization parameters.

The second variable-sized header may include a fourth field containing, for each of a plurality of grouping of tableaux, an indication of a corresponding set of attributes to use when decoding said grouping (D.4—also described as tableausets: uint16[2+num_aux_tableaux_attributes] [num_tableaux]). The number of groupings of tableaux may be indicated in a separate field, for example in field C.4 described above. This fourth field enables the encoding/decoding process to specify which of the sets of attributes indicated in field D.1 described above is to be used when decoding a tableau.

The principles and operations behind this fourth field corresponds to that described for the second field, with the difference that in this case it applies to tableaux rather than tiles. In particular, a decoding module would obtain said fourth field from the bytestream and determine, based on the information contained in said fourth field, which of a set of attributes is to be used when decoding a respective grouping of tableaux. The decoding module would retrieve from a repository storing all the attributes the ones indicated in said fourth field, and use them when decoding the respective grouping of tableaux. The decoding process would repeat said operations when decoding each of the plurality of grouping of tableaux.

The second variable-sized header may include a fifth field containing, for each plane, each encoding/decoding level and each direction, an indication of a corresponding set of attributes to use when decoding a root tableau (D.5—also described as root_tableauset_indices: uint16[loq_idx][num_planes][4]). This fifth field enables the encoding/decoding process to specify which of the sets of attributes indicated in field D.1 described above is to be used when decoding a root tableau.

A decoding module would obtain said fifth field from the bytestream and determine, based on the information contained in said fifth field, which of a set of attributes is to be used when decoding a respective root tableau. The decoding module would retrieve from a repository storing all the attributes the ones indicated in said fifth field, and use them when decoding the respective grouping of tiles.

In this way, the decoding module would effectively store all the possible attributes to be used when decoding tiles and/or tableaux associated with that bytestream, and then retrieve for each of a grouping of tiles and/or tableaux only the sub-set of attributes indicated in said second field to decode the respective grouping of tiles and/or tableaux.

The second variable-sized header may include a third field containing information about the statistics of the groupings of tiles (D.3—also described as cdf_tilesets: line_segments_cdf15_t<tilese_index_t>). The statistics may provide information about how many times a certain grouping of tiles occurs. The statistics may be provided in the form of a cumulative distribution function. In the present application, the way the cumulative distribution function is provided is identified as a function type, specifically type line_segments_cdf15_t<x_axis_type>. By using said statistics, the encoding/decoding process is enabled to compress the information about the grouping of tiles (e.g., the indices of tiles) and therefore optimise the process. For example, if there are N different groupings of tiles, and correspondingly N different indexes, rather than transmitting these indexes in an uncompressed manner, which would require $2^{\lceil \log_2 N \rceil}$ bits (where $\lceil . \rceil$ is a ceiling function), the grouping can be compressed using an entropy encoder thus reducing significantly the number of bits required to communicate the groupings of tiles. This may represent a significant savings. For example, assume that there are 10,000 tiles encoded in the bytestream, and that these tiles are divided in 100 groupings. Without compressing the indexes, an index needs to be sent together with each tile, meaning that at least $2^{\lceil \log_2 100 \rceil}=7$ bits per tile, which means a total of 70,000 bits. If instead the indexes are compressed using an entropy encoder to an average of 1.5 bits per index, the total number of bits to be used would be 15,000, reducing the number of bits to be used by almost 80%.

A decoding module would obtain said third field from the bytestream and determine, based on the information contained in said third field, statistical information about the groupings of tiles. The decoding module would use said statistical information when delving which grouping a tile belongs to. For example, the information about the tile grouping (e.g., tileset index) can be compressed using said statistics and then reconstructed at the decoder using the same statistics, for example using an entropy decoder.

The second variable-sized header may include a sixth field containing information about the statistics of the groupings of tableaux (D.6—also described as cdf_tableausets: line_segments_cdf15_t<tableauset_index_t>). The statistics may provide information about how many times a certain grouping of tableaux occurs. The statistics may be provided in the form of a cumulative distribution function.

This field works in exactly the same manner as the third field but for grouping of tableaux rather than grouping of tiles. In particular, a decoding module would obtain said sixth field from the bytestream and determine, based on the information contained in said sixth field, statistical information about the groupings of tableaux. The decoding module would use said statistical information when deriving which grouping a tableau belongs to. For example, the information about the tableau grouping (e.g., tableauset index) can be compressed using said statistics and then reconstructed at the decoder using the same statistics, for example using an entropy decoder.

The second variable-sized header may include a seventh field containing, for each plane, each encoding/decoding level and each direction, an indication of a location, within a payload of the bytestream, of one or more sub-streams (e.g., a Surface) of bytes associated for that respective plane, encoding/decoding level and direction (D.7—also described as root_stream_offsets: root_stream_offset_t[loq_idx][num_planes][4]). The location may be indicated as an offset with respect to the start of the payload. By way of example, assuming 3 planes, 3 encoding/decoding levels and 4 directions, there will be 3*3*4=36 different sub-streams, and correspondingly there will be 36 different indication of locations (e.g., offsets).

A decoding module would obtain said seventh field from the bytestream and determine, based on the information contained in said seventh field, where to find in the payload a specific sub-stream. The sub-stream may be associated with a specific direction contained in a specific plane which is within a specific encoding/decoding level. The decoding module would use said information to locate the sub-stream and decode said sub-stream accordingly. The decoding module may implement, based on this information, decoding of the various sub-stream simultaneously and/or in parallel. This can be advantageous for at least two reasons. First, it would allow flexibility in ordering of the sub-streams. The decoder could reconstruct, based on the location of the sub-streams, to which direction, plane and encoding/decoding level the sub-stream belongs to, without the need for that order to be fixed. Second, it would enable the decoder to decode the sub-streams independently from one another as effectively each sub-stream is separate from the others.

The second variable-sized header may include an eighth field containing, for each plane, each encoding/decoding level and each direction, a size of the Stream of bytes associated with the root tableau (D.8—also described as root_stream_lengths: root_stream_length_t[loq_idx][num_planes][4]).

A decoding module would obtain said eighth field from the bytestream and determine, based on the information contained in said eighth field, the length of a stream associated with a root tableau.

Further numbered statements of examples described in this document include the following statements.

1. A method of processing metadata associated with a stream of video data, the method comprising the steps of, for a first frame of video data:
   subdividing the first frame of video data into a plurality of tiles;
   calculating a first statistical attribute for each of a plurality of tiles;
   identifying tiles having a first instance of identical, or similar statistical, attributes, and grouping said identified tiles together as a tile set;
   for each tile set defining metadata for the tile set, said metadata indicative of the statistical attribute of the tiles defining the tile set; and
   encoding data indicative of the metadata for the tiles of the first frame of video data based on the metadata defined for each of the tile set to which said tile belongs.

2. The method of statement 1 wherein the encoding occurs using an entropy encoding based technique.

3. The method of any preceding statement wherein the metadata for a tile set further defines a location of each of the tiles forming the tile set.

4. The method of any preceding statement wherein the size of the tiles is fixed.

5. The method of any preceding statement wherein the step of identifying the tiles that form a tile set further comprises ordering the tiles, based on their statistical attributes.

6. The method of statement 5 wherein the ordering of the tiles defines a probability distribution function of the statistical attributes.

7. The method of any preceding statement wherein tiles are encoded in a set order.

8. The method of statement 7 wherein the method further comprises determining the difference between the metadata of a tile and its preceding tile, and encoding the metadata as the difference.

9. The method of statement 7 or 8 wherein in the set order is a z-order traverse.

10. The method of any preceding statement wherein the method further comprise the step of encoding the tiles.

11. The method of statement 10 wherein the step of encoding the tiles comprises determining a level of quantisation and encoding tiles at said level of quantisation 12. The method of statement 11 wherein tiles belonging to a first a first tile set are quantised at a first level of quantisation and tiles belonging to a second tile set are quantised at a second, different, level of quantisation.

13. The method of any preceding statement wherein the statistical attributes of the tile are selected from one or more of the group of: luma, chroma, and number of bits required to encode one or more pixels, within a frame of video data.

14. The method of any preceding statement wherein the first frame of video data is a residual frame, said residual frame being indicative of the differences between a first frame of data and a reference frame.

15. The method of any preceding statement wherein the method further comprises identifying one or more further statistical attributes of the tiles and identifying tiles having a plurality of instances of identical, or similar statistical, attributes, and grouping said identified tiles together as the tile set.

16. A system for encoding metadata associated with a stream of video data, the system comprising a processor, the processor configured to, for a first frame of video data:
subdivide the first frame of video data into a plurality of tiles;
for each of a plurality of tiles calculate a first statistical attributes of the tile;
identify tiles having a first instance of identical, or similar statistical, attributes, and group said identified tiles together as a tile set;
for each tile set define metadata for the tile set, said metadata indicative of the statistical attribute of the tiles defining the tile set; and
encode data indicative of the metadata for the tiles of the first frame of video data based on the metadata defined for each of the tile set to which said tile belongs.

17. A method of decoding metadata associated with a stream of video data, the method comprising the steps of, for a first frame of video data, at a decoder:
obtaining information to enable the decoder to subdivide the first frame of video data into a plurality of tiles;
receiving an encoded stream of metadata, said encoded stream of metadata comprising information identifying tiles having a first instance of identical, or similar statistical, attributes, and information grouping said identified tiles together as a tile set;
obtaining information regarding the identical, or similar statistical, attributes; and
decoding the metadata for each of the tiles forming the tile set with the obtained information regarding the identical, or similar statistical, attributes.

18. The method of statement 17 wherein the encoded data stream is decoded using an entropy encoding based technique.

19. The method of statement 16 or 17 wherein the decoded metadata for a tile set further defines a location of each of the tiles forming the tile set.

20. The method of any of statements 16 to 19 wherein the size of the tiles is fixed.

21. The method of any of statements 16 to 20 comprising the step of obtaining information regarding the order in which the tiles were encoded and decoding the encoded stream based on said order.

22. The method of statement 22 wherein the method further comprises determining the difference between the metadata of a tile and its preceding tile, and decoding the metadata as the difference.

23. The method of statement 21 or 22 wherein in the set order is a z-order traverse.

24. The method of any of statements 16 to 23 further comprising obtaining information regarding a level of quantisation and decoding the data stream at said level of quantisation 25. The method of statement 24 wherein tiles belonging to a first a first tile set are decoded at a first level of quantisation and tiles belonging to a second tile set are decoded at a second, different, level of quantisation.

26. A decoder for decoding an encoded stream of video data, the decoder configured to perform the method of any of statements 17 to 25.

A-1. A method of decoding metadata associated with a stream of video data, the method comprising the steps of, for a first frame of video data, at a decoder:
obtaining information to enable the decoder to subdivide the first frame of video data into a plurality of tiles;
receiving an encoded stream of metadata, said encoded stream of metadata comprising information identifying tiles having a first instance of identical, or similar statistical, attributes, and information grouping said identified tiles together as a tile set;
obtaining information regarding the identical, or similar statistical, attributes; and
decoding the metadata for each of the tiles forming the tile set with the obtained information regarding the identical, or similar statistical, attributes.

A-2. The method of statement A-1 wherein the encoded data stream is decoded using an entropy encoding based technique.

A-3. The method of statement A-1 or A-2 wherein the decoded metadata for a tile set further defines a location of each of the tiles forming the tile set.

A-4. The method of any preceding statement wherein the size of the tiles is fixed.

A-5. The method of any preceding statement comprising the step of obtaining information regarding the order in which the tiles were encoded and decoding the encoded stream based on said order.

A-6. The method of statement A-5 wherein the method further comprises determining the difference between the metadata of a tile and its preceding tile, and decoding the metadata as the difference.

A-7. The method of statement A-5 or A-6 wherein in the set order is a z-order traverse.

A-8. The method of any preceding statement further comprising obtaining information regarding a level of quantisation and decoding the data stream at said level of quantisation A-9. The method of statement A-8 wherein tiles belonging to a first a first tile set are decoded at a first level of quantisation and tiles belonging to a second tile set are decoded at a second, different, level of quantisation.

A-10 A decoder for decoding an encoded stream of video data, the decoder configured to perform the method of any of statements A-1 to A-9.

A-11. A method of processing metadata associated with a stream of video data, the method comprising the steps of, for a first frame of video data:
- subdividing the first frame of video data into a plurality of tiles;
- calculating a first statistical attribute for each of a plurality of tiles;
- identifying tiles having a first instance of identical, or similar statistical, attributes, and grouping said identified tiles together as a tile set;
- for each tile set defining metadata for the tile set, said metadata indicative of the statistical attribute of the tiles defining the tile set; and
- encoding data indicative of the metadata for the tiles of the first frame of video data based on the metadata defined for each of the tile set to which said tile belongs.

A-12. The method of statement A-11 wherein the encoding occurs using an entropy encoding based technique.

A-13. The method of any of statements A-11 or A-12 wherein the metadata for a tile set further defines a location of each of the tiles forming the tile set.

A-14. The method of statements A-11 to A-13 wherein the size of the tiles is fixed.

A-15. The method of statements A-11 to A-14 wherein the step of identifying the tiles that form a tile set further comprises ordering the tiles, based on their statistical attributes.

The invention claimed is:

1. A method of decoding a received set of encoded data representing a two-dimensional array of information that has been compressed, the method comprising:
   obtaining a set of attribute indicators from the data set, each indicator of the set of attribute indicators being associated with a corresponding subset of the data set, wherein each indicator is an index value referencing a set of parameters useable for decoding, and wherein each indicator is difference encoded such that each indicator represents a difference between a current set of parameters and a previous set of parameters; and
   decoding a plurality of subsets of the data set, wherein each subset in the plurality of subsets is to be decoded separately, the decoding comprising:
     retrieving decoding parameters for each subset in the plurality of subsets according to the corresponding attribute indicator that is associated with each subset; and
     decoding each subset in the plurality of subsets according to the retrieved decoding parameters for each subset,
     wherein retrieving the decoding parameters comprises retrieving a plurality of decoding parameters according to each attribute indicator, the plurality of decoding parameters corresponding to different functions of a decoding process.

2. The method of claim 1, wherein each indicator of the set of attribute indicators is associated with a respective subset of the plurality of subsets of the data set.

3. The method of claim 1, wherein the attribute indicators of subsets containing data values rather than metadata values are obtained by separately decoding an attribute metadata subset of the data set, wherein the attribute metadata subset is a subset of the dataset comprising the decoding parameters pointed to by the attribute indicators.

4. The method of claim 1, further comprising:
   obtaining an initial attribute indicator associated with an initial subset of the data set, wherein the initial attribute indicator is an index value pointing to decoding parameters to be used to decode the initial subset;
   retrieving initial decoding parameters of the initial subset according to the initial attribute indicator;
   decoding the initial subset according to the initial decoding parameters, wherein the initial subset contains the attribute indicators of the plurality of subsets of the data set.

5. The method of claim 1, wherein the decoding parameters include quantization parameters or entropy decoding probability metadata or both.

6. An apparatus for decoding a received set of encoded data representing information that has been compressed, said apparatus comprising a processor configured to:
   obtain a set of attribute indicators from the data set, each indicator of the set of attribute indicators being associated with a corresponding subset of the data set, wherein each indicator is an index value referencing a set of parameters useable for decoding, and wherein each indicator is difference encoded such that each indicator is calculated based on a difference between a current set of parameters and a previous set of parameters; and
   decode a plurality of subsets of the data set, wherein each subset in the plurality of subsets is to be decoded separately, said decoding comprising:
     retrieving decoding parameters for each subset in the plurality of subsets according to the corresponding attribute indicator that is associated with each subset; and
     decoding each subset in the plurality of subsets according to the retrieved decoding parameters for each subset,
     wherein retrieving the decoding parameters includes retrieving a plurality of decoding parameters according to each attribute indicator, the plurality of decoding parameters corresponding to different functions of a decoding process.

7. The apparatus of claim 6, wherein each indicator of the set of attribute indicators is associated with a respective subset of the plurality of subsets of the data set.

8. The apparatus of claim 6, wherein the attribute indicators of subsets containing data values rather than metadata values are obtained by separately decoding an attribute metadata subset of the data set, wherein the attribute metadata subset is a subset of the dataset comprising the decoding parameters pointed to by the attribute indicators.

9. The apparatus of claim 6, wherein the processor is further configured to:
   obtain an initial attribute indicator associated with an initial subset of the data set, wherein the initial attribute indicator is an index value pointing to decoding parameters to be used to decode the initial subset;

retrieve initial decoding parameters of the initial subset according to the initial attribute indicator; and decode the initial subset according to the initial decoding parameters, wherein the initial subset contains the attribute indicators of the plurality of subsets of the data set.

10. The apparatus of claim 6, wherein the decoding parameters include quantization parameters or entropy decoding probability metadata or both.

11. A method of encoding a two-dimensional array of information to be compressed into an encoded data set, the method comprising:

encoding a plurality of subsets of a data set, wherein each subset in the plurality of subsets is encoded separately, the encoding comprising:

retrieving encoding parameters for each subset in the plurality of subsets, and encoding each subset in the plurality of subsets according to the retrieved encoding parameters for each subset; and generating a set of attribute indicators, each indicator of the set of attribute indicators being associated with a corresponding subset of the data set according to the retrieved encoding parameters for each subset, wherein:

each indicator is an index value referencing a set of parameters that are useable for decoding, each indicator is difference encoded such that each indicator represents a difference between a current set of parameters and a previous set of parameters, and retrieving the encoding parameters comprises retrieving a plurality of encoding parameters, where the plurality of decoding parameters correspond to different functions of an encoding process.

12. The method of claim 11, wherein each indicator of the set of attribute indicators is associated with a respective subset of the plurality of subsets of the data set.

13. The method of claim 11, wherein the attribute indicators for subsets containing data values rather than metadata values are separately encoded as an attribute metadata subset of the data set, wherein the attribute metadata subset is a subset of the dataset comprising the encoding parameters pointed to by the attribute indicators.

14. The method of claim 11, further comprising:

encoding an initial subset according to retrieved initial encoding parameters, and generating an initial attribute indicator associated with an initial subset of the data set, wherein the initial attribute indicator is an index value pointing to decoding parameters to be used to decode the initial subset; wherein the encoded initial subset contains the attribute indicators of the plurality of subsets of the data set.

15. The method of claim 11, wherein the encoding parameters include quantization parameters or entropy coding probability metadata or both.

16. An apparatus for encoding information to be compressed into an encoded data set, said apparatus comprising a processor configured to:

encode a plurality of subsets of a data set, wherein each subset in the plurality of subsets is encoded separately, wherein the encoding includes:

retrieving encoding parameters for each subset in the plurality of subsets, and encoding each subset in the plurality of subsets according to the retrieved encoding parameters for each subset; and generate a set of attribute indicators, each indicator of the set of attribute indicators being associated with a corresponding subset of the data set according to the retrieved encoding parameters for each subset, wherein:

each indicator is an index value referencing a set of parameters that are useable for decoding, each indicator is difference encoded such that each indicator is calculated based on a difference between a current set of parameters and a previous set of parameters, and retrieving the encoding parameters comprises retrieving a plurality of encoding parameters, where the plurality of decoding parameters correspond to different functions of an encoding process.

17. The apparatus of claim 16, wherein each indicator of the set of attribute indicators is associated with a respective subset of the plurality of subsets of the data set.

18. The apparatus of claim 16, wherein the attribute indicators for subsets containing data values rather than metadata values are separately encoded as an attribute metadata subset of the data set, wherein the attribute metadata subset is a subset of the dataset comprising the encoding parameters pointed to by the attribute indicators.

19. The apparatus of claim 16, where the processor is further configured to:

encode an initial subset according to retrieved initial encoding parameters, and generate an initial attribute indicator associated with an initial subset of the data set, wherein the initial attribute indicator is an index value pointing to decoding parameters to be used to decode the initial subset, wherein the encoded initial subset contains the attribute indicators of the plurality of subsets of the data set.

20. The apparatus of claim 16, wherein the encoding parameters include quantization parameters or entropy coding probability metadata or both.

* * * * *